(12) United States Patent
McDaniel et al.

(10) Patent No.: US 11,512,154 B2
(45) Date of Patent: Nov. 29, 2022

(54) PARTICLE SIZE CONTROL OF SUPPORTED CHROMIUM CATALYSTS IN LOOP SLURRY POLYMERIZATION REACTORS

(71) Applicant: Chevron Phillips Chemical Company LP, The Woodlands, TX (US)

(72) Inventors: Max P. McDaniel, Bartlesville, OK (US); Carlton E. Ash, Owasso, OK (US); Kathy S. Clear, Bartlesville, OK (US); Eric D. Schwerdtfeger, Bartlesville, OK (US); Carlos A. Cruz, Kingwood, TX (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/716,027

(22) Filed: Apr. 8, 2022

(65) Prior Publication Data
US 2022/0227897 A1    Jul. 21, 2022

Related U.S. Application Data

(63) Continuation of application No. 17/543,829, filed on Dec. 7, 2021, now Pat. No. 11,325,997.

(60) Provisional application No. 63/122,523, filed on Dec. 8, 2020.

(51) Int. Cl.
*C08F 10/02* (2006.01)
*B01J 8/08* (2006.01)
(Continued)

(52) U.S. Cl.
CPC ............ *C08F 10/02* (2013.01); *B01J 8/08* (2013.01); *B01J 19/2455* (2013.01); *C08K 3/08* (2013.01); *C08K 3/36* (2013.01)

(58) Field of Classification Search
USPC ................................. 526/106, 908
See application file for complete search history.

(56) References Cited

U.S. PATENT DOCUMENTS

| 3,242,099 A | 3/1966 | Manyik |
| 3,248,179 A | 4/1966 | Norwood |

(Continued)

FOREIGN PATENT DOCUMENTS

| EP | 173834 A | 3/1986 |
| EP | 0522215 A2 | 1/1993 |

(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Fred M Teskin
(74) *Attorney, Agent, or Firm* — Merchant & Gould P.C.

(57) ABSTRACT

Supported chromium catalysts containing a solid oxide and 0.1 to 15 wt. % chromium, in which the solid oxide or the supported chromium catalyst has a particle size span from 0.5 to 1.4, less than 3 wt. % has a particle size greater than 100 μm, and less than 10 wt. % has a particle size less than 10 μm, can be contacted with an olefin monomer in a loop slurry reactor to produce an olefin polymer. Representative ethylene-based polymers produced using the chromium catalysts have a HLMI of 4 to 70 g/10 min, a density from 0.93 to 0.96 g/cm$^3$, from 150 to 680 ppm solid oxide (such as silica), from 1.5 to 6.8 ppm chromium, and a film gel count of less than 15 catalyst particle gels per ft$^2$ of 25 micron thick film and/or a gel count of less than or equal to 50 catalyst particles of greater than 100 μm per five grams of the ethylene polymer.

28 Claims, 17 Drawing Sheets

(51) Int. Cl.
  *B01J 19/24* (2006.01)
  *C08K 3/08* (2006.01)
  *C08K 3/36* (2006.01)
  *C08F 4/69* (2006.01)

(56) References Cited

U.S. PATENT DOCUMENTS

| | | |
|---|---|---|
| 3,910,870 A | 10/1975 | Lutze |
| 3,925,338 A | 12/1975 | Ort |
| 4,056,699 A | 11/1977 | Jordan |
| 4,148,766 A | 4/1979 | Mcclain |
| 4,405,495 A | 9/1983 | Lee |
| 4,405,496 A | 9/1983 | Hsu |
| 4,501,885 A | 2/1985 | Sherk |
| 4,714,553 A | 12/1987 | Crouzet |
| 4,737,271 A | 4/1988 | Childs |
| 4,794,096 A | 12/1988 | Ewen |
| 4,808,561 A | 2/1989 | Welborn, Jr. |
| 4,960,525 A | 10/1990 | Dalby |
| 5,122,490 A | 6/1992 | Uwai |
| 5,258,342 A | 11/1993 | Luciani |
| 5,468,703 A | 11/1995 | Kioka |
| 5,565,175 A | 10/1996 | Hottovy |
| 5,575,979 A | 11/1996 | Hanson |
| 5,576,259 A | 11/1996 | Hasegawa |
| 5,641,842 A | 6/1997 | Mcdaniel |
| 5,648,309 A | 7/1997 | Bohm |
| 5,807,938 A | 9/1998 | Kaneko |
| 5,919,983 A | 7/1999 | Rosen |
| 6,107,230 A | 8/2000 | Mcdaniel |
| 6,165,929 A | 12/2000 | Mcdaniel |
| 6,239,235 B1 | 5/2001 | Hottovy |
| 6,262,191 B1 | 7/2001 | Hottovy |
| 6,294,494 B1 | 9/2001 | Mcdaniel |
| 6,300,271 B1 | 10/2001 | Mcdaniel |
| 6,316,553 B1 | 11/2001 | Mcdaniel |
| 6,355,594 B1 | 3/2002 | Mcdaniel |
| 6,376,415 B1 | 4/2002 | Mcdaniel |
| 6,388,017 B1 | 5/2002 | Mcdaniel |
| 6,391,816 B1 | 5/2002 | Mcdaniel |
| 6,395,666 B1 | 5/2002 | Mcdaniel |
| 6,420,497 B1 | 7/2002 | Kufeld |
| 6,524,987 B1 | 2/2003 | Collins |
| 6,548,441 B1 | 4/2003 | Mcdaniel |
| 6,548,442 B1 | 4/2003 | Mcdaniel |
| 6,576,583 B1 | 6/2003 | Mcdaniel |
| 6,613,712 B1 | 9/2003 | Mcdaniel |
| 6,617,278 B1 | 9/2003 | Jin |
| 6,632,894 B1 | 10/2003 | Mcdaniel |
| 6,667,274 B1 | 12/2003 | Hawley |
| 6,699,947 B1 | 3/2004 | Evertz |
| 6,716,924 B2 | 4/2004 | Tsutsui |
| 6,716,938 B2 | 4/2004 | Shveima |
| 6,750,302 B1 | 6/2004 | Mcdaniel |
| 6,806,222 B2 | 10/2004 | Yashiki |
| 6,833,415 B2 | 12/2004 | Kendrick |
| 7,026,494 B1 | 4/2006 | Yang |
| 7,041,617 B2 | 5/2006 | Jensen |
| 7,045,478 B2 | 5/2006 | Yang |
| 7,091,289 B2 | 8/2006 | Wang |
| 7,199,071 B2 | 4/2007 | Zheng |
| 7,199,073 B2 | 4/2007 | Martin |
| 7,223,823 B2 | 5/2007 | Lin |
| 7,226,886 B2 | 6/2007 | Jayaratne |
| 7,294,599 B2 | 11/2007 | Jensen |
| 7,312,283 B2 | 12/2007 | Martin |
| 7,354,981 B2 | 4/2008 | Xiao |
| 7,381,780 B2 | 6/2008 | Apecetche |
| 7,517,939 B2 | 4/2009 | Yang |
| 7,601,665 B2 | 10/2009 | Mcdaniel |
| 7,619,047 B2 | 11/2009 | Yang |
| 7,632,907 B2 | 12/2009 | Sukhadia |
| 7,867,939 B2 | 1/2011 | Xiao |
| 7,884,163 B2 | 2/2011 | Mcdaniel |
| 8,114,946 B2 | 2/2012 | Yang |
| 8,124,708 B2 | 2/2012 | Ameye |
| 8,268,945 B2 | 9/2012 | Zhang |
| 8,309,485 B2 | 11/2012 | Yang |
| 8,445,619 B2 | 5/2013 | Ameye |
| 8,623,973 B1 | 1/2014 | Mcdaniel |
| 8,633,286 B2 | 1/2014 | Kuo |
| 8,680,218 B1 | 3/2014 | Yang |
| 8,822,608 B1 | 9/2014 | Bhandarkar |
| 8,912,285 B2 | 12/2014 | Yang |
| 8,957,168 B1 | 2/2015 | Yang |
| 8,987,390 B2 | 3/2015 | Bhandarkar |
| 8,993,692 B2 | 3/2015 | Jorgensen |
| 9,000,113 B2 | 4/2015 | Fantinel |
| 9,006,367 B2 | 4/2015 | Mcdaniel |
| 9,023,959 B2 | 5/2015 | Mcdaniel |
| 9,034,994 B2 | 5/2015 | Mcdaniel |
| 9,034,999 B2 | 5/2015 | Robert |
| 9,068,025 B2 | 6/2015 | Wang |
| 9,079,993 B1 | 7/2015 | St. Jean |
| 9,115,280 B1 | 8/2015 | Jan |
| 9,156,970 B2 | 10/2015 | Hlavinka |
| 9,169,337 B2 | 10/2015 | Rohatgi |
| 9,181,370 B2 | 11/2015 | Sukhadia |
| 9,284,389 B2 | 3/2016 | St. Jean |
| 9,321,857 B2 | 4/2016 | Li |
| 9,403,921 B2 | 8/2016 | Bhandarkar |
| 9,493,589 B1 | 11/2016 | Greco |
| 9,540,457 B1 | 1/2017 | Ding |
| 9,556,288 B2 | 1/2017 | Bhandarkar |
| 9,644,049 B2 | 5/2017 | Jorgensen |
| 9,758,600 B1 | 9/2017 | Praetorius |
| 10,144,788 B2 | 12/2018 | Gerrits |
| 10,246,566 B2 | 4/2019 | Kikuchi |
| 10,358,513 B2 | 7/2019 | Klendworth |
| 10,590,213 B2 | 3/2020 | Rohatgi |
| 10,604,603 B2 | 3/2020 | Dreng |
| 10,703,648 B2 | 7/2020 | Norum |
| 11,124,586 B1 | 9/2021 | Mcdaniel |
| 2003/0109651 A1 | 6/2003 | Kufeld |
| 2006/0094835 A1 | 5/2006 | Fouarge |
| 2007/0197374 A1 | 8/2007 | Yang |
| 2009/0143546 A1 | 6/2009 | Fouarge |
| 2009/0318643 A1 | 12/2009 | Chen |
| 2011/0130271 A1 | 6/2011 | Wagner |
| 2011/0165419 A1 | 7/2011 | Kumamoto |
| 2012/0202955 A1 | 8/2012 | Zhang |
| 2013/0046040 A1 | 2/2013 | Srinivasan |
| 2013/0115461 A1 | 5/2013 | Jan |
| 2014/0316082 A1* | 10/2014 | Kolling .............. C08F 2/14 526/64 |
| 2015/0166697 A1 | 6/2015 | Vantomme |
| 2015/0368377 A1 | 12/2015 | Lester |
| 2018/0105621 A1 | 4/2018 | Gupta |
| 2018/0273699 A1 | 9/2018 | Kalyanaraman |
| 2019/0185594 A1 | 6/2019 | Dreng |
| 2020/0123279 A1 | 4/2020 | Kanellopoulos |
| 2020/0270353 A1 | 8/2020 | Wang |
| 2021/0269560 A1 | 9/2021 | Krallis |

FOREIGN PATENT DOCUMENTS

| | | |
|---|---|---|
| EP | 3331924 B1 | 8/2019 |
| EP | 2877502 B1 | 11/2019 |
| WO | 2014016418 A1 | 1/2014 |
| WO | 2014099411 A1 | 6/2014 |
| WO | 2016102513 A1 | 6/2016 |
| WO | 2020025757 A1 | 2/2020 |
| WO | 2022099250 A2 | 5/2022 |

OTHER PUBLICATIONS

Brunauer, et al., "Adsorption of Gases in Multimolecular Layers," Journal of the American Chemical Society. 1938, vol. 60, pp. 309-319.

Film Extrusion Manual—Process, Materials, Properties, TAPPI Press, 1992, 16 pages.

George Halsey, "Physical Adsorption on Non-Uniform Surfaces," Journal Chem. Phys., vol. 16, Mar. 9, 1948, pp. 931-937.

(56) References Cited

OTHER PUBLICATIONS

Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
John Landers, et al., "Density Functional Theory Methods for Characterization of Porous Materials," Colloids and Surfaces A: Physicochemical and Engineering Aspects, 437, 2013, pp. 3-32.
Modern Plastics Encyclopedia, Mid-Nov. 1995 Issue, vol. 72, No. 12, 3 pages.
International Search Report and Written Opinion issued in application No. PCT/US2021/062257, dated Jun. 23, 2022, 16 pp.
Marsden Ce: "Advances in Supported Chromium Catalysts", Plastics, Rubber and Composites Processing and Applications, Essex, GB, vol. 21, No. 4, Jan. 1, 1994 (Jan. 1, 1994), pp. 193-200, XP008057615.
Max P. McDaniel: "Review of Phillips Chromium Catalyst for Ethylene Polymerization (Chapter 10)" In: "Handbook of Transition Metal Polymerization Catalysts", Aug. 31, 2010 (Aug. 31, 2010), Wiley, US, XP055562084, ISBN: 978-1-119-24213-0 pp. 291-446.

\* cited by examiner

PARTICLE SIZE CONTROL OF SUPPORTED CHROMIUM CATALYSTS IN LOOP SLURRY POLYMERIZATION REACTORS

REFERENCE TO RELATED APPLICATIONS

This application is a continuation application of U.S. patent application Ser. No. 17/543,829, filed on Dec. 7, 2021, now U.S. Pat. No. 11,325,997, which claims the benefit of U.S. Provisional Patent Application No. 63/122,523, filed on Dec. 8, 2020, the disclosures of which are incorporated herein by reference in their entirety.

FIELD OF THE INVENTION

The present disclosure generally relates to loop slurry polymerization processes for producing ethylene polymers, and more particularly, relates to the use of supported chromium catalysts with particular particle size attributes in these loop slurry polymerization processes.

BACKGROUND OF THE INVENTION

Improper particle size features of supported chromium catalysts can lead to operational difficulties during ethylene/α-olefin polymerizations in loop slurry reactors, as well as poor and inconsistent properties of the resulting polymer. It would be beneficial to develop chromium catalysts and polymerization processes that overcome these drawbacks. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates, in one aspect, to supported chromium catalysts and to slurry polymerization processes using the supported chromium catalysts. Such supported chromium catalysts can comprise a solid oxide and from 0.1 to 15 wt. % chromium. The solid oxide (or the supported chromium catalyst) can have an amount of the solid oxide (or the supported chromium catalyst) with a particle size greater than 100 µm of less than or equal to 3 wt. % and a particle size span ((d90−d10)/d50) in a range from 0.5 to 1.4 and/or an amount of the solid oxide (or the supported chromium catalyst) with a particle size greater than 100 µm of less than or equal to 0.5 wt. % and an amount of the solid oxide (or the supported chromium catalyst) with a particle size less than 10 µm of less than or equal to 10 wt. %. Polymerization processes using the supported chromium catalyst can comprise contacting the supported chromium catalyst and an optional co-catalyst with an olefin monomer and an optional olefin comonomer in a polymerization reactor system comprising a loop slurry reactor under polymerization conditions to produce an olefin polymer.

Ethylene polymer powder (or fluff) produced by the polymerization processes can have, in one aspect, less than or equal to 1 wt. % of the composition on a 10 mesh sieve, less than or equal to 6 wt. % of the composition on a 20 mesh sieve, and less than or equal to 4 wt. % of the composition thru a 200 mesh sieve. In another aspect, the ethylene polymer (fluff or powder) composition can have less than or equal to 5 wt. % of the composition with a particle size of less than 100 µm, less than or equal to 5 wt. % of the composition with a particle size of greater than 1000 µm, and a particle size span ((d90-d10)/d50) from 0.6 to 1.5.

Other aspects of this invention are directed to ethylene polymers (which are typically in the form of pellets or beads) characterized by a high load melt index (HLMI) in a range from 4 to 70 g/10 min and a density in a range from 0.93 to 0.96 g/cm$^3$. These ethylene polymers can have a film gel count of less than or equal to 15 catalyst particle gels per ft$^2$ of 25 micron thick film and the ethylene polymer can contain from 150 to 680 ppm solid oxide (e.g., silica) and from 1.5 to 6.8 ppm chromium. Additionally or alternatively, the ethylene polymer can have a gel count of less than or equal to 50 catalyst particles of greater than 100 µm per 5 grams of the ethylene polymer, and the ethylene polymer can contain from 150 to 680 ppm solid oxide (e.g., silica) and from 1.5 to 6.8 ppm chromium. Additionally or alternatively, the ethylene polymer can contain from 150 to 680 ppm of solid oxide and from 1.5 to 6.8 ppm chromium, and can have (A) a film gel count of less than Y1 catalyst particle gels per ft$^2$ of 25 micron thick film, wherein film gels are of a size greater than 200 µm caused by the catalyst particles, wherein $Y1=1.20*(5,580,000x^{1.61})$, and x is the weight fraction of ash (encompassing solid oxide and chromium) in the ethylene polymer and/or (B) a film gel count of less than Y catalyst particle gels per ft$^2$ of 25 micron thick film, wherein film gels are of a size greater than 200 µm caused by the catalyst particles, wherein $Y=-1,950,000x^3+324,000x^2-11,300x+121$, wherein x is the weight percentage of ash (encompassing solid oxide and chromium) in the ethylene polymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
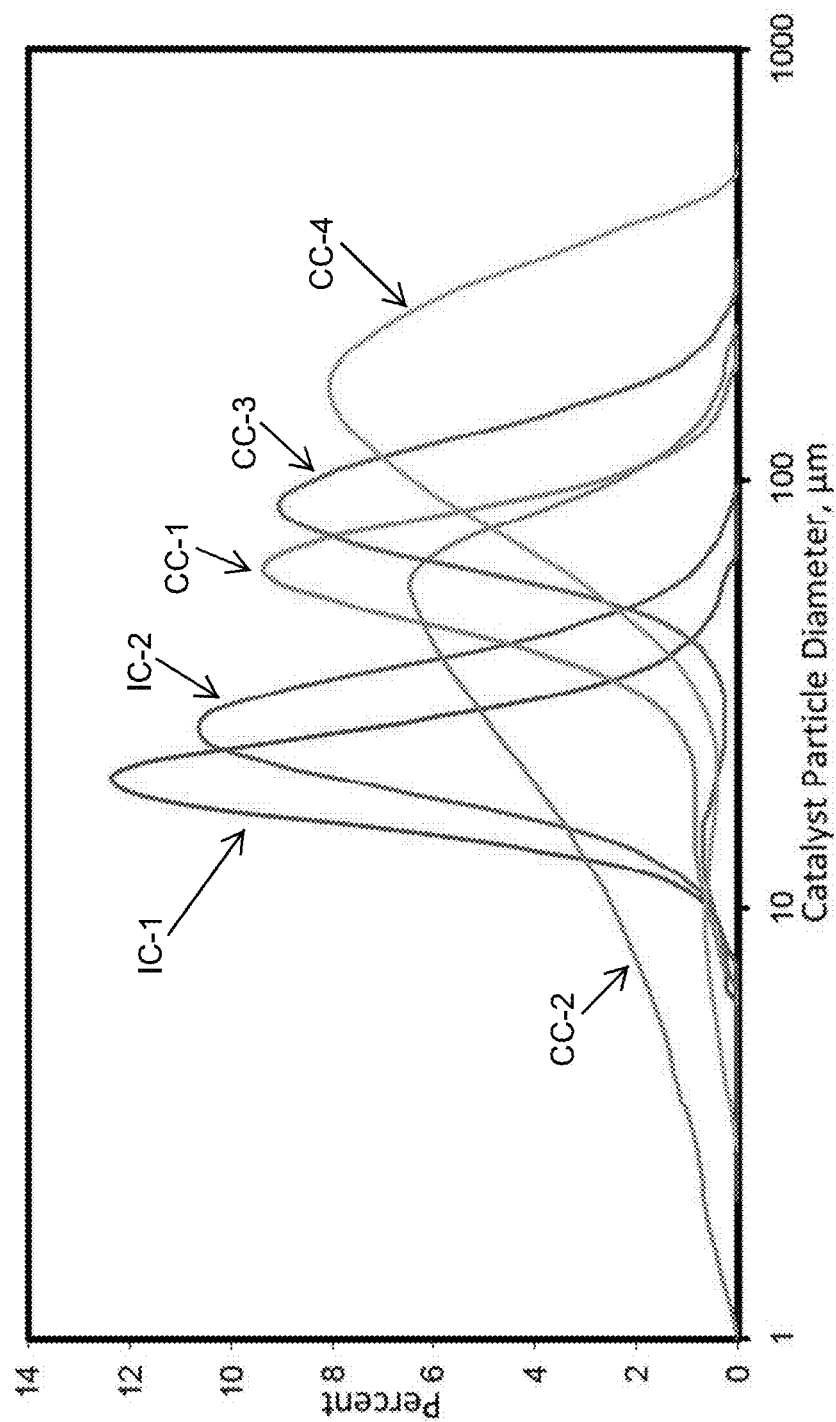
FIG. 1 presents a plot of the particle size distributions of Inventive chromium catalysts IC-1 and IC-2, and Comparative chromium catalysts CC-1, CC-2, CC-3, and CC-4.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. The terms "a," "an," "the," etc., are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition. The term "co-catalyst" is used regardless of the actual function of the compound or any chemical mechanism by which the compound may operate.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from 3 to 25, the intent is to recite that the ratio of Mw/Mn can be any ratio in the range and, for example, can include any range or combination of ranges from 3 to 25, such as from 3 to 10, from 15 to 25, from 4 to 20, or from 5 to 18, and so forth. Likewise, all other ranges disclosed herein should be interpreted in a manner similar to these examples.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

DETAILED DESCRIPTION OF THE INVENTION

The present invention is directed generally to supported chromium catalysts, controlling the particle size of the solid oxide used in these chromium catalysts, methods for using the chromium catalysts to polymerize olefins in loop slurry reactors, the polymer resins produced using such catalysts, and films and other articles of manufacture produced from these polymer resins.

Ordinarily during ethylene polymerization with chromium catalysts, catalyst particles are introduced into a reactor, where they then cause ethylene to polymerize into solid hard polyethylene. Catalyst pores quickly fill up with polymer and then the catalyst matrix begins to "explode" the catalyst particle. That is, during polymerization the hydraulic pressure generated from growing polymer destroys the catalyst particle, disintegrating it into billions of tiny fragments that stay in the polymer. However, their presence is typically of no concern because of the extremely small size of these particle fragments, which are much smaller than the die in a film or extrusion line, for example.

However, because commercial polymerization is conducted in a continuous process, catalyst is always being fed continuously into, and also taken continuously out of, the reactor. Thus, catalyst particles do not have a uniform residence time in the reactor. Some stay in the reactor for hours, whereas others exit by chance quickly after they are charged to the reactor—this is called "short-circuiting" of the catalyst particles. Such short-lived catalyst particles do not have time to react with the ethylene and therefore they do not disintegrate into tiny fragments. Instead, they often exit the reactor intact, as large hard catalyst particles that then cause problems downstream, such as catalyst particle "gels." The term "gels" is a generic term describing film imperfections from various sources. When the catalyst is Cr/silica, these "gels" are usually unfragmented catalyst particles.

These ~100-400+ μm short-circuited catalyst particles are considerably larger than the typical thickness of many film products, which often range from less than 12 up to 75 μm in film thickness. Usually called a gel, these unfragmented catalyst particles cause imperfections in the film, imparting surface roughness, interfering with clarity and other optical properties, leading to printing defects and stress points for failure of the film product (or other article of manufacture). Thus, it is important to minimize the presence of these "short-circuited" catalyst gels.

During HDPE and LLDPE manufacture, automatic laser-light gel counters are used to determine and track gels in batches of polymer resin as they are made in real-time, so that corrections for high gels can be quickly made by adjusting polymerization reaction conditions. Film made from the polymer is passed through an optical camera of a gel analyzer to provide instant quantification of the gel level. Many polymer resins have gel specifications, such as, for example, a maximum allowed level of no more than 150 gels/ft$^2$ of 25 micron thick film.

Typically, to qualify as a "gel" the optical imperfection recognized by the camera and computer on the gel analyzer must register the gel size as greater than 200 μm in diameter. From experience, we have concluded that catalyst particles of 100+ μm diameter register as 200+ μm gels, due to the polymer sometimes clinging to the catalyst particle, thus adding to its size, and also because of the "lens effect." The latter is an optical magnification of the catalyst particle's size due to the formation of a convex lens made of clear polymer that surrounds the catalyst particle. For this reason, as discussed herein, this invention is mainly focused on minimizing defects (or gels) due to catalyst particles of 100 μm or more.

Catalyst particle sizes that perform well in certain fluidized bed gas phase processes are often not transferable to loop slurry processes, due in part to differences in chromium content of the catalyst, in catalyst loading/feeding, and in downstream polymer transfer, as well as particle settling efficiency in a gaseous medium versus a liquid diluent. For loop slurry processes, the benefits of smaller catalyst particle sizes generally include lower gels, more surface area which increases the potential for collisions and mass transfer, higher saltation velocities, greater potential reactor mass solids, longer reactor residence times, higher activities, and more efficient purge capability. However, there are significant drawbacks to the use of small particle sizes (fines), in particular, difficulties with activation and transfer of the solid oxide/supported catalyst into the reactor, issues of downstream powder/fluff transfer (since smaller catalyst particles generally make smaller polymer particles), and higher slurry viscosity due the greater surface area of the fine particles. An objective of this invention, therefore, is to target a moderate average catalyst particle size and with a narrow particle size distribution, such that the only a small amount of catalyst particles are fines (e.g., less than 10 microns), while also minimizing the amount of very large catalyst particles (e.g., greater than 100 microns), which also can be problematic, as discussed further herein.

The supported chromium catalyst contains a solid oxide and a suitable amount of chromium impregnated therein. The solid oxide (and the supported chromium catalyst) would have the described particle size distribution. This is distinct from Ziegler-Natta and metallocene-based catalyst systems.

The gels that are of concern in the herein disclosed chromium-based polymers—and any articles or products produced from these chromium-based polymers—are catalyst particle gels (hard gels) that arise from the supported catalyst particle. While not wishing to be bound by theory, it is believed that many of the catalyst particle gels resulting from chromium-based polymers are due to relatively large catalyst particles which result in optical defects in product and articles (such as films) produced from the polymers. It was found that the particle size of the solid oxide (and thus, the particle size of the supported chromium catalyst) can dramatically impact the number of polymer defects resulting from catalyst particles. However, the number of defects (catalyst particle gels) also is impacted by the catalyst productivity and the amount of catalyst particles that are not disintegrated during polymerization into catalyst fines in the resulting polymer, among other factors.

Further, in addition to gels, the particle size distribution also can significantly impact polymer properties, such as polymer molecular weight distribution, density, and rheological properties. For instance, it was found that broader particle size distributions can result in greater polymer heterogeneity.

By controlling the particle size distribution of the solid oxide (and the supported chromium catalyst), more consistent polymer particle sizes (in powder or fluff form) can be produced, thereby resulting in more homogeneous ethylene polymers with the reduction—or even elimination—of gel defects of a certain size that result from catalyst particles.

Supported Chromium Catalysts

Disclosed herein are supported chromium catalysts. These supported chromium catalysts can comprise a solid oxide and from 0.1 to 15 wt. % chromium. The solid oxide (or the supported chromium catalyst) can be characterized by an amount of the solid oxide (or the supported chromium catalyst) with a particle size greater than 100 μm of less than or equal to 3 wt. % and a particle size span ((d90−d10)/d50) in a range from 0.5 to 1.4, and/or the solid oxide (or the supported chromium catalyst) can be characterized by an amount of the solid oxide (or the supported chromium catalyst) with a particle size greater than 100 μm of less than or equal to 0.5 wt. % and an amount of the solid oxide (or the supported chromium catalyst) with a particle size less than 10 μm of less than or equal to 10 wt. %. Supported chromium catalysts consistent with the present invention also can have any of the catalyst properties or attributes listed below and in any combination, unless indicated otherwise.

The amount of chromium in the supported chromium catalyst (or activated catalyst) disclosed herein is not particularly limited, but generally falls in a range from 0.1 to 15 wt. %. More often, the chromium content can be in a range from 0.1 to 10 wt. %; alternatively, from 0.5 to 10 wt. %; alternatively, from 0.5 to 2 wt. %; alternatively, from 0.75 to 7.5 wt. %; alternatively, from 0.75 to 2.5 wt. %; or alternatively, from 0.75 to 1.25 wt. %. These weight percentages are based on the amount of chromium relative to the total weight of the supported chromium catalyst.

Prior to a thermal treatment step, at least 75 wt. % of the chromium can be present in an oxidation state of three or less. In further aspects, at least 80 wt. %, at least 90 wt. %, or at least 95 wt. %, of the chromium can be present in an oxidation state of three or less. When subjected to a thermal treatment step (calcination or activation), it is believed that the supported chromium catalyst will have little to no chromium in a lower oxidation state. Typically, all or a large portion of the chromium will be converted to hexavalent chromium. Accordingly, such (activated) supported chromium catalysts can have at least 40 wt. %, at least 60 wt. %, at least 75 wt. %, or at least 90 wt. %, of the chromium present in an oxidation state of +6.

Generally, the total pore volume (total pore volume via nitrogen sorption) of the supported chromium supported catalyst (or activated catalyst) falls within a range from 0.5 to 5 mL/g, but is not limited thereto. Illustrative and non-limiting ranges for the total pore volume include from 1 to 5 mL/g, from 1 to 4 mL/g, from 1 to 3 mL/g, from 1.2 to 4.5 mL/g, from 1.2 to 2.5 mL/g, or from 1.3 to 1.8 mL/g.

The total BET surface area of the supported chromium catalyst (or activated catalyst) is not limited to any particular range, but typically falls within a range from 200 to 700 m²/g. Illustrative and non-limiting ranges for the total BET surface area include from 200 to 500 m²/g, from 250 to 650 m²/g, from 250 to 550 m²/g, from 250 to 400 m²/g, from 275 to 525 m²/g, or from 400 to 600 m²/g.

In particular aspects of this invention, there can be substantially no VOC's (volatile organic compounds) emitted during the thermal treatment (calcination/activation) step. Thus, in such aspects, the supported chromium catalyst prior to thermal treatment (or the activated catalyst after thermal treatment) can contain less than or equal to 3 wt. % carbon, less than or equal to 2.5 wt. % carbon, or less than or equal to 2 wt. % carbon, and in further aspects, less than or equal to 1 wt. % carbon, less than or equal to 0.5 wt. % carbon, or less than or equal to 0.25 wt. % carbon. These weight percentages are based on the amount of carbon relative to the total weight of the supported chromium catalyst (whether activated or not).

The solid oxide can encompass oxide materials such as silica, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid oxide can comprise silica, silica-alumina, silica-coated alumina, silica-titania, silica-titania-magnesia, silica-zirconia, silica-magnesia, silica-boria, aluminophosphate-silica, or any combination thereof alternatively, silica; or alternatively, silica-titania. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Optionally, any of the solid oxides disclosed herein can be chemically-treated, such as with a source of fluoride, chloride, sulfate, and the like, as well as combinations thereof. Thus, fluorided solid oxides, chlorided solid oxides, sulfated solid oxides, etc., are encompassed.

Herein, the solid oxide (or supported chromium catalyst) can be characterized by an amount of the solid oxide (or the supported chromium catalyst) with a particle size greater than 100 μm of less than or equal to 3 wt. % and a particle size span ((d90−d10)/d50) in a range from 0.5 to 1.4, and/or the solid oxide (or the supported chromium catalyst) can be characterized by an amount of the solid oxide (or the supported chromium catalyst) with a particle size greater than 100 μm of less than or equal to 0.5 wt. % and an amount of the solid oxide (or the supported chromium catalyst) with a particle size less than 10 μm of less than or equal to 10 wt. %. The solid oxide (or supported chromium catalyst) also can have any of the particle attributes listed below and in any combination, unless indicated otherwise.

As described herein, a very small amount of the solid oxide (or the supported chromium catalyst) has a particle size of less than 10 μm. In one aspect, the amount is less than or equal to 10 wt. % (or 7 wt. %), while in another aspect, the amount is less than or equal to 5 wt. % (or 4 wt. %), and in yet another aspect, the amount is less than or equal to 3 wt. % (or 2 wt. %). Likewise, a very small amount of the solid oxide (or the supported chromium catalyst) has a particle size of greater than 100 μm. In one aspect, the amount is less than or equal to 2 wt. % (or 1 wt. %), while in another aspect, the amount is less than or equal to 0.5 wt. % (or 0.35 wt. %), and in yet another aspect, the amount is less than or equal to 0.2 wt. % (or 0.1 wt. %).

Similarly, the amount of the solid oxide (or the supported chromium catalyst) with a particle size less than 15 μm and greater than 75 μm is relatively small. For instance, the amount of the solid oxide (or the supported chromium catalyst) with a particle size less than 15 μm is generally less than or equal to 20 wt. %, such as less than or equal to 18 wt. %, less than or equal to 15 wt. %, less than or equal to 13 wt. %, or less than or equal to 8 wt. %. The amount of the solid oxide (or the supported chromium catalyst) with a particle size greater than 75 μm is generally less than or equal to 10 wt. %, such as less than or equal to 6.5 wt. %, less than or equal to 4 wt. %, less than or equal to 2.5 wt. %, less than or equal to 1.5 wt. %, or less than or equal to 1 wt. %.

Stated another way, the number of the solid oxide (or the supported chromium catalyst) particles with a particle size greater than 150 μm generally is less than or equal to 10,000, such as less than or equal to 1000, less than or equal to 100, or less than or equal to 50, per gram of the solid oxide (or the supported chromium catalyst). Additionally or alternatively, the number of the solid oxide (or the supported chromium catalyst) particles with a particle size greater than 100 μm is generally less than or equal to 100,000, such as less than or equal to 10,000, less than or equal to 1000, less than or equal to 100, or less than or equal to 50, per gram of the solid oxide (or the supported chromium catalyst). Additionally or alternatively, the number of the solid oxide (or the supported chromium catalyst) particles with a particle size greater than 75 µm is generally less than or equal to 100,000, less than or equal to 50,000, less than or equal to 10,000, less than or equal to 1000, or less than or equal to 100, per gram of the solid oxide (or the supported chromium catalyst).

In one aspect, the d50 average particle size of the solid oxide (or the supported chromium catalyst) can be in a range from 15 to 60 µm, while in another aspect, the d50 particle size can range from 15 to 50 µm, and in another aspect, the d50 particle size can range from 15 to 40 µm, and in yet another aspect, the d50 particle size can range from 17 to 45 µm, and in still another aspect, the d50 particle size can range from 17 to 32 µm. The particle size span ((d90−d10)/d50) can fall within a range from 0.5 to 1.4, from 0.6 to 1.4, from 0.7 to 1.4, from 0.6 to 1.35, from 0.7 to 1.35, from 0.8 to 1.35, from 0.7 to 1.1, or from 0.8 to 1.1, although not limited thereto.

The solid oxide (or the supported chromium catalyst) can have a d10 particle size of greater than or equal to 10 µm; alternatively, greater than or equal to 11 µm; alternatively, in a range from 10 to 25 µm; alternatively, in a range from 10 to 20 µm; or alternatively, in a range from 11 to 22 µm. Additionally or alternatively, the solid oxide (or the supported chromium catalyst) can have a d95 particle size ranging from 25 to 88 µm, from 28 to 85 µm, from 30 to 82 µm, from 25 to 65 µm, or from 30 to 55 µm. While not limited thereto, the solid oxide (or the supported chromium catalyst) can be further characterized by the ratio of d80/d20, which often ranges from 1.3 to 2.8. In some aspects, the ratio of d80/d20 can range from 1.3 to 2.2, from 1.4 to 2.8, from 1.4 to 2.2, from 1.5 to 2.7, or from 1.5 to 2.1.

Polymerization Processes

Olefin polymers (e.g., ethylene polymers) can be produced from the disclosed supported chromium catalysts using any suitable polymerization process using various types of polymerization reactors, polymerization reactor systems, and polymerization reaction conditions. A representative polymerization process can comprise contacting the (activated) supported chromium catalyst (any supported chromium catalyst disclosed herein) and an optional co-catalyst with an olefin monomer and an optional olefin comonomer in a polymerization reactor system comprising a loop slurry reactor under polymerization conditions to produce an olefin polymer. This invention also encompasses any olefin polymers (e.g., ethylene polymers) produced by the polymerization processes disclosed herein.

In the polymerization processes, a co-catalyst can be utilized with the supported chromium catalyst. In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentyl-aluminoxane, neopentylaluminoxane, and the like, or any combination thereof. Representative and non-limiting examples of organoaluminums include triethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485.

In one aspect, the polymerization reactor system can comprise only one loop slurry reactor (a single loop slurry reactor). However, in another aspect, the polymerization reactor system can comprise two or more reactors, at least one of which is the loop slurry reactor. The other reactor(s) in the polymerization reactor system can be another slurry reactor (dual loop slurry), a gas-phase reactor, a solution reactor, or a combination thereof. The production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. The multiple reactors can be operated in series, in parallel, or both. Accordingly, the present invention encompasses polymerization reactor systems comprising a single reactor, comprising two reactors, and comprising more than two reactors, wherein at least one is a loop slurry reactor.

In a loop slurry reactor, monomer, diluent, catalyst, and comonomer (if used) can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles (powder or fluff) and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor system as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some loop reactor systems, the polymerization temperature generally can be within a range from 70° C. to 115° C., or from 90° C. to 110° C. Suitable pressures will also vary according to the reactor and polymerization type. The pressure for liquid phase polymerizations in a loop reactor is typically less than 1000 psig (6.9 MPa) and greater than 200 psig (1.4 MPa).

Olefin monomers that can be employed with supported chromium catalysts and slurry-based polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

An illustrative and non-limiting example of an ethylene polymer composition that can be produced using the chromium catalysts and processes disclosed herein can be characterized by less than or equal to 1 wt. % of the composition on a 10 mesh sieve, less than or equal to 6 wt. % of the composition on a 20 mesh sieve, and less than or equal to 4 wt. % of the composition thru a 200 mesh sieve. Another illustrative and non-limiting example of an ethylene polymer composition that can be produced using the chromium catalysts and processes disclosed herein can be characterized by less than or equal to 5 wt. % of the composition with a particle size of less than 100 μm, less than or equal to 5 wt. % of the composition with a particle size of greater than 1000 μm, and a particle size span ((d90−d10)/d50) from 0.6 to 1.5. The ethylene polymer composition can be in powder form (also referred to as fluff), prior to mixing and homogenizing to form typical resin pellets or beads.

A very small amount of the ethylene polymer composition is of a relatively small particle size and of a relatively large particle size. For instance, the amount of the composition on the 10 mesh sieve often can be less than or equal to 0.5 wt. % of the composition, and more often less than or equal to 0.3 wt. %, or less than or equal to 0.1 wt. %. Additionally or alternatively, the amount of the composition on the 20 mesh sieve often can be less than or equal to 4 wt. % of the composition, and more often, less than or equal to 3 wt. %, or less than or equal to 2.5 wt. %. Additionally or alternatively, the amount of the composition passing thru the 200 mesh sieve often can be less than or equal to 3 wt. % of the composition, and more often, less than or equal to 2 wt. %, or less than or equal to 1 wt. %.

Stated another way, the amount of the composition with a particle size of less than 100 μm often can be less than or equal to 4 wt. % of the composition, such as less than or equal to 3 wt. %, or less than or equal to 2 wt. %. Likewise, the amount of the composition with a particle size of greater than 1000 μm often can be less than or equal to 4 wt. % of the composition, such as less than or equal to 3 wt. %, or less than or equal to 2 wt. %.

Often, the d50 average particle size of the composition can fall within a range from 150 to 550 μm, from 200 to 600 μm, from 200 to 450 μm, from 250 to 550 μm, or from 250 to 500 μm, and the particle size span ((d90−d10)/d50) can fall within a range from 0.6 to 1.5, from 0.6 to 1.4, from 0.7 to 1.5, or from 0.7 to 1.4.

It should be noted that the supported chromium catalysts of this invention tend to produce a more homogeneous distribution of polymer particles, in terms of size and also in terms of polymer properties such as melt flow and comonomer incorporation. The narrow distribution of polymer particle size significantly helps the flow of the polymer powder, reducing fouling, packing, and enhancing transfer in downstream operations.

In an aspect, when the polymer particles (also referred to as powder or fluff) of the composition are sorted by particle size, beneficially, the range of density across the composition can vary less than 0.025 g/cm$^3$ in one aspect, less than 0.02 g/cm$^3$ in another aspect, less than 0.015 g/cm$^3$ in yet another aspect, or less than 0.01 g/cm$^3$ in still another aspect. Additionally or alternatively, the HLMI variation of the powder or fluff is relatively small; the range of HLMI across the composition can vary less than 5 g/10 min in one aspect, less than 4 g/10 min in another aspect, less than 3 g/10 min in yet another aspect, or less than 2 g/10 min in still another aspect. Additionally or alternatively, and similar to density, the variation of short chain branch content of the powder or fluff is relatively small; the range of the number of short chain branches per 1000 carbon atoms across the composition divided by the mean of the composition generally is less than 1, and more often, can be less than 0.8, less than 0.6, or less than 0.5. Additionally or alternatively, the range of the solid oxide content in ppm across the composition divided by the mean of the composition also is generally less than 1, and more often, can be less than 0.8, less than 0.6, or less than 0.5.

Moreover, any of the ethylene polymer compositions disclosed herein can be further described or characterized by the any of the properties of the ethylene polymer disclosed in the section below, and in any combination.

Ethylene and Olefin Polymers

This invention is also directed to, and encompasses, the olefin polymers produced using any of the chromium catalysts and polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

As described herein, the particular size distribution of the solid oxide (and thus, the particle size distribution of the supported chromium catalyst) significantly impacts the amount of catalyst particle defects, and the amount of defects also depends on other factors like catalyst productivity, catalyst induction time, reactor residence time, and the presence of poisons. Moreover, it was also found that most of the small particle size polymer (fines) produced are not necessarily due to small catalyst particles, but instead, are largely the result of breakage of large particles into smaller particles (fines) in the reactor.

Therefore, an illustrative and non-limiting example of an ethylene polymer (e.g., an ethylene/α-olefin copolymer)—produced using the supported chromium catalysts with the particle size attributes and other properties disclosed herein—can have a high load melt index (HLMI) in a range from 4 to 70 g/10 min, a density in a range from 0.93 to 0.96 g/cm$^3$, and a film gel count of less than or equal to 15 catalyst particle gels per ft$^2$ of 25 micron thick film (or less than or equal to 12, or less than or equal to 10, or less than or equal to 8, or less than or equal to 5, or less than or equal to 2, gels per ft$^2$ of 25 micron thick film), where the film gels encompass a size greater than 200 µm and are caused by catalyst particles, and wherein the ethylene polymer contains a total (both disintegrated and non-fragmented) of from 150 to 680 ppm solid oxide (e.g., silica or silica-alumina) and from 1.5 to 6.8 ppm chromium.

Another illustrative and non-limiting example of an ethylene polymer (e.g., an ethylene/α-olefin copolymer) can have a high load melt index (HLMI) in a range from 4 to 70 g/10 min, a density in a range from 0.93 to 0.96 g/cm$^3$, and a gel count of less than or equal to 50 catalyst particles of greater than 100 µm per 5 grams of the ethylene polymer (or less than or equal to 40, or less than or equal to 30, or less than or equal to 20, or less than or equal to 10, or less than or equal to 5, or less than or equal to 2, or less than or equal to 1, catalyst particle(s) per 5 grams of the ethylene polymer), and wherein the ethylene polymer contains from 150 to 680 ppm solid oxide (e.g., silica) and from 1.5 to 6.8 ppm chromium.

Yet another illustrative and non-limiting example of an ethylene polymer (e.g., an ethylene/α-olefin copolymer) can have a high load melt index (HLMI) in a range from 4 to 70 g/10 min and a density in a range from 0.93 to 0.96 g/cm$^3$, wherein the ethylene polymer contains from 150 to 680 ppm of solid oxide (or from 150 to 600 ppm, or from 150 to 500 ppm, or from 180 to 550 ppm, or from 200 to 600 ppm, or from 200 to 500 ppm) and from 1.5 to 6.8 ppm of chromium (or from 1.5 to 6 ppm, or from 1.5 to 5 ppm, or from 1.8 to 5.5 ppm, or from 2 to 6 ppm, or from 2 to 5 ppm) wherein the ethylene polymer has (A) a film gel count of less than Y1 catalyst particle gels per ft$^2$ of 25 micron thick film, wherein film gels are of a size greater than 200 µm caused by catalyst particles, wherein $Y1=1.20*(5{,}580{,}000x^{1.61})$, and x is the weight fraction of ash (solid oxide, chromium from the catalyst) in the ethylene polymer. In further aspects, the film gel count can be less than Y1 catalyst particle gels, wherein $Y1=5{,}580{,}000x^{1.61}$; alternatively, $Y1=0.80*(5{,}580{,}000x^{1.61})$; alternatively, $Y1=0.50*(5{,}580{,}000x^{1.61})$; or alternatively, $Y1=0.25*(5{,}580{,}000x^{1.61})$.

Still another illustrative and non-limiting example of an ethylene polymer (e.g., an ethylene/α-olefin copolymer) can have a high load melt index (HLMI) in a range from 4 to 70 g/10 min and a density in a range from 0.93 to 0.96 g/cm$^3$, wherein the ethylene polymer contains from 150 to 680 ppm of solid oxide (or from 150 to 600 ppm, or from 150 to 500 ppm, or from 180 to 550 ppm, or from 200 to 600 ppm, or from 200 to 500 ppm) and from 1.5 to 6.8 ppm of chromium (or from 1.5 to 6 ppm, or from 1.5 to 5 ppm, or from 1.8 to 5.5 ppm, or from 2 to 6 ppm, or from 2 to 5 ppm) wherein the ethylene polymer has (B) a film gel count of less than Y catalyst particle gels per ft$^2$ of 25 micron thick film, wherein film gels are of a size greater than 200 µm caused by catalyst particles, wherein $Y=-1{,}950{,}000x^3+324{,}000x^2-11{,}300x+121$, wherein x is the weight percentage of ash (encompassing solid oxide and chromium) in the ethylene polymer. In further aspects, the film gel count can be less than Y catalyst particle gels, wherein $Y=0.80*(-1{,}950{,}000x^3+324{,}000x^2-11{,}300x+121)$; alternatively, $Y=0.50*(-1{,}950{,}000x^3+324{,}000x^2-11{,}300x+121)$; or alternatively, $Y=0.25*(-1{,}950{,}000x^3+324{,}000x^2-11{,}300x+121)$.

Further, these illustrative and non-limiting examples of ethylene polymers (which are typically in the form of pellets or beads) consistent with the present invention also can have any of the polymer properties listed below and in any combination, unless indicated otherwise.

The density of the ethylene-based polymers often can range from 0.93 to 0.96 or from 0.93 to 0.956 g/cm$^3$. In one aspect, the density can range from 0.934 to 0.96, from 0.934 to 0.956 in another aspect, from 0.934 to 0.95 in yet another aspect, or from 0.945 to 0.958 g/cm$^3$ in still another aspect.

The ethylene polymers can have a variety of melt flow properties, such as indicated by the high load melt index (HLMI) in a range from 4 to 70 g/10 min. In some aspects, the HLMI of the ethylene polymer can fall within a range from 4 to 50 or from 6 to 36 g/10 min. In other aspects, the HLMI of the ethylene polymer can fall within a range from 6 to 15, from 20 to 40, or from 25 to 36 g/10 min.

In an aspect, the ethylene polymers can have a Mw in a range from 100,000 to 275,000, from 120,000 to 240,000, or from 130,000 to 220,000 g/mol. Additionally or alternatively, the ethylene polymers can have a ratio of Mw/Mn in a range from 3 to 25, from 4 to 20, or from 5 to 18.

In an aspect, the ethylene polymers can have a CY-a parameter of from 0.10 to 0.23, from 0.11 to 0.20, from 0.11 to 0.16, from 0.12 to 0.18, from 0.13 to 0.20, from 0.13 to 0.16, from 0.14 to 0.18, or from 0.18 to 0.22, and the like. Additionally or alternatively, the ethylene polymer can have a relaxation time (Tau(eta) or $\tau(\eta)$) in a range from 0.5 to 50, from 0.8 to 10, from 0.8 to 5, from 0.8 to 3, from 4 to 40, or from 5 to 30 sec. These rheological parameters are determined from viscosity data measured at 190° C. and using the Carreau-Yasuda (CY) empirical model described herein.

Moreover, the ethylene polymers can be produced with a supported chromium catalyst, as discussed herein. Ziegler-Natta and metallocene based catalyst systems are not required. Therefore, the ethylene polymers can contain no measurable amount of zirconium or hafnium or titanium or vanadium or magnesium (catalyst residue), i.e., less than 0.1 ppm by weight. In some aspects, the ethylene polymers can contain, independently, less than 0.08 ppm, less than 0.05 ppm, or less than 0.03 ppm, of zirconium (or hafnium, or titanium, or vanadium, or magnesium). The amounts of these elements can be determined by ICP analysis on a PerkinElmer Optima 8300 instrument. Polymer or article samples can be ashed in a Thermolyne furnace with sulfuric acid overnight, followed by acid digestion in a HotBlock with HCl and $HNO_3$ (3:1 v:v).

Instead, the ethylene polymers typically contain from 1.5 to 6.8 ppm chromium and from 150 to 680 ppm solid oxide, such as silica (by weight). Other illustrative ranges for the chromium content of these ethylene polymers include, but are not limited to, from 1.8 to 6 ppm, from 2 to 6.8 ppm, from 2 to 6 ppm, from 2 to 5 ppm, from 2.5 to 6 ppm, from 2.5 to 5.5 ppm, from 2.5 to 5 ppm, or from 3 to 6 ppm of chromium. Other illustrative ranges for the solid oxide content of these ethylene polymers include, but are not limited to, from 180 to 600 ppm, from 200 to 680 ppm, from 200 to 600 ppm, from 200 to 500 ppm, from 250 to 600 ppm, from 250 to 550 ppm, or from 250 to 500 ppm of solid oxide. The solid oxide content—such as silica content—of the polymer is quantified by an ash test, discussed hereinbelow.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual— Process, Materials, Properties*, TAPPI Press, 1992. In some aspects of this invention, an article of manufacture can comprise any of olefin polymers (or ethylene polymers) described herein, and the article of manufacture can be or can comprise a film (e.g., a blown film), a pipe, or a blow molded product.

The products and articles of manufacture encompassed herein also can be characterized by very low levels of catalyst particle gels, typically having a gel count of less than or equal to 50 catalyst particles of greater than 100 µm per 5 grams of the product/article. For instance, the product/ article can contain less than 25 catalyst particles of greater than 100 µm per 5 grams of the product/article, and in some cases, less than 10, or less than 5, or less than 2, or less than 1 catalyst particle (of greater than 100 µm) per 5 grams of the product/article.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter ($g/cm^3$) on a compression molded sample, cooled at 15° C. per minute, and conditioned for 40 hours at room temperature in accordance with ASTM D1505 and ASTM D4703. In some cases, as noted, melt index and high load melt index were determined from viscosity data and the CY model, as described below.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of 200 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is viscosity-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—$\alpha$ (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$));
$\alpha$="breadth" parameter (CY-a parameter);

n=fixes the final power law slope, fixed at 2/11; and

ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987).

BET surface areas can be determined using the BET nitrogen adsorption method of Brunauer et al., *J. Am. Chem. Soc.*, 60, 309 (1938) as described in ASTM D1993-91. Total pore volumes can be determined in accordance with Halsey, G. D., *J. Chem. Phys.* (1948), 16, pp. 931. Pore volume distributions can be obtained from DFT calculations (see Colloids and Surfaces A: Physicochemical and Engineering Aspects, Volume 437, 20 Nov. 2013, Pages 3-32).

Solid oxide or supported chromium catalyst particle size distributions were determined by using an aqueous suspension of the solid oxide (or the supported chromium catalyst) and a Microtrac S3500 laser particle size analyzer. Conditions were set to "opaque" with a run time of 30 sec, number of measurements 3, and shape spherical. As a skilled artisan would readily recognize, supporting the chromium on the solid oxide would not impact the particle size distribution, thus the particle size distribution of the supported chromium catalyst would be effectively the same as the particle size distribution of the solid oxide. For some examples, the solid oxide was tested, while the supported chromium catalyst was tested in other examples.

Polymer particle size distributions were obtained on a dry basis with a Beckman-Coulter, model Fraunhofer RF780F LS 13 320 laser-based particle size analyzer. Conditions were set to 0.7% residual, 9.9 inches of water of vacuum, 2% of obscuration, number of passes 3, and a 23 sec run time.

In some cases, an indication of the particle size distribution of the polymer powder was obtained by weighing out 50 g of the polymer, which was then placed into a stack of Tyler 8-inch diameter, 2.75-inch deep stainless steel sieves. The polymer was introduced into the top-most sieve (with the largest holes). The stack of sieves were then clamped into a standard vibratory intermittent shaker, set to vibrate 30 sec then rest for 30 sec, alternately. This treatment was continued for 1 hour, and then the shaker was turned off. The amount of polymer remaining on each sieve was then recovered and weighed to obtain the reported particle size percentages.

Particle Size Distributions of Solid Oxides (or Supported Chromium Catalysts)

Inventive catalyst 1 was prepared using a silica-coated alumina containing 40 wt. % silica and 60 wt. % alumina, and with a surface area of 450 m$^2$/g, a pore volume of 1.2 mL/g, and a d50 average particle size (diameter) of 19.3 µm. Chromium triacetate, 1.25 g, was dissolved into 50 mL of deionized water. This solution was then added to 30 g of the silica-coated alumina powder and stirred to incipient wetness to make a wet-sand consistency. The powder was then dried overnight in a vacuum oven set at 110° C. To calcine the catalyst, about 10 g were placed in a 1.75 inch quartz tube fitted with a sintered quartz disk at the bottom. While the catalyst was supported on the disk, dry air was blown up through the disk at a linear rate of 1.6-1.8 standard cubic feet per hour. An electric furnace around the quartz tube was then turned on and the temperature was raised at the rate of 400° C./hr to a temperature of 780° C., then maintained at that temperature and fluidized for 3 hr in dry air. Afterward, the catalyst was collected and stored under dry nitrogen without exposure to the atmosphere.

Inventive catalyst 2 was prepared from a silica having a surface area of 300 m$^2$/g, a pore volume of 1.6 mL/g, and a d50 average particle size of 26.2 µm. Chromium triacetate, 30 g, was dissolved into 2 L of deionized water. This solution was then added to 650 g of the silica powder and stirred to incipient wetness to make a wet-sand consistency. The powder was then dried overnight in a vacuum oven set at 110° C. To calcine Inventive catalyst 2, a similar procedure was used as that described above, only in a larger calciner, in order to produce larger quantities of catalyst for a 23-gallon loop reactor pilot plant. First, 1.5 pounds of the catalyst was charged to a 6-inch diameter stainless steel furnace which was also heated by electric heating coils surrounding it. Dry air rose up through a sintered metal grid plate at the rate of 0.12-0.20 linear feet per second to fluidize the catalyst. The catalyst was heated up to the desired temperature, 780° C., over a period of 5 hr. It was then held at that temperature for another 6 hr, then cooled down to room temperature and stored under dry nitrogen until being used.

Inventive catalyst 3 was prepared from a silica having a surface area of 300 m$^2$/g, a pore volume of 1.6 mL/g, and a d50 average particle size of 40.5 µm. Inventive catalyst 3 was prepared and calcined similarly to that of Inventive catalyst 2.

Inventive catalyst 4 was prepared from a silica-coated alumina containing 40 wt. % silica and 60 wt. % alumina, and with a surface area of 450 m$^2$/g and a pore volume of 1.2 mL/g. The silica-coated alumina was passed through a 270 Tyler mesh sieve. That which remained on the screen was removed, whereas that which passed through the screen was captured for use. Thus, the Inventive catalyst 4 support had a d50 average particle size of 28.2 µm. Chromium triacetate, 1.25 g, was dissolved into 50 mL of deionized water. This solution was then added to 30 g of the above support powder and stirred to incipient wetness to make a wet-sand consistency. The powder was the dried overnight in a vacuum oven set at 110° C. Inventive catalyst 4 was calcined using the same procedure as for Inventive catalyst 1.

Comparative catalyst 1 was prepared from a nominal 100 µm Cr/silica catalyst having 1 wt. % Cr as the acetate, a surface area of 290 m$^2$/g, and a pore volume of 1.63 mL/g. It was passed through an 80 mesh sieve, and the remainder left on the screen was discarded. The final catalyst had a d50 average particle size of 54.9 µm. The calcination procedure for Inventive catalyst 1 was used for Comparative catalyst 1.

Comparative catalyst 2 was prepared from a silica-coated alumina containing 40 wt. % silica and 60 wt. % alumina, and with a surface area of 450 m$^2$/g, a pore volume of 1.2 mL/g, and a d50 average particle size of 44.3 microns. Chromium triacetate, 1.25 g, was dissolved into 50 mL of deionized water and combined with 30 g of the above support powder and stirred to incipient wetness to make a wet-sand consistency. The powder was the dried overnight in a vacuum oven set at 110° C. The calcination procedure for Inventive catalyst 1 was used for Comparative catalyst 2.

Comparative catalyst 3 was prepared from a nominal 80 micron silica, which had a surface area of 450 m$^2$/g, a pore volume of 1.7 mL/g, and a d50 average particle size of 76.5 microns. In a typical preparation, 1.25 g of chromium acetate was dissolved in 150 mL of methanol, then 30 g of the silica was slurried in this solution for 1 hr. The temperature of the mixture was raised to the boiling point of the methanol which caused it to boil off over another 3 hr.

Stirring was continued on the dry Cr/silica as the temperature was further raised to 180-200° C. where the powder was stirred under vacuum for 5 hr. The catalyst was cooled to room temperature and slurried in 150 mL of heptane, then 5.3 g of titanium tetraisopropropoxide was added to the heptane and the slurry was stirred another 2 hr. The temperature was raised again, causing the heptane to boil off over 3 hr, leaving the try Cr/silica-titania catalyst. The dry catalyst was further heated to 180-200° C. to remove volatiles under vacuum for another 3 hr, after which it was cooled and stored under nitrogen. The calcination procedure for Inventive catalyst 1 was used for Comparative catalyst 3, except that the hold temperature was 650° C.

Comparative catalyst 4 was a Cr/silica-titania catalyst obtained from W.R. Grace containing 1 wt. % Cr and 2.5 wt. % Ti, with a surface area of 530 $m^2$/g, a pore volume of 2.6 mL/g, and a d50 average particle size of 133.6 microns. The calcination procedure for Inventive catalyst 1 was used for Comparative catalyst 4, except that the hold temperature was 650° C.

Comparative catalyst 5 was a Cr/silica catalyst from PQ Corporation containing 1 wt. % Cr, and with a surface area of 310 $m^2$/g, a pore volume of 1.6 mL/g, and a d50 average particle size of 118.2 microns. The calcination procedure for Inventive catalyst 2 was used for Comparative catalyst 5.

Comparative catalyst 6 was a Cr/silica catalyst from PQ Corporation containing 1 wt. % Cr, and with a surface area of 308 $m^2$/g, a pore volume of 1.5 mL/g, and a d50 average particle size of 50.6 microns. The calcination procedure for Inventive catalyst 2 was used for Comparative catalyst 6.

Comparative catalyst 7 was a Cr/silica catalyst from W.R. Grace containing 1 wt. % Cr, and with a surface area of 285 $m^2$/g, a pore volume of 1.65 mL/g, and a d50 average particle size of 77.2 microns. The calcination procedure for Inventive catalyst 2 was used for Comparative catalyst 7.

Comparative catalyst 8 was a Cr/fluorided silica-alumina catalyst containing 13% alumina and having a surface area of 400 $m^2$/g and an average particle size of 76 µm. It was calcined for 8 hr at 600° C. Comparative catalyst 8 contained 1 wt. % Cr, impregnated from aqueous chromium triacetate, and 2 wt. % F, impregnated simultaneously using ammonium hexafluorosilicate.

Comparative catalyst 9 was made according to U.S. Pat. No. 6,716,938. The catalyst contained 1 wt. % Cr, 20 wt. % magnesia, and 3.2 wt. % Ti. It was calcined for 8 hr at 600° C. Comparative catalyst 9 had a surface area of 810 $m^2$/g, a pore volume of 1.5 mL/g, and an average particle size of 133 µm. It was run with 4 ppm of triethylboron co-catalyst.

Figure 2:
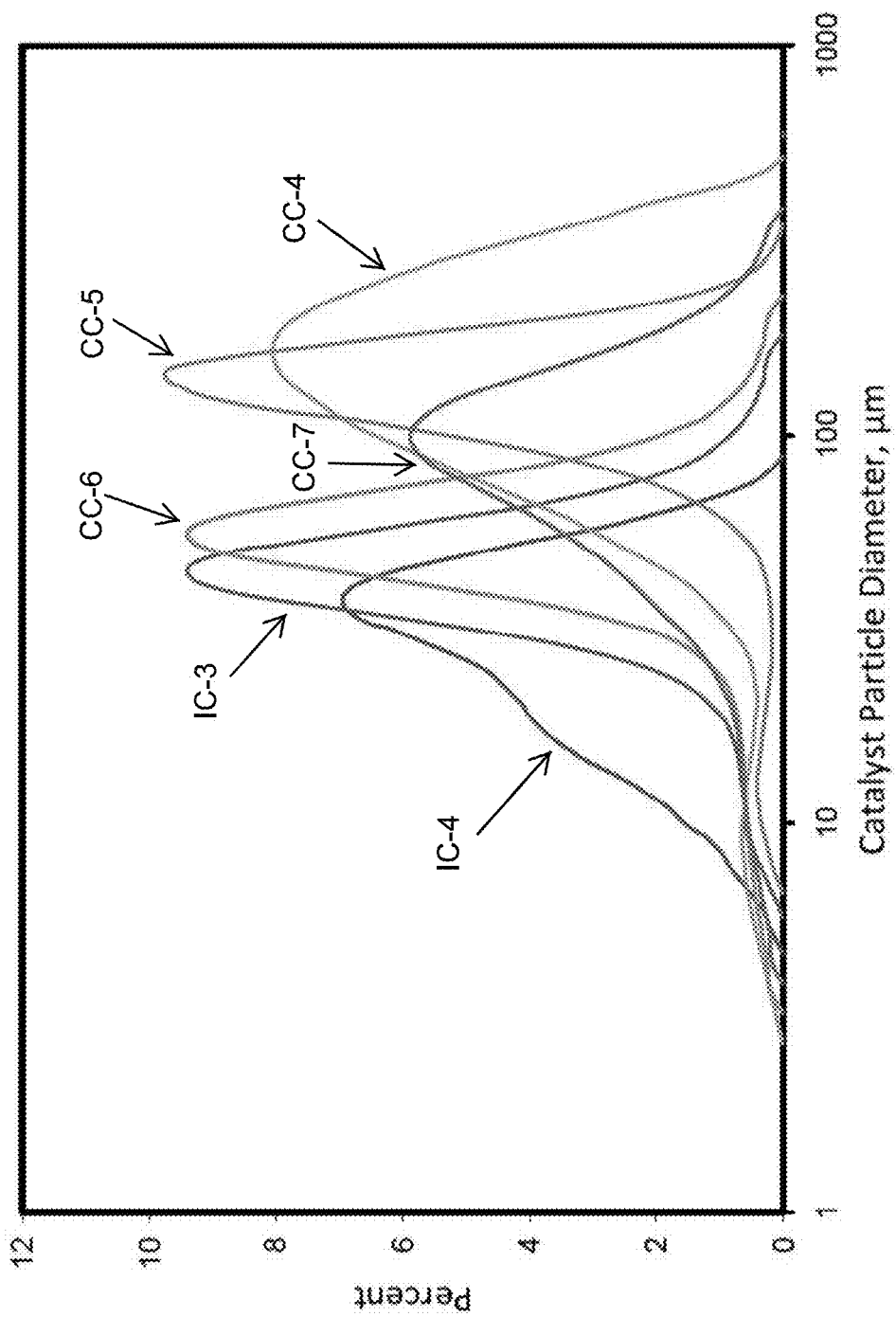
FIG. 2 presents a plot of the particle size distributions of Inventive chromium catalysts IC-3 and IC-4, and Comparative chromium catalysts CC-4, CC-5, CC-6, and CC-7.

FIGS. 1-2 illustrate the particle size distributions of these four inventive and seven comparative solid oxides or their resultant catalysts (percent of solid oxide or catalyst by weight versus the particle diameter plotted on a log-scale). Table 1 summarizes various parameters calculated from the particle size distributions of these catalysts. Less than 3 wt. % of Inventive catalysts IC-1 through IC-4 had a particle size greater than 100 µm. Less than 5 wt. % of the Inventive catalysts IC-1 through IC-4 had a particle size less than 10 µm, and the particle size span ((d90−d10)/d50) values were in the 0.8-1.4 range. Inventive catalysts IC-1 through IC-4 also had a d50 average particle size in the 19-41 µm range, a ratio of d80/d20 from 1.6 to 2.7, a d10 particle size in the 12-17 µm range, a d95 particle size in the 30-80 µm range, and with less than 6 wt. % having a particle size greater than 75 µm and less than 20 wt. % having a particle size less than 15 µm. In terms of the number of particles per gram of the solid oxide, Inventive catalysts IC-1 and IC-2 had effectively no particles (less than 1) per gram of the catalyst with a particle size greater than 150 µm and with a particle size greater than 100 µm.

When these supported chromium catalysts are used to polymerize ethylene, most of the catalyst particles are broken or disintegrated into imperceptibly small fragments that are dispersed in the final article, causing no problems, especially in thin film products. However, depending on the polymerization conditions, some catalyst particles can be ejected from the reactor before becoming active and thus before being disintegrated by polymerization. These non-fragmented catalyst particles can result in visual imperfections on the surface of the final product or article, usually called "gels" or "hard gels" or "catalyst gels," and film grades are especially sensitive to this issue (notably, such catalyst particle gels also can create noticeable defects on the surfaces of thick parts, resulting in poor surface aesthetics of the final product or article, and such surface roughness also can interfere with printing operations). Consequently, polymer film grades typically have a rigid manufacturing specification on gels greater than 200 microns in diameter. During manufacture of the polymer, the number of gels produced is automatically measured by an in-line camera, specially designed to count the gels greater than 200 microns in size.

Note that the observed gel-count thus measured can result from many causes other than catalyst particles, including contamination from foreign material, or other polymer particles, or additive particles, for example. The purpose of the present invention is to describe methods, catalysts, polymers, and articles/products that minimize gels derived specifically from catalyst particles.

Figure 3:
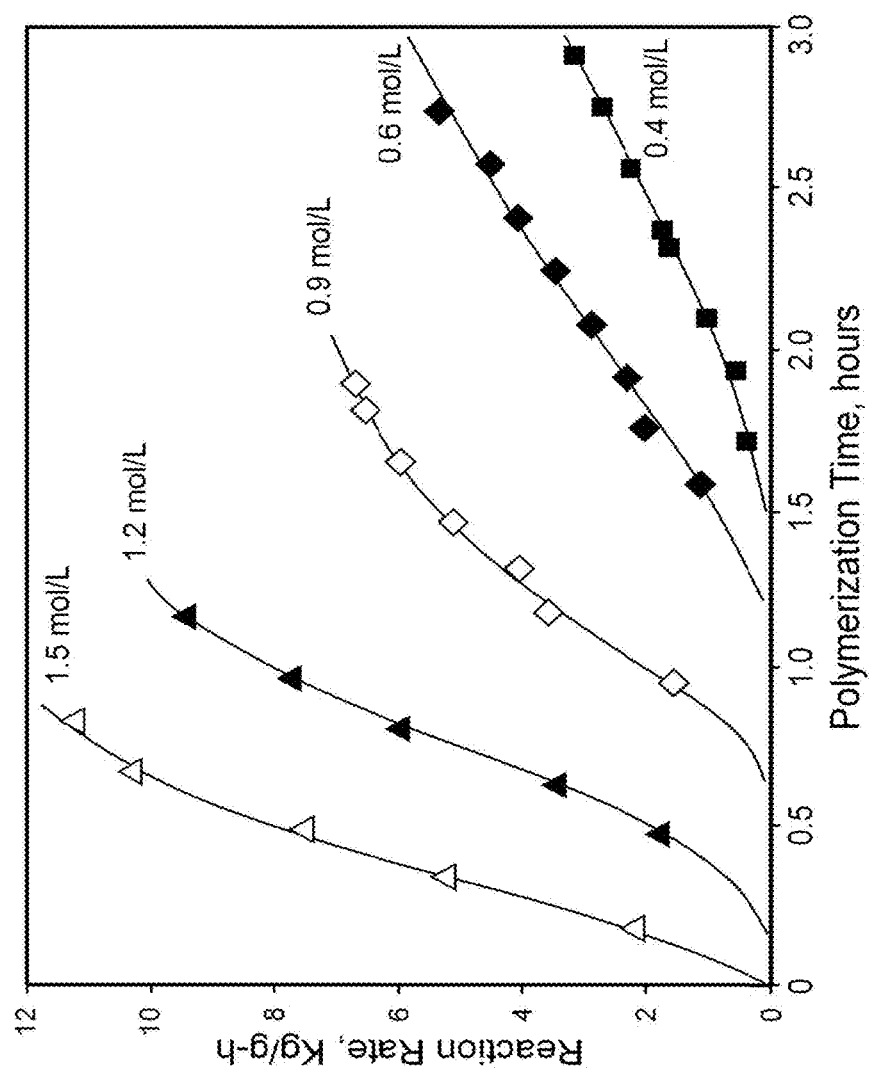
FIG. 3 presents a plot of the catalyst induction time and polymerization rate at different ethylene concentrations (mol/L) at 105° C.

FIG. 3 illustrates, in ethylene polymerization reactions, the relationship between ethylene concentration, catalyst induction time, and polymerization rate at a polymerization temperature of 105° C. for supported chromium/silica catalysts. From this relationship, it is possible to calculate the number of catalyst particles exiting the reactor intact (not fragmented). It is from these particles (over a certain size) that catalyst gels are derived. That is, with this information, and the starting particle size distribution of the catalyst (FIGS. 1-2), it is then possible to "model" the catalyst gel-count under a wide variety of reaction conditions. This is how the gel-count data in Table 2 was calculated for each of the inventive and comparative catalysts, while polymerizing ethylene under a variety of reaction conditions, including variations in the ethylene concentration, induction time, residence time, and catalyst productivity. It was observed by microscopic examination, that when chromium catalysts are used to make polymers, and when the polymer is converted into film, catalyst particles larger than a certain size can cause these "catalyst gels" or visual imperfections. Typically, in a 25 micron thick film, these gels appear to be approximately twice the diameter of the encapsulated catalyst particles. Thus, a 100 µm diameter catalyst particle will typically result in a 200 µm diameter film gel, which is sometimes called the "lens effect." This is how the gel-count was calculated in the model described above and in other subsequent data presented below.

Table 2 shows the effect of varying reaction conditions and varying catalyst types on the calculated film gel count of varying size gels, that is, from unfragmented catalyst particles (hard gels). The particle size distribution plays a surprisingly major role in determining this gel-count. Unexpectedly, under a wide range of operating conditions, Inventive catalysts 1, 2, and 4 (labeled IC-1, IC-2 and IC-4) resulted in effectively no catalyst gels in the film of greater than 200 μm per ft² of 25 micron film, that is, from the gels being caused by catalyst particles of 100 μm or more. Inventive catalyst IC-3 also performed surprisingly well, with at most 18 film gels of greater than 200 μm per ft² of 25 micron film (with the gels being caused by catalyst particles of 100 μm diameter or larger) over the same wide range of operating conditions.

Using the same data in Table 2 across the wide range of operating conditions, the catalyst particle gel count per 5 grams of the ethylene polymer (or per 5 grams of the downstream product or article formed from the polymer) also can be calculated. Inventive catalyst IC-3 resulted in from 2 to 18 catalyst particles of 100 μm or greater per ft² of 25 micron film, and using a nominal 0.945 density, this translates to a hard gel count range of approximately 4 to 41 catalyst particles of greater than of 100 μm per 5 grams of the ethylene polymer. Inventive catalysts IC-1, IC-2 and IC-4 would have less than 2 catalyst particles, and more likely less than 1 catalyst particle, of greater than of 100 μm per 5 grams of the ethylene polymer.

Figure 4:
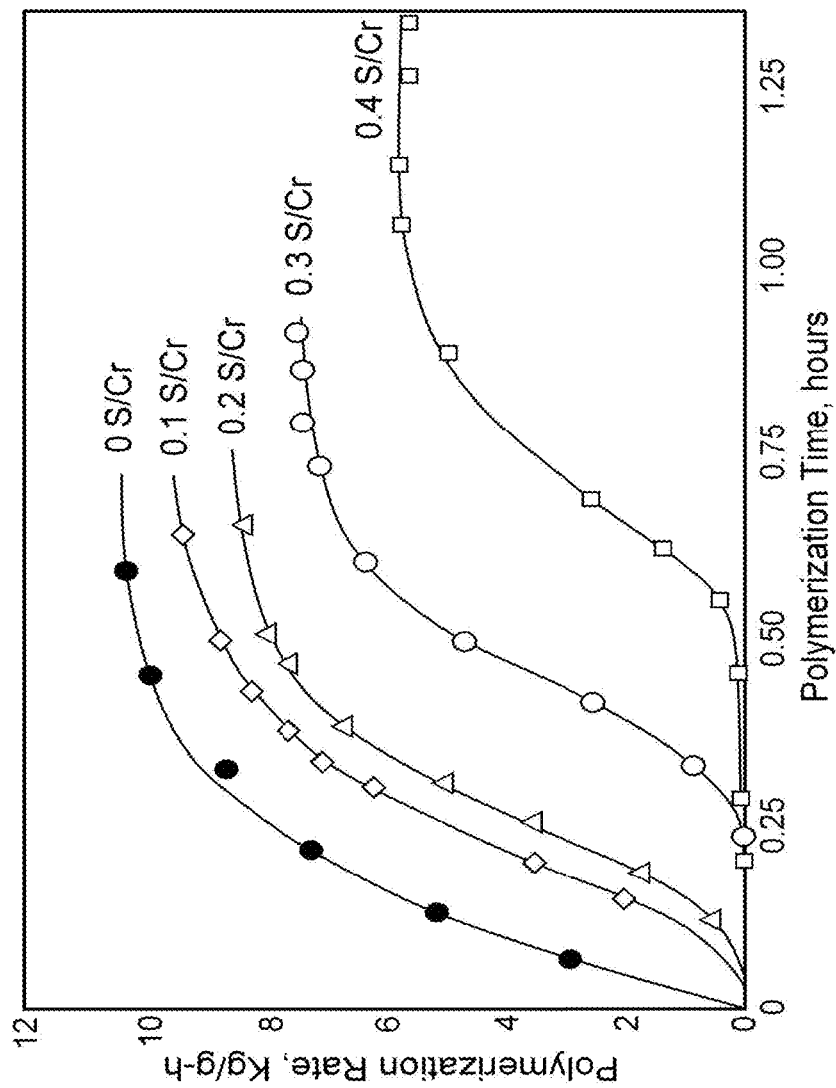
FIG. 4 presents a plot of the catalyst induction time and polymerization rate in the presence of different diethyl sulfide poison concentrations (sulfur/chromium molar ratio) at 105° C.

There are many polar or Lewis base compounds that, if inadvertently introduced into the reactor, even in ppm quantities, can bind to the chromium and inhibit the polymerization, such as oxygen, water, nitrogen compounds, and sulfur compounds. Consequently these compounds are called reaction "poisons." In FIG. 4, varying amounts of an organic sulfide poison (a particularly strong one) are deliberately added to the reactor to illustrate the relationship between poison concentration in the feedstock, catalyst induction time, and polymerization rate at a polymerization temperature of 105° C. for supported chromium/silica catalysts. This was done to reproduce the effect of unintended poisons on catalyst gel-count in normal manufacturing. Thus, increasing the amount of poison relative to the amount of chromium was found to increase the catalyst induction time, and therefore, the amount of gels should also increase correspondingly. From this relationship, the data in Table 3 was calculated from ethylene concentration, poison level, induction time, residence time, and catalyst productivity. Similar to Table 2, Table 3 shows the impact of the calculated film gel count—from large unfragmented catalyst particles (hard gels)—based on the particle size distribution of the catalyst (Inventive catalysts IC-1 through IC-4 and Comparative catalysts CC-1 through CC-7) and the reaction conditions, including the impact of the poison level. Unexpectedly, under a wide range of operating conditions, and regardless of poison level, Inventive catalyst examples IC-1, IC-2, and IC-4 resulted in effectively no film gels of greater than 200 μm per ft² of 25 micron film, with the gels being caused by catalyst particles of 100 μm or more. Inventive catalyst IC-3 also performed surprisingly well, with at most 50 film gels of greater than 200 μm per ft² of 25 micron film (with the gels being caused by catalyst particles of 100 μm diameter or more) over the same wide range of operating conditions.

Ethylene Polymers and Particle Size Distributions of Polymer Powders

Figure 5:
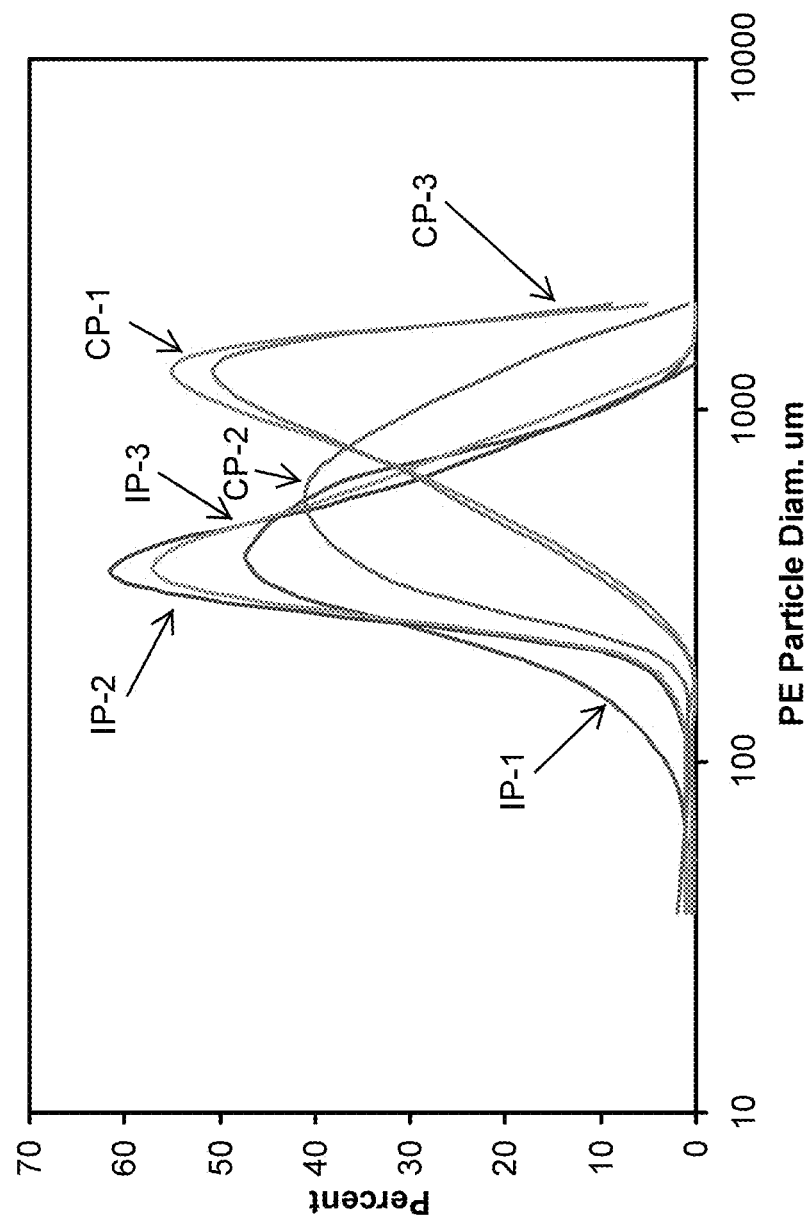
FIG. 5 presents a plot of the particle size distributions from sieve data of Inventive polymer powders IP-1, IP-2, and IP-3, and Comparative polymer powders CP-1, CP-2, and CP-3.

The supported chromium catalysts of Inventive examples IC-1, IC-2, and IC-3 and Comparative catalyst examples CC-5, CC-6, and CC-7 were used to produce polymer powders, which are labeled in Table 4 as Inventive polymers IP-1, IP-2, and IP-3 and Comparative polymers CP-1, CP-2, and CP-3, respectively. Some of this data is also illustrated graphically in FIG. 5 (based on mesh sieve data). Pilot scale polymerizations were conducted using a 30-gallon slurry loop reactor at a production rate of 30-33 pounds of polymer per hour. Polymerizations were carried out under continuous particle form process conditions in a loop reactor (also referred to as a slurry process) by contacting the supported chromium catalyst with ethylene and 1-hexene in isobutane to produce a nominal ~30-35 HLMI and nominal ~0.952-0.956 density ethylene copolymer. Reactor conditions included a reactor pressure of 600 psig, a mol % ethylene of 4-7 wt. % (based on isobutane diluent), a 1-hexene content of 0.4-0.8 mol % (based on isobutane diluent), 0.5-0.8 lb of hydrogen per 1000 lb of ethylene, and a polymerization temperature of 105° C. The reactor was operated to have a residence time of 75 min. The supported chromium catalyst was fed to the reactor at the rate of 4-9 g per hour.

Inventive polymers IP-1 to IP-3 in Table 4 had a higher bulk density and could be run at higher solids, which can translate to increased rates. Also beneficially, less than 1 wt. % of the powder composition was on the 10 mesh sieve, less than 3 wt. % of the powder composition was on the 20 mesh sieve, and less than 2 wt. % of the powder composition passed thru the 200 mesh sieve for Inventive polymers IP-1 to IP-3, which based on the mesh sieve data, had an average polymer particle size in the 300 to 500 μm range.

Table 5 shows how the measured mean polymer particle size compares to that calculated from the average catalyst size and the known productivity. Note that there is good agreement for this set of data, which means that under these conditions, and making this high molecular weight polymer in a loop reactor, that the polymer does not break up very much from mechanical shear, wall collisions, and other stirring forces. Therefore, the polymer particle size distribution can be calculated from the parent catalyst particle size distribution. This is especially true for a batch reactor, because all particles have the same residence time in the reactor.

Figure 6:
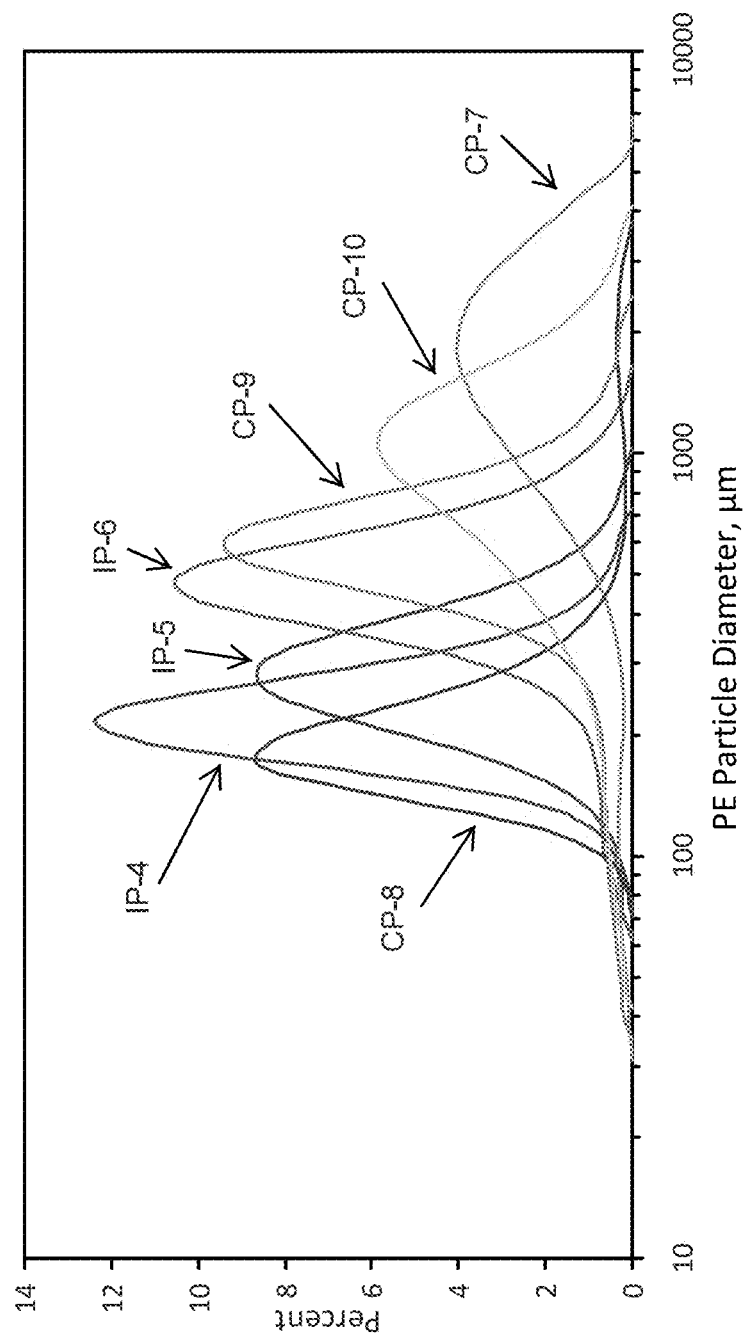
FIG. 6 presents a plot of the particle size distributions of Inventive polymer powders IP-4, IP-5, and IP-6, and Comparative polymer powders CP-7, CP-8, CP-9, and CP-10.
Figure 7:
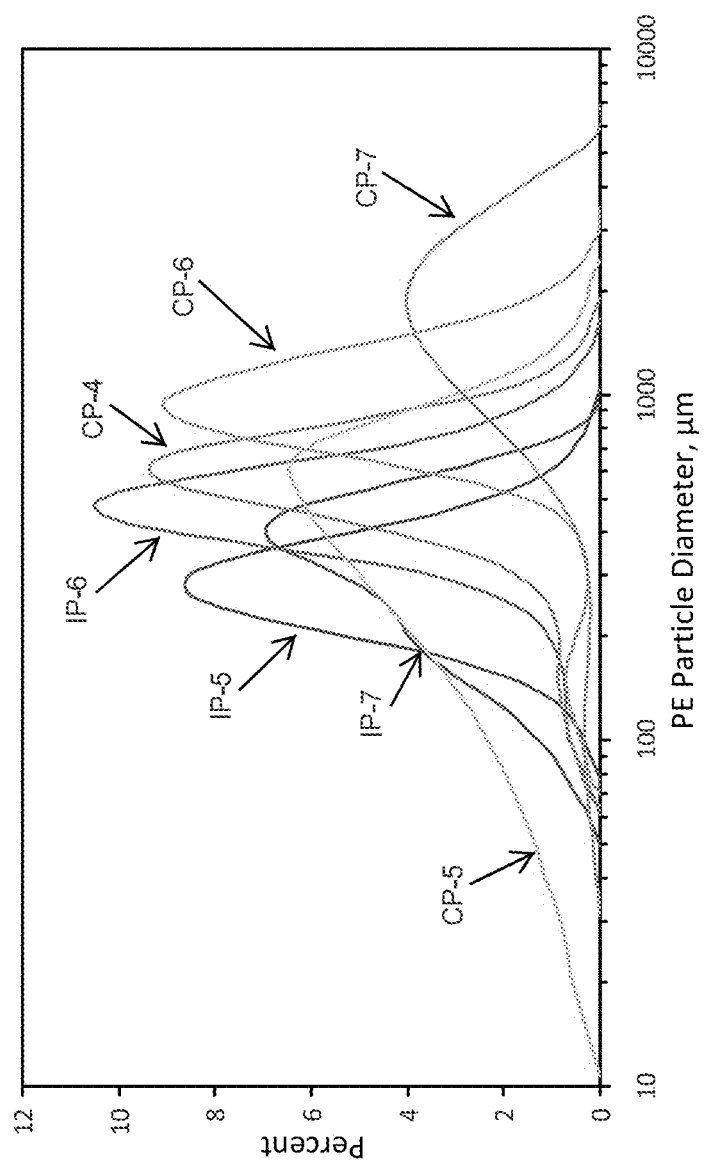
FIG. 7 presents a plot of the particle size distributions of Inventive polymer powders IP-5, IP-6 and IP-7, and Comparative polymer powders CP-4, CP-5, CP-6, and CP-7.

Table 6 shows the calculated particle size parameters for polymer fluff or powder compositions produced using the Inventive catalysts IC-1 through IC-4 and Comparative catalysts CC-1 through CC-7 in a batch reactor under conditions of minimal particle break-up and a 2400 g/g catalyst productivity. The corresponding polymer numbers are also shown in Table 6 as IP-4 though IP-7 and CP-4 through CP-10. FIGS. 6-7 show the polymer particle size distributions for inventive polymer examples IP-4 to IP-7 and Comparative polymer examples CP-4 to CP-10 are very similar to those of the parent catalyst size distributions, only shifted to larger sizes (see FIGS. 1-2).

Advantageously, in Table 6, less than 5 wt. % of the compositions of Inventive polymers IP-4 through IP-7 have a particle size less than 100 μm, and less than 3 wt. % of these polymers have a particle size greater than 1000 μm. The polymer fluff compositions of IP-4 to IP-7 also have a particle size span ((d90–d10)/d50) from 0.8 to 1.3 and a d50 average particle size is the 200 to 450 μm range.

Table 7 summarizes polymerization conditions for ethylene copolymers produced using Inventive catalysts IC-1 and IC-2 and Comparative catalysts CC-5, CC-6, and CC-7 in a continuous loop reactor. Unlike in Table 6, there is a residence time distribution associated with a continuous reactor, and therefore the particle size distributions of these polymer powders or fluff compositions are a little broader than those in Table 6, which reflect that variable. Table 8 summarizes the polymer properties of the polymers produced in Table 7. The bulk polymer properties, such as CY-a parameter and relaxation time, are similar between the comparative polymer examples and the inventive polymer examples. The polymer particle size distribution, however, differed significantly between these examples, as shown in Table 9. Beneficially, less than 1 wt. % of the inventive polymer powder compositions (IP-8 through IP-12) was on the 10 mesh sieve, less than 6 wt. % of the powder composition was on the 20 mesh sieve, and less than 4 wt. % of the powder composition passed thru the 200 mesh sieve. Based on the mesh sieve data, these same inventive polymers had an average polymer particle size in the 400 to 550 µm range.

Similar to Tables 7-9, Table 10 shows some high density copolymers made with various inventive and comparative catalysts in a continuous loop reactor. These polymers are prone to break-up under the high agitation and mixing with the loop reactor system, and breakage often produces fines which cause transfer problems downstream. Table 10 compares the mean particle size of such polymers to the theoretical mean calculated from the mean catalyst particle size. By comparing the two numbers, one can estimate the degree of polymer particle breakage. Unexpectedly, the comparative polymers exhibit considerable breakage, reducing the mean size to less than half of what was theoretically expected, whereas the inventive polymers did not exhibit much, if any, break-up. This is an indication that the larger polymer particles are more prone to breakage, especially higher density PE, and that many of the polymer fines originate from the break-up of large polymer particles instead of small polymer particles.

Table 11 demonstrates that the type of polymer made is dependent on the particle size of the catalyst. In this example, Comparative catalyst CC-4 was sieved into three fractions as shown in Table 11, and each of these three fractions was tested for polymerization activity, along with the original composite catalyst, at the same polymerization conditions. Unexpectedly, the larger catalyst particles incorporated more hexene, which lowers the density. Thus, there was a large spread in density between polymers made by these three catalyst fractions. The melt index, HLMI, and ratio of HLMI/MI also varied over a large range, based on the catalyst particle size. Consequently, a narrower catalyst particle size distribution also produces a more homogeneous polymer.

In another example, polymer was made with Comparative catalyst CC-4 in a continuous loop reactor, and the resulting polymer powder was then sieved into three fractions, as summarized in Table 12. Since large catalyst particles make large polymer particles, the heterogeneity of the polymer powder therefore reflects the size distribution of the original catalyst. Thus, the properties of the three polymer fractions were again found to vary with the particle size of the polymer powder. The overall composite polymer, by definition, must be more diverse than any of its sieved components.

Table 13 shows still another example of polymer heterogeneity derived from a continuous reactor. Four polymers were made in a continuous loop reactor, using four different catalysts. CP-38 and CP-40 were made using the CC-8 catalyst, CP-39 was made using the CC-4 catalyst, and CP-41 was made using the CC-9 catalyst. These polymers were then sieved into multiple fractions as shown in Table 13. Each fraction was then tested for their molecular weight properties, and as tabulated in Table 13.

Surprisingly, polymer Mw and Mn varied widely with the particle size of the polymer powder, and the bulk powder Mw/Mn is larger when compared to the sieve fraction with the similar Mw. The polymer heterogeneity reflects the heterogeneity of the catalyst particle size. Thus, the polymer heterogeneity reflects the size heterogeneity of the catalyst, and narrower fractions result in greater polymer homogeneity. This means that a narrow catalyst size distribution is greatly preferred, as in the invention catalysts described herein.

In Table 14, five commercial polymer powders, of varying density and melt index, were made with two Cr/silica catalysts. CP-42 and CP-43 were made using catalyst CC-7, whereas CP-44 through CP-46 were made using the CC-4 catalyst, all in a continuous loop reactor. These polymers were sieved into eight fractions, and then the fractions were analyzed for short chain branch (SCB) content and number-average molecular weight (Mn) using C-13 NMR spectroscopy. Both Mn and the number of SCBs were found to vary with the polymer particle size. Although one of the fractions can approximate the parent in terms of branches and Mn, that fraction will always be more homogeneous and narrower than the parent. This again highlights the advantage of using a catalyst with a narrow particle size distribution.

Table 11 shows the relationship between catalyst particle size and various polymer properties that result, such as the density, for a given type of polymer and reaction conditions. This relationship can then be expressed mathematically, by plotting the experimental data to obtain a curve fit, such as density as a function of catalyst particle diameter, or HLMI as a function of catalyst particle diameter. The relationship between catalyst particle size and other polymer properties can be expressed in the same way, including melt index, HLMI, catalyst productivity (or the catalyst content in the polymer), density, SCBs, etc. When these mathematical relationships have been derived, it is then not difficult to apply these relationships to the known particle size distributions of other catalysts, to determine the differences that should be obtained from the differing catalyst types. This has been done in Tables 15 and 16, where the statistical description is listed of the distributions of these polymer properties (MI, HLMI, Mw, density, etc.) as a function of polymer particle diameter.

Figure 8:
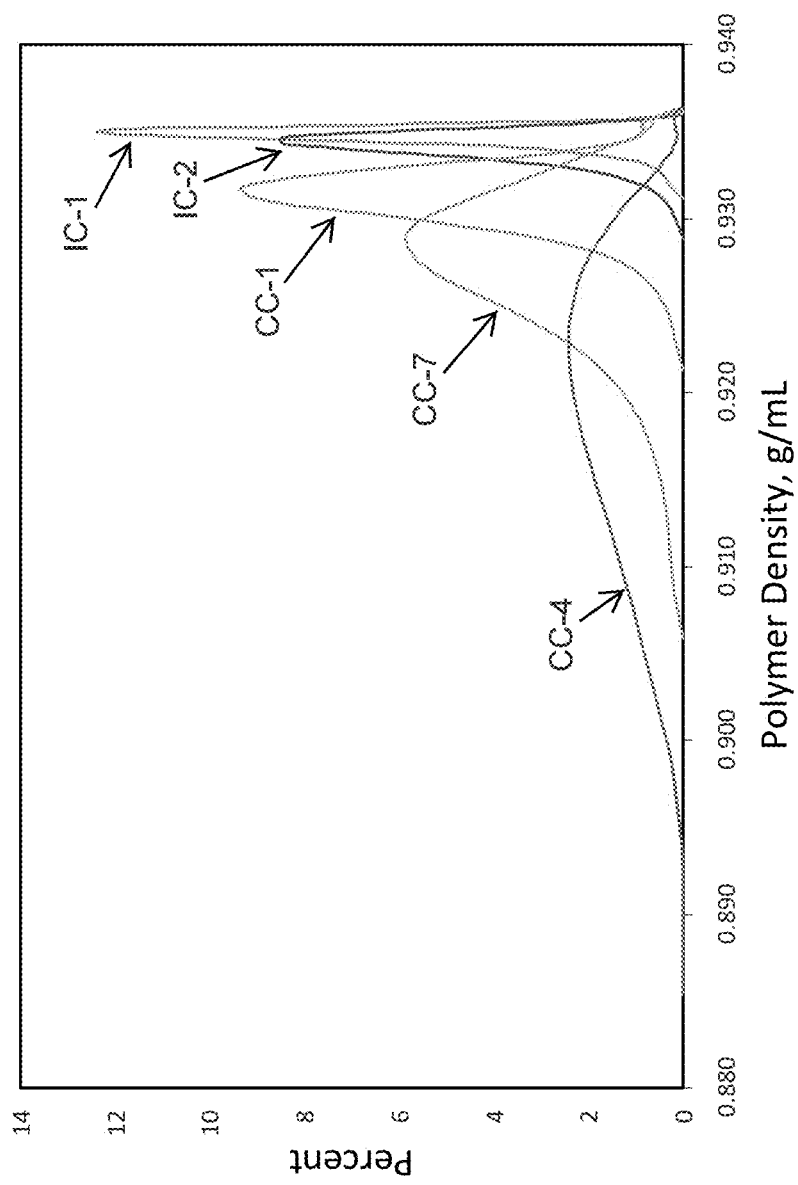
FIG. 8 presents a plot of the calculated density distribution of the polymer powders produced from the Inventive catalysts IC-1 and IC-2, and from Comparative chromium catalysts CC-1, CC-4, and CC-7.

These distributions described in Table 15 can also be shown graphically, as illustrated below. Thus, these relationships were applied to inventive catalysts IC-1 through IC-4 and to comparative catalysts CC-1 through CC-7 and a distribution of the resultant polymer density, for example, can be plotted. An example of this is shown in FIG. 8, where the properties of polymer particles calculated from each catalyst particle are distributed according to their density. Notice how much the density can vary between polymer particles, all produced by a single catalyst. Sometimes there is an even greater diversity between polymer particles within a single parent polymer, than there is between parent polymers from the different catalysts. For example, notice how broad of a density distribution results from comparative catalyst CC-4. Conversely, notice how narrow the density distribution is resulting from inventive catalysts IC-1 and IC-2. Thus, it is highly advantageous to produce a polymer powder that has a narrow distribution of particle densities. This greatly helps prevent swelling of some of the polymer due to solvation during reaction, which causes plugging and fouling of the reactor. Since the density from CC-4 in FIG. 8 extends even down to 0.90, these polymer particles will understandably be much more prone to swelling, dissolving, melting, etc., to cause reactor and downstream problems.

Figure 9:
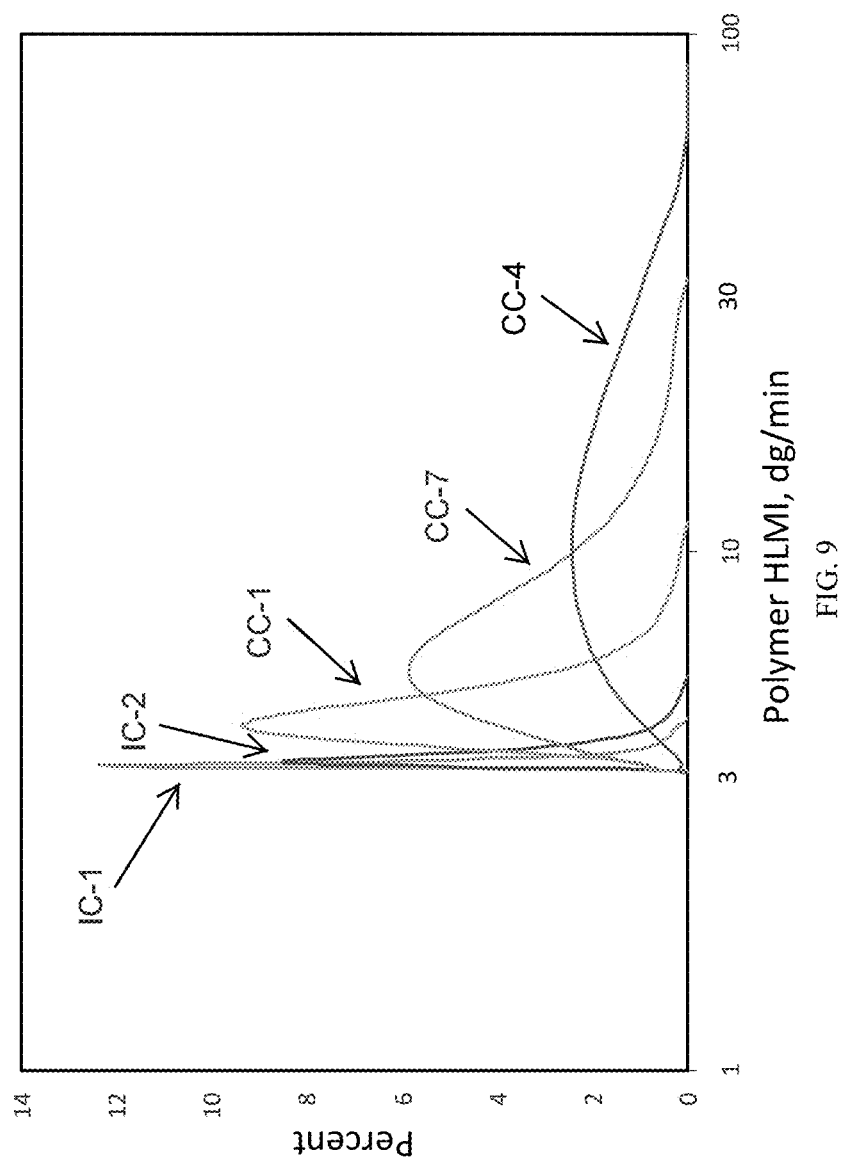
FIG. 9 presents a plot of the calculated HLMI distribution of the polymer powders produced from the Inventive catalysts IC-1 and IC-2, and from Comparative chromium catalysts CC-1, CC-4, and CC-7.

Similar conclusions also can be made for other polymer properties. In general, it is preferred for all of the polymer particles being formed to have the same, or at least approximately the same, composition, for a host of reasons. FIG. 9 shows another example; the HLMI distribution of particles is shown, calculated in a similar way from the various catalysts. Once again, comparative catalyst CC-4 produces the broadest HLMI variation, and inventive catalysts IC-1 and IC-2 produce the least variation in HLMI between polymer particles.

Once the density or HLMI or other distribution of the polymer particles has been calculated, so also can its mean, range, span, d50, etc., be obtained. These derivative parameters of the distributions are listed in Tables 15 and 16. Down Table 15 are listed four polymer properties (productivity, ppm solid oxide from the catalyst, melt index, HLMI, and density) which vary by polymer particle size. Across the table are these functions calculated for all of the inventive catalysts (IC-1 through IC-4) and all of the comparative catalysts (CC-1 through CC-7).

In Table 15, the mean productivity for all 11 catalysts is very similar, but surprisingly the standard deviation of the particle's productivity varies widely, as well as the standard deviation over the mean, the productivity range, and the span (range/mean). The inventive catalysts produce much narrower breadth values than the comparative catalysts, indicating that the composition of the inventive polymers, with respect to productivity, is much more homogeneous than the comparative polymers.

The same conclusion also can be made for other polymer properties, including the solid oxide content (which is inversely related to the productivity), the melt index, the high load melt index, and the density. Again, the inventive polymers, for each of these polymer properties, produce much lower values, indicating a much more homogeneous polymer. Table 16 lists the results of similar calculations made from measured C-13 NMR data showing SCB content by particle size, in the production of five different commercial polymers. This NMR data has then been used to determine the actual relationship between polymer particle density and polymer particle diameter for these five polymer grades. This relationship has then been extended to calculate the distribution of short-chain branching expected from the inventive catalysts. The statistical parameters listed in Table 16 are a way of describing the breadth of these distributions. Since the relevant property in this calculation is short chain branching, obviously the magnitude of this particular advantage varies with the total amount of SCB incorporated for each particular polymer grade. Notice that the lowest density polymer exhibits the greatest diversity for all catalysts. However, once again, and for each polymer type, we see that the inventive catalysts offer the greatest advantage in terms of having a much more homogeneous distribution of compositions and properties.

Gels Versus Catalyst Productivity

Referring again to FIG. 3 and FIG. 4, it is clear why the gel count is related to the productivity of the catalyst, that is, the yield of polymer per unit of catalyst. In general, any variable that raises the productivity of the catalyst, such as higher ethylene concentration, or higher temperature, also tends to decrease the induction time, which in turn lowers the number of unfragmented catalyst particles exiting the reactor. Alternatively, variables that tend to diminish the catalyst productivity, such as poisons or lower temperature, tend to increase the induction time, and allow more un-initiated (intact) catalyst particles to exit the reactor per unit of polymer produced. The reactor residence time also plays a role, because shorter residence time tends to accelerate the rate of catalyst particles exiting the reactor. These correlations are also evident from Tables 2 and 3.

Figure 10:
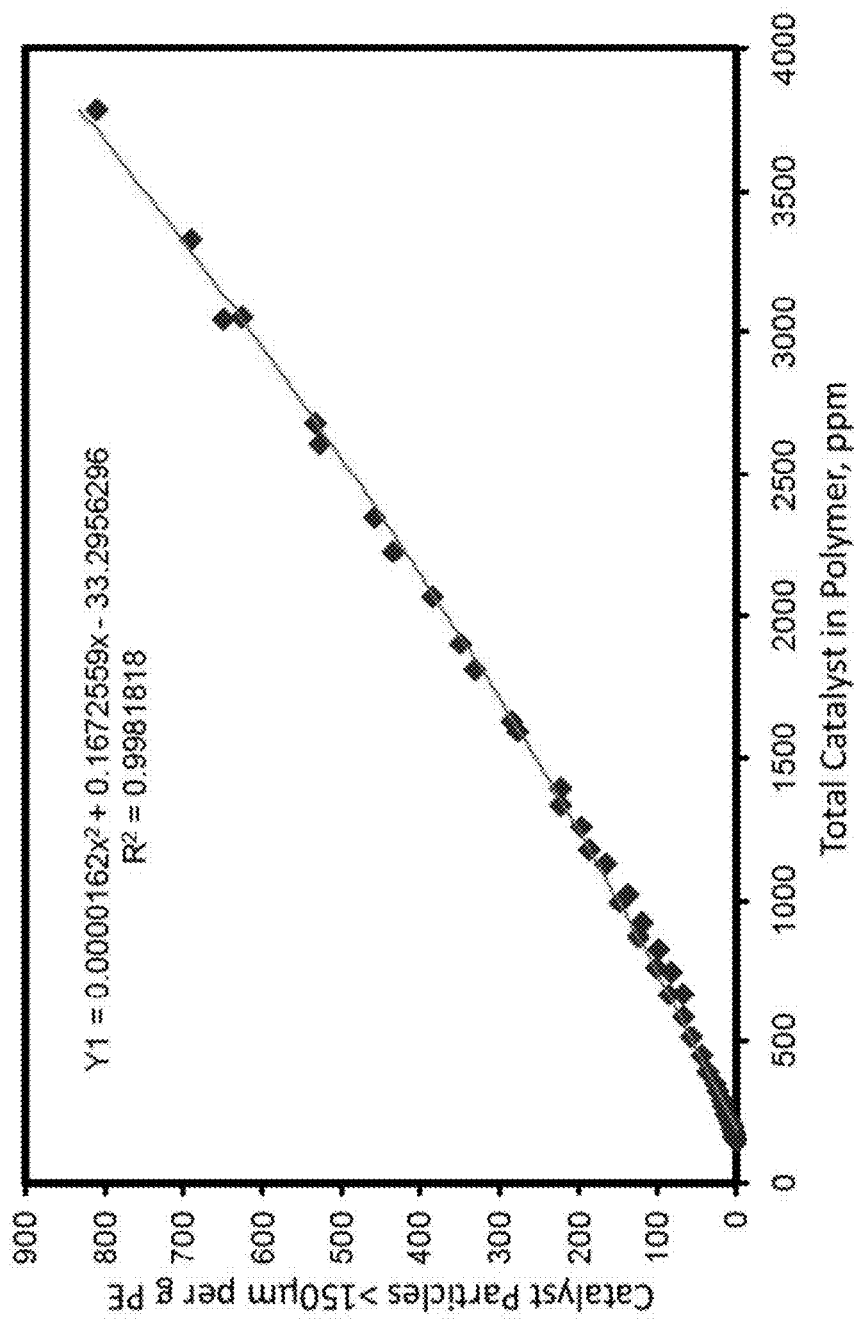
FIG. 10 presents a plot of the catalyst particles of greater than 150 µm per gram of ethylene polymer versus the ppm of catalyst in the ethylene polymer.

FIG. 10 illustrates this by plotting the gel levels of some of the polymers in these tables against the amount of catalyst residue (often referred to as "ash") in the polymer, which is inversely related to the productivity. The points on the graph indicate the expected gel-counts of polymers made using Comparative catalyst CC-4 under a wide assortment of reaction conditions, in which the residence time, temperature, and ethylene concentration were varied widely. FIG. 10 plots the number of catalyst particles in a gram of polymer that are larger than 150 micron diameter. These values are plotted against the total amount of catalyst residue left in the polymer (fragmented or not). A curved line is obtained by fitting the points, which has the following formula:

$$Y1 = 0.0000162x^2 + 0.1672559x - 33.2956296;\ \text{where:}$$

Y1 is the number of catalyst particles of >150 μm per gram of polymer, and x is the ppm by weight of catalyst remaining in the polymer.

Advantageously, if the inventive polymers in Tables 2 and 3 are plotted in FIG. 10, they all lie far below the Y1 line, and usually near zero.

Another correlation using Comparative catalyst CC-4 similar to FIG. 10 can be made for the film gel count of Y1 catalyst particle gels per ft$^2$ of 25 micron thick film, wherein film gels are of a size greater than 200 μm caused by 100+ μm catalyst particles, and this correlation is $Y1 = -1.09E+12x^3 + 1.877E+09x^2 - 3.569E+05x + 65.5$, wherein x is the weight fraction of ash (catalyst residue) in the ethylene polymer. The inventive polymers in Tables 2 and 3 have lower gels than that predicted by this equation for Y1 based on the CC-4 catalyst.

Figure 11:
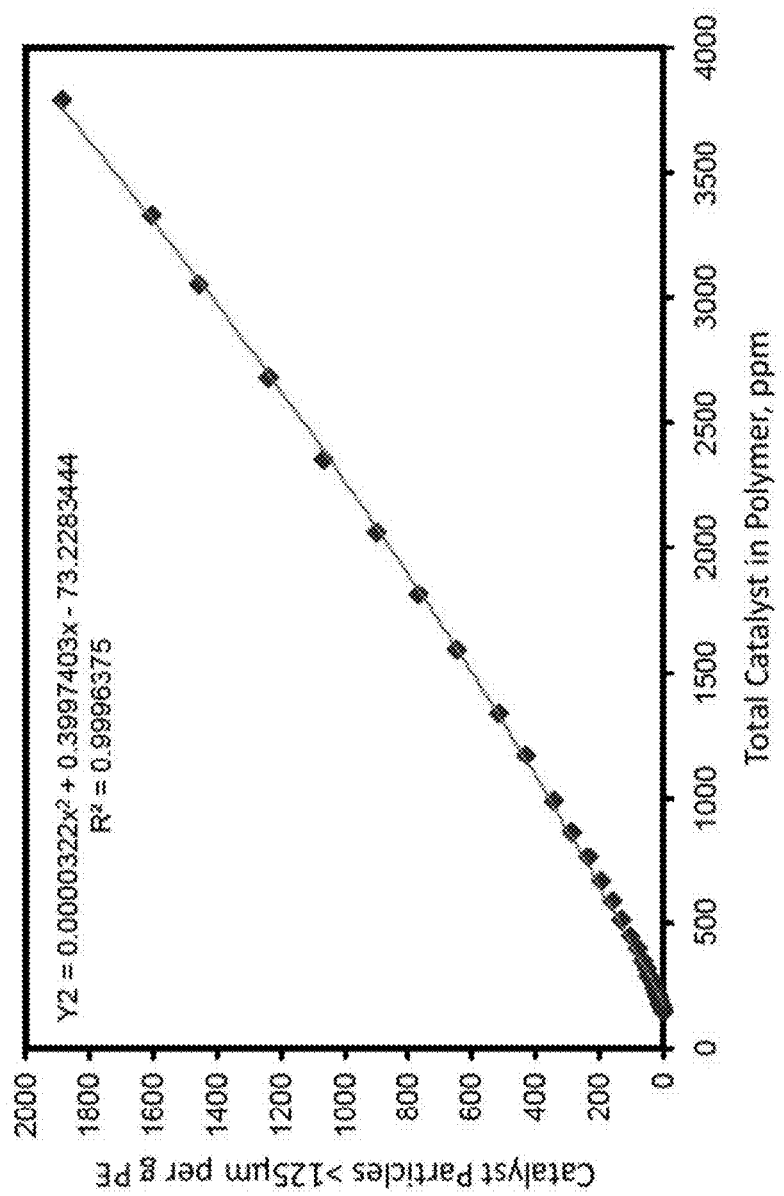
FIG. 11 presents a plot of the catalyst particles of greater than 125 µm per gram of ethylene polymer versus the ppm of catalyst in the ethylene polymer.

FIG. 11 is a similar to FIG. 10, however, the points in this graph indicate the number of unfragmented catalyst particles that are larger than 125 microns, measured in a variety of polymers. Once again, the catalyst used to make these polymers was Comparative catalyst CC-4 from a variety of different reaction conditions, and the gel count was measured as catalyst particles per gram of polymer. This value is then plotted against the total amount of all catalyst left in the polymer, in ppm by weight, whether fragmented or not. Once again the points were fit to a curve which is defined by:

$$Y2 = 0.0000322x^2 + 0.3997403x - 73.2283444;\ \text{where:}$$

Y2 is the number of catalyst particles of >125 μm per gram of polymer, and x is the ppm by weight of all catalyst remaining in the polymer.

Advantageously, if the inventive polymers in Tables 2 and 3 are plotted in FIG. 11, they all lie far below the Y2 line, and usually near zero.

Figure 12:
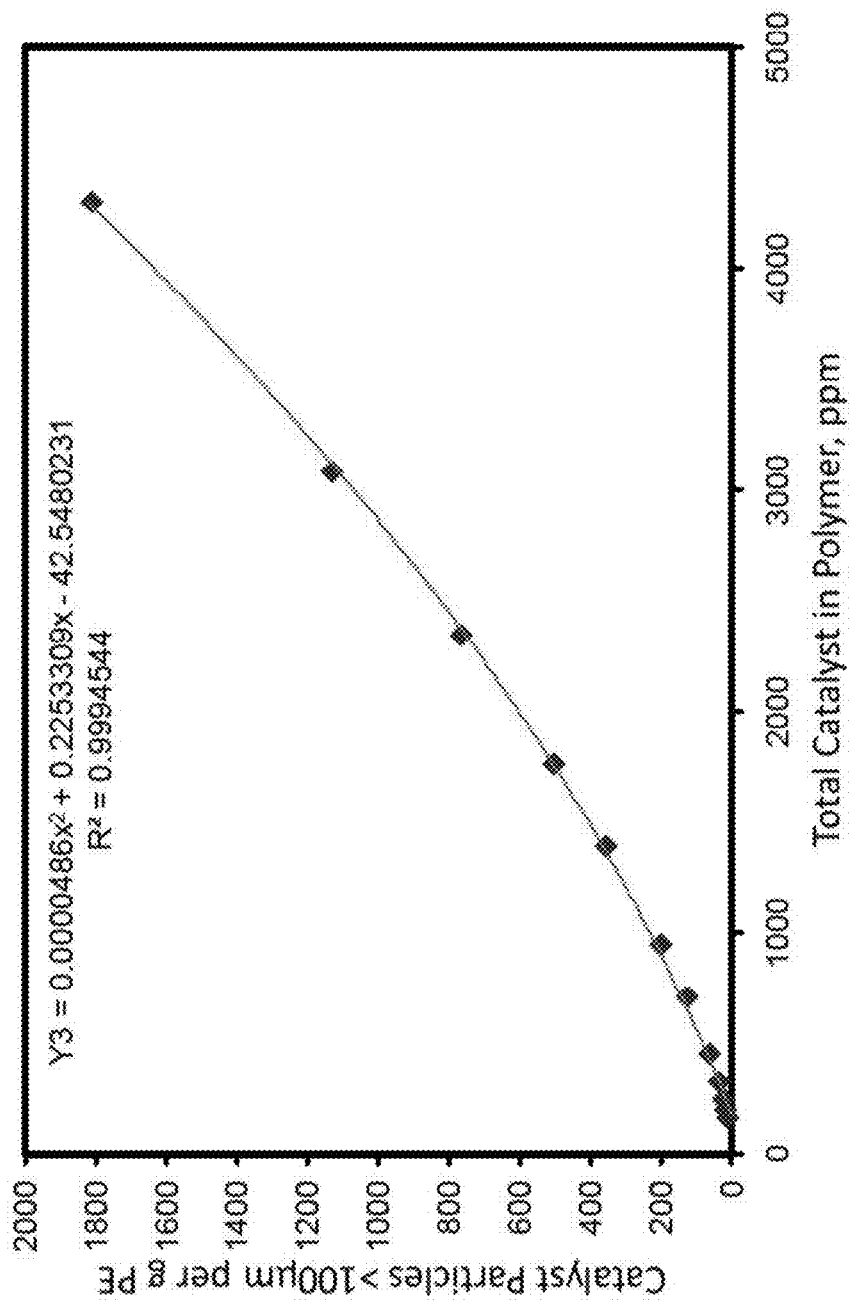
FIG. 12 presents a plot of the catalyst particles of greater than 100 µm per gram of ethylene polymer versus the ppm of catalyst in the ethylene polymer.

In FIG. 12, a similar plot was produced in the same way. However, the points in this graph indicate the number of unfragmented catalyst particles that are larger than 100 microns, measured in a variety of polymers. This time, the catalyst used to make these polymers was Comparative catalyst CC-5 from a variety of different reaction conditions, and the gel count was measured as catalyst particles per gram of polymer. This value is then plotted against the total amount of all catalyst left in the polymer, in ppm by weight, whether fragmented or not. Once again the points were fit to a curve which is defined by the following formula:

$$Y3 = 0.0000486x^2 + 0.2253309x - 42.5480231;\ \text{where:}$$

Y3 is the number of catalyst particles of >100 μm per gram of polymer, and x is the ppm by weight of all catalyst remaining in the polymer.

Advantageously, if the inventive polymers in Tables 2 and 3 are plotted in FIG. 12, they all lie far below the Y3 line, and usually near zero.

Another correlation using Comparative catalyst CC-5 similar to FIG. 12 can be made for the film gel count of Y3 catalyst particle gels per ft$^2$ of 25 micron thick film, wherein film gels are of a size greater than 200 µm caused by 100+ µm catalyst particles, and this correlation is $Y3=3.215\text{E}+07x^{1.564}$, wherein x is the weight fraction of ash in the ethylene polymer. The inventive polymers in Tables 2 and 3 have lower gels than that predicted by this equation for Y3 based on the CC-5 catalyst.

Figure 13:
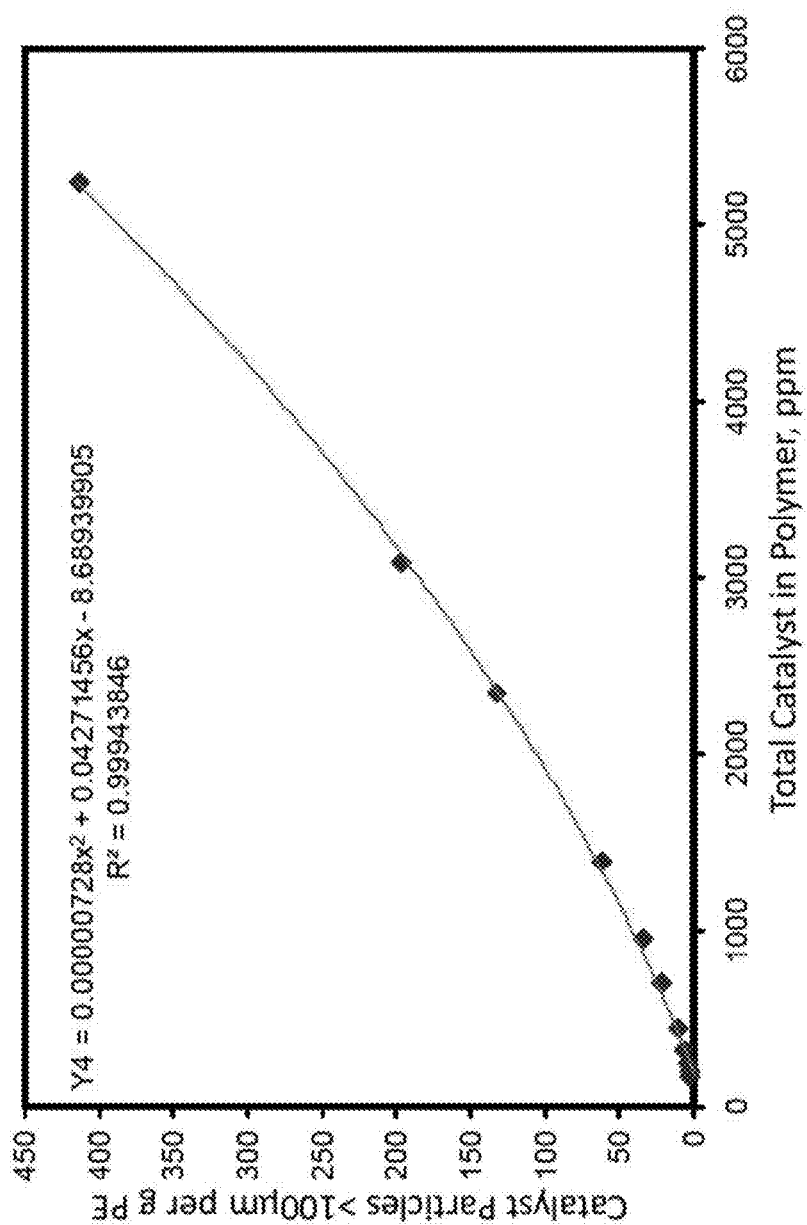
FIG. 13 presents a plot of the catalyst particles of greater than 100 µm per gram of ethylene polymer versus the ppm of catalyst in the ethylene polymer.

Lastly, FIG. 13 is one more graph, wherein the points represent polymers made with Comparative catalyst CC-6 made under a wide variety of reaction conditions. The number of unfragmented catalyst particles that are larger than 100 microns is plotted against the total amount of all catalyst left in the polymer, in ppm by weight, whether fragmented or not. Once again the points were fit to a curve which is defined by the following formula:

$$Y4=0.00000728x^2+0.04271456x-8.68939905; \text{ where:}$$

Y4 is the number of catalyst particles of >100 µm per gram of polymer, and x is the ppm by weight of all catalyst remaining in the polymer.

As above, if the inventive polymers in Tables 2 and 3 are plotted in FIG. 13, they all lie far below the Y4 line, and usually near zero.

Additional correlations can be made using Comparative catalysts CC-3 and CC-7. For CC-3, the film gel count of Y5 catalyst particle gels per ft$^2$ of 25 micron thick film, wherein film gels are of a size greater than 200 µm caused by 100+ µm catalyst particles, is $Y5=9.48\text{E}+06x^{1.38}$, wherein x is the weight fraction of ash in the ethylene polymer. For CC-7, the film gel count of Y6 catalyst particle gels per ft$^2$ of 25 micron thick film, wherein film gels are of a size greater than 200 µm caused by 100+ µm catalyst particles, is $Y6=1.07\text{E}+08x^{1.68}$, wherein x is the weight fraction of ash in the ethylene polymer. The inventive polymers in Tables 2 and 3 have lower gels than that predicted by these equations for Y5 and Y6 based on the CC-3 and CC-7 catalysts.

For any of the equations shown in FIGS. 10-13 and described by Y1-Y6 above, the inventive polymers have much lower gels, and thus fractions (80%, 50%, and 25%) of any of these equations can be used to describe the inventive ethylene polymers. For instance, the inventive ethylene polymers can have less catalyst particle gels than $Y4=0.00000728x^2+0.04271456x-8.68939905$, or less catalyst particle gels than $Y4=0.80*(0.00000728x^2+0.04271456x-8.68939905)$, or less catalyst particle gels than $Y4=0.50*(0.00000728x^2+0.04271456x-8.68939905)$, or less catalyst particle gels than $Y4=0.25*(0.00000728x^2+0.04271456x-8.68939905)$, where Y4 is the number of catalyst particles of >100 µm per gram of polymer, and x is the ppm by weight of all catalyst (ash) remaining in the polymer.

Referring now to Table 17, which shows some typical molecular weight and rheological properties of common commercial polymers made using chromium catalysts supported on silica, silica-titania, silica-alumina, or other solid oxides. They are listed by Type, corresponding with the same Type nomenclature in Table 16, where each type represents a typical market application. These are the kinds of polymers made and that can be made using the chromium catalysts of this invention. Melt index, density, and MWD can be controlled by reaction variables, including the catalyst calcination temperature and conditions, the reactor temperature and reactant concentrations (ethylene, comonomer, hydrogen, co-catalysts, etc.). Using this invention, these polymer types can be made firstly as a powder, and then as pellets. However, using this invention, these polymers can be made more efficiently, more homogeneously, more cleanly, and more quickly, and beneficially with significantly less catalyst particle defects (hard gels).

Figure 14:
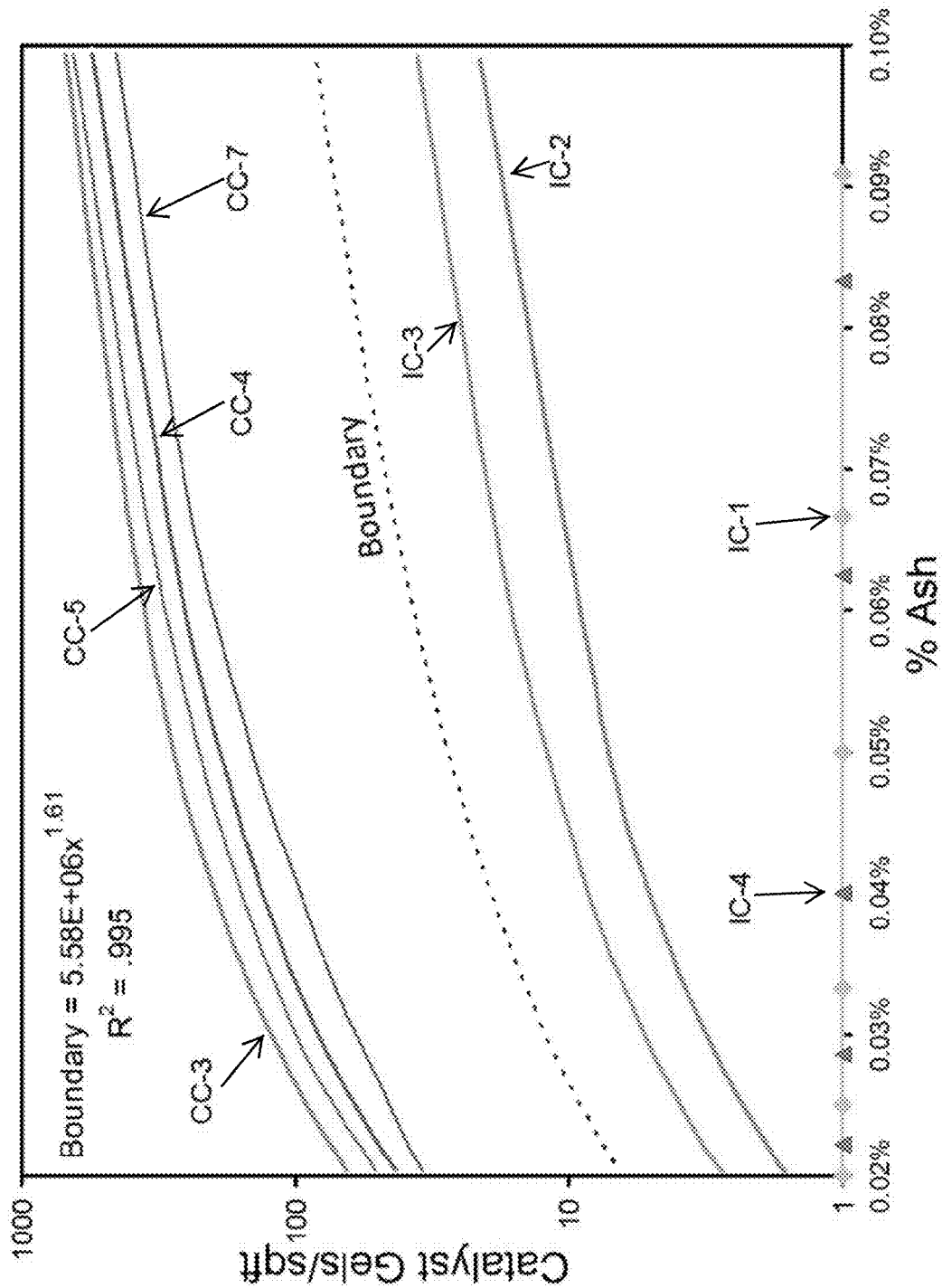
FIG. 14 presents a plot of the predicted catalyst gels per square foot of 25 micron film versus the ash content of the ethylene polymer.

Using the relationships between catalyst productivity and catalyst particle gels described hereinabove, FIG. 14 presents a plot of the predicted catalyst gels per square foot of 25 micron thick film versus the ash content of the ethylene polymer. This plot includes data for four inventive and four comparative catalysts. Unexpectedly, and beneficially, there is a large boundary area between the amounts of gels in films produced using the comparative catalysts as compared to the amounts of gels in films produced using the inventive catalysts. The equation for the dotted boundary line is $Y1=5,580,000x^{1.61}$, and Y1 is the film gel count of catalyst particle gels per ft$^2$ of 25 micron thick film, wherein film gels are of a size greater than 200 µm caused by catalyst particles, and x is the weight fraction of ash (solid oxide+ chromium) in the ethylene polymer. For instance, when the ash content (x) is 0.0003 (0.03 wt. %), the gel count is equal to 12, and when the ash content is 0.0005 (0.05 wt. %), the gel count is equal to 27. From FIG. 14, it is apparent that the amounts of gels in films produced using the inventive catalysts are less than $Y1=1.20*(5,580,000x^{1.61})$ and less than $Y1=5,580,000x^{1.61}$, and for some of the inventive catalysts, less than $Y1=0.80*(5,580,000x^{1.61})$, less than $Y1=0.50*(5,580,000x^{1.61})$, and/or less than $Y1=0.25*(5,580,000x^{1.61})$. The gel count for two of the inventive catalysts are predicted to be 1 gel or less throughout the ash content range.

Measured Catalyst Gels

Each line in Table 18 summarizes certain measurements conducted on numerous Grade D-1 (see Table 17) polymers which were produced using comparative catalysts CC-3 and/or CC-4 in a commercial-scale loop slurry reactor. Similar polymer was produced using Invention catalyst IC-3 on a pilot scale loop reactor and is shown in Table 18 as well. The measurements in Table 18 include 1) the ash content of the polymer (measured by ASTM D5630-13 procedure B), 2) the measured number of gels/ft$^2$ that were larger than 200 µm from a 25 micron thick film again made from that same polymer, and finally 3) a random sampling of 10 large gels were taken from the film in #2 and further analyzed. The number of catalyst gels are shown in column 5 of Table 18. In column 6, the total gel-count in column 4 is multiplied by the fraction of sampled catalyst gels in column 5, to result in the total number of measured catalyst gels in column 6. Column 6 is then compared to column 7, which is the theoretical number of catalyst gels, as derived from the previously described gel model.

Herein, the ASTM ash content encompasses the amount of solid oxide (e.g., silica) and chromium. Since chromium is a very minor portion of the ash content, the ash content is very close to the solid oxide content, but solid oxide content herein equals ash content minus chromium content.

Most Cr polymerization catalysts contain about 1 wt. % total Cr, usually in the form of Cr(III) prior to calcination. During this last preparation step, the catalyst is then activated by calcination, which converts a portion of the initial Cr(III) to Cr(VI). The catalyst recipe used to make catalysts for this particular polymer grade tends to convert most of the Cr into Cr(VI). Typically, and in this study, chromium (VI) content of the calcined catalyst or ash was determined as follows. A small sample, typically about half a gram, was first slurried in about 25 mL of deionized water and 25 mL of 18 N sulfuric acid, to which is added 4 drops of indicator solution (1,10-phenanthroline iron (II) sulfate, 0.025 M in water), all in a 250 mL beaker with a magnetic stir bar. The resulting mixture should be a yellow-green color. While stirring, this mixture was titrated using approximately 0.025 M ferrous ammonium sulfate solution (FAS). The mixture should go through several color changes, becoming greener and gradually turning to a blue color, then finally quickly turning red-orange. When the mixture turns red-orange, the titration is complete. The wt. % Cr(VI) was determined from the following formula:

$$\text{Chromium wt. \%} = 1.733\% \text{ (FAS molarity)(FAS mL)/(sample in g)}.$$

Gel counting was performed on 25 μm thick film from a Killion 125 cast film line with a die width of 203 mm. This used a CR7 winder model, using a cooler bath temperature of 23° C. The gel inspection area was 3 square meters. The screw diameter was 1.24 inches, running at 10 rpm, the line speed at approximately 3 lb/hr, and the temperature zones were all set at 400° F. The upper and lower take-up rolls were set at 35. Before measurements were made, the machine was purged for 120 minutes. The chill roll speed was set to 23 rpm.

Film gels were measured on the 25 μm thick film using an automated camera-based gel counting machine; the camera model was a FSA100 and Optical Control System (OCS) software was used. The system included a light source and a detector. The film was passed through the system, between the light source and the detector, with a 150-mm inspection width. The 3 square meters of film area were inspected and the gels with sizes of greater than 200 μm were analyzed, and then normalized per square foot of film—this is the measured gels/ft$^2$ of 25 micron thick film in Table 18.

To determine the relative amount of all the gels that were catalyst particle gels, 10 large gels were picked at random from a 1.5 sqft sheet of 25 micron film. Then the composition of each of the 10 gels was determined (e.g., catalyst particles, cellulose, cross-linked polymer, additives, and so forth). One of skill in the art would readily be able to determine the cause of the gels using a variety of non-limiting techniques such as hot-stage microscopy (and observing melting behavior), infrared spectroscopy, electron microscopy, and the like. For instance, an IR spectrum can be used to help determine if the gel is the result of a catalyst particle or something else. IR can even be used to determine what catalyst is responsible for the gels, in situations where multiple catalysts are used in one reactor to make different polymer grades.

For the exceptions in Table 18 with an asterisk, a larger number of gel samples were analyzed. Inventive ethylene polymers were produced with inventive catalyst IC-3 in pilot scale loop slurry polymerizations as described above in relation to Tables 4-5.

Figure 15:
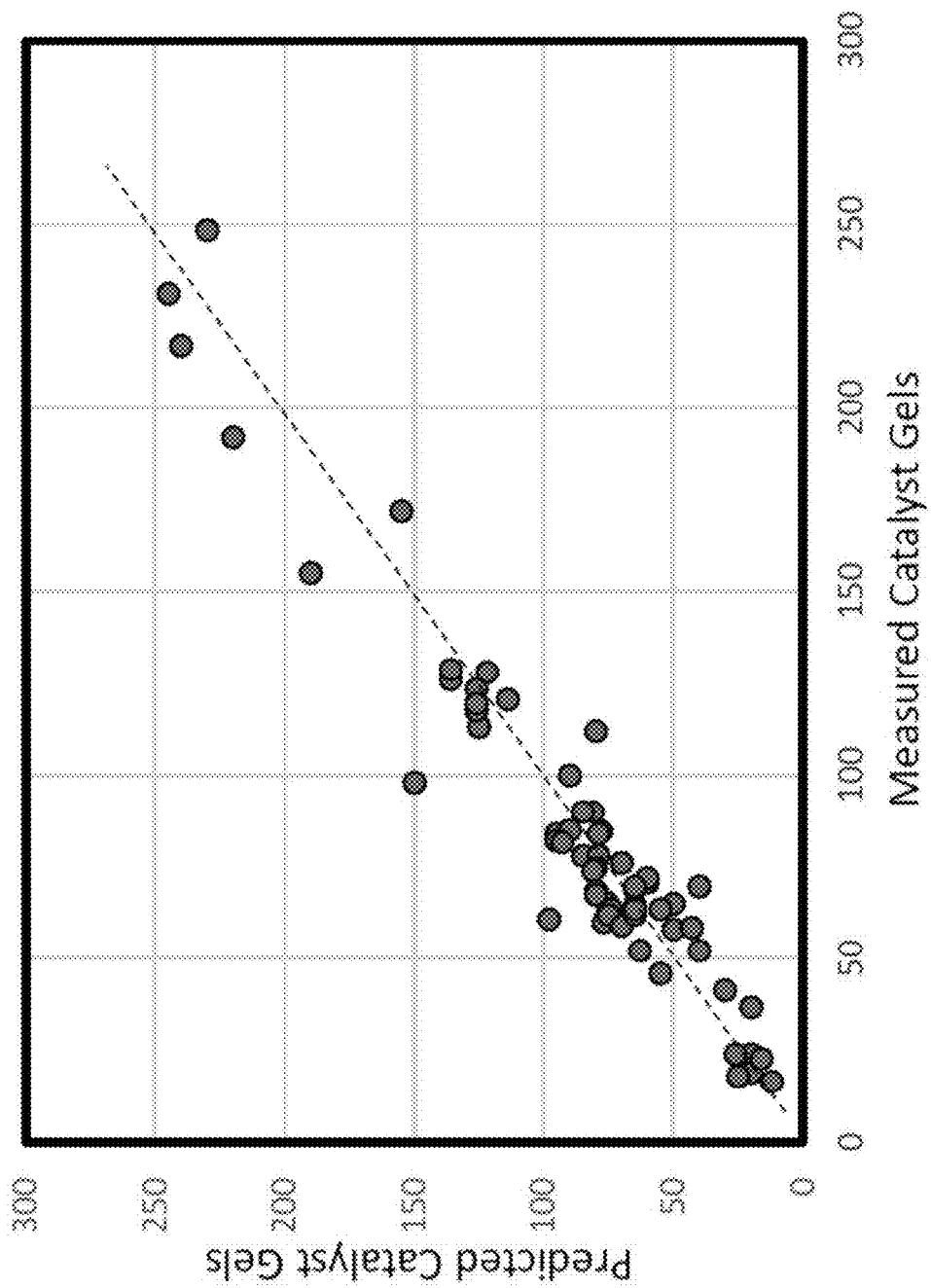
FIG. 15 presents a plot of the predicted catalyst gels versus measured catalyst gels.

Also listed in Table 18 are predicted gel counts using the procedures and models described hereinabove, and surprisingly, there was an excellent correlation between the model predicted catalyst gel amounts and the total catalyst gels (measured), and this excellent correlation is illustrated in FIG. 15. In the plot of predicated catalyst gels versus measured catalyst gels, a straight line is formed having a slope of 1.0.

Figure 16:
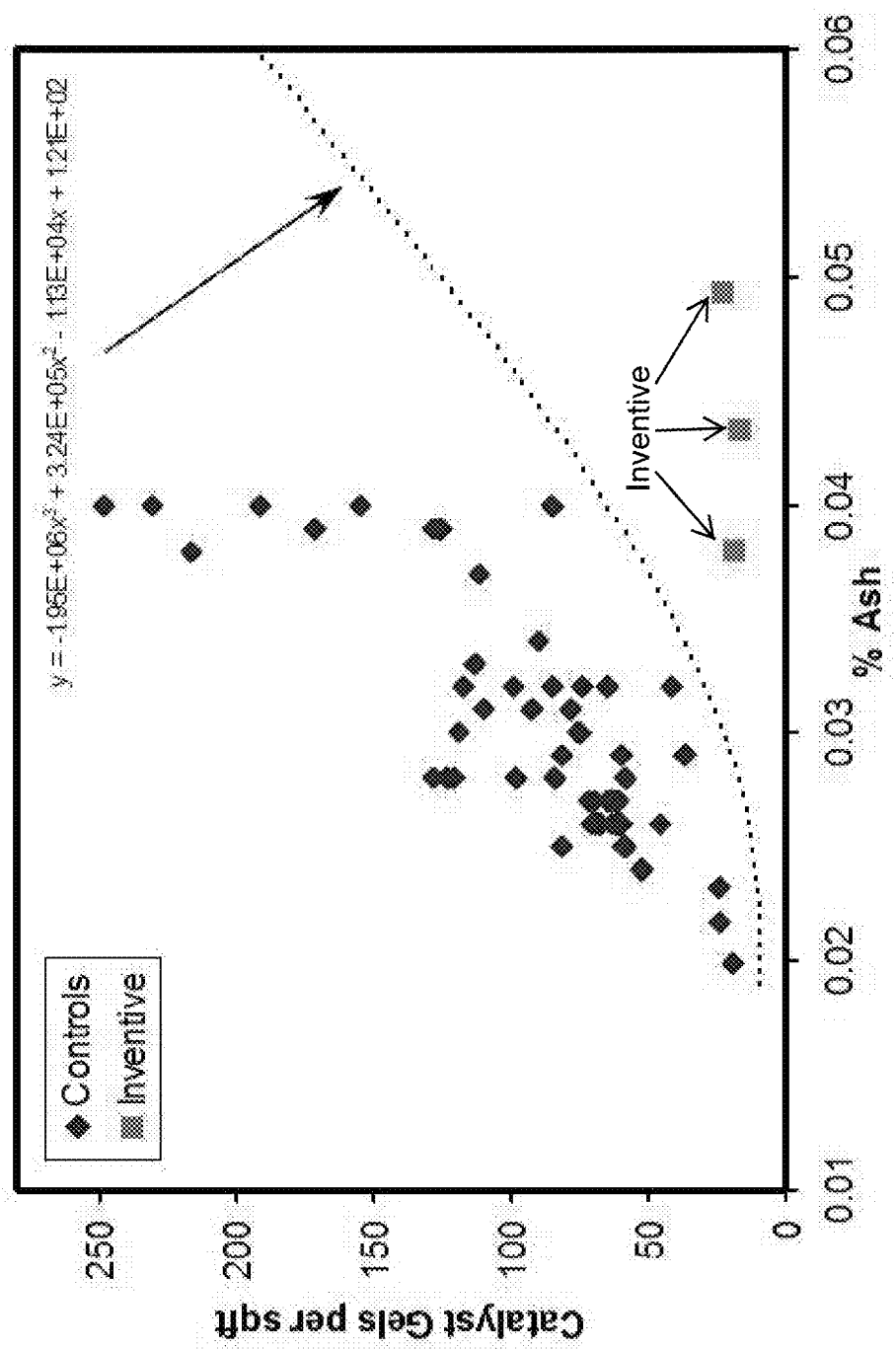
FIG. 16 presents a plot of the measured catalyst gels per square foot of 25 micron film versus the ash content of the ethylene polymer.

From Table 18, FIG. 16 is a plot of the (measured) total catalyst gels per square foot of 25 micron film versus the ash content of each ethylene polymer. Similar to FIG. 14, FIG. 16 shows a clear trend of increasing catalyst gels with increasing ash content. However in FIG. 16, the three inventive examples produced with inventive catalyst IC-3 fall far below the line in FIG. 16. The equation in FIG. 16 was derived to separate the inventive polymers from the control polymers. Through the ash content range from ~0.038 wt. % to ~0.05 wt. %, the line moves from about 50 to about 120 catalyst gels, whereas the inventive examples unexpectedly had only 17-23 catalyst gels.

In addition to quantifying catalyst gels using laser counting of films, it is also possible to measure gels in another way starting from any form of the polymer, including the original powder, or pellets, or even various molded articles beyond just film. To accomplish this, catalyst particles were recovered from polymer pellets, then sorted by particle size, and finally counted to obtain the number of catalyst particles larger than 100 μm diameter that remained unfragmented by the polymerization reaction.

In this experiment, commercial HDPE pellets of an ethylene polymer (Grade D-1 in Table 17) having a HLMI of approximately 25 and a 0.938 density, and produced using control catalyst CC-4, were the basis of a test to determine the number of catalyst particles of greater than 100 μm per gram of recovered ash (and therefore, per 5 grams of polymer). First, a large 2788 g sample of the polymer pellets was gently burned away to produce ash (e.g., catalyst residue of silica-titania solid oxide and chromium) in a metal bowl. It was heated gently causing melting and eventually, with continued raising of the applied temperature, the polymer began to burn. This was estimated to have occurred at when the external heat source reached about 450° C. As the molten polymer burned, its temperature was 280-320° C. The polymer gradually decomposed over about four hours, while the flame was controlled at a calm height by adjusting the access to oxygen.

After four hours the polymer was depleted, leaving only some ash (catalyst residue) mixed in with carbon black from the sides of the metal bowl. To separate the catalyst ash from the carbon black, the bowl was then placed in a muffle furnace, and the temperature was slowly ramped up, over three hours, to 550° C., then maintained at that temperature in still air for another 12 hours, followed by cooling to room temperature. The ash color changed from black to a bright yellow, which was also the color of the starting Cr/silica-titania catalyst. The ash was carefully recovered and weighed (1.04 g). The ash content was 0.0373 wt. % (373 ppm) of the polymer, which is typical for this grade of ethylene polymer. This would indicate a catalyst activity of 2681 g of polymer per g catalyst (the reciprocal). This ash value also correlated almost exactly with the small-scale ash test (ASTM D5630-13) that was routinely carried out during the production of this lot of ethylene polymer, which analyzed at 0.038 wt. % ash (380 ppm).

The yellow color of the recovered ash is due to the presence of Cr(VI). The original catalyst was manufactured to contain nominally 1 wt. % % Cr, and upon calcination, typically >90% of that Cr is oxidized to Cr(VI), which has a yellow-orange color. In the current experiment, the ash was then titrated with a ferrous ammonium sulfate solution (FAS) as described above, and the amount of Cr(VI) present in the ash was found to be 0.93 wt. %, which is a very typical, thus equating to approximately 3.5 ppm Cr(VI) in the ethylene polymer. After ash testing, there is a very minor amount of chromium that is not Cr(VI), therefore the Cr(VI) analytical result—for the purposes of determining the ppm amount of chromium in the polymer (or downstream article)—is considered equivalent to the amount of total chromium. Thus, there was approximately 3.5 ppm chromium in the ethylene polymer.

Figure 17:
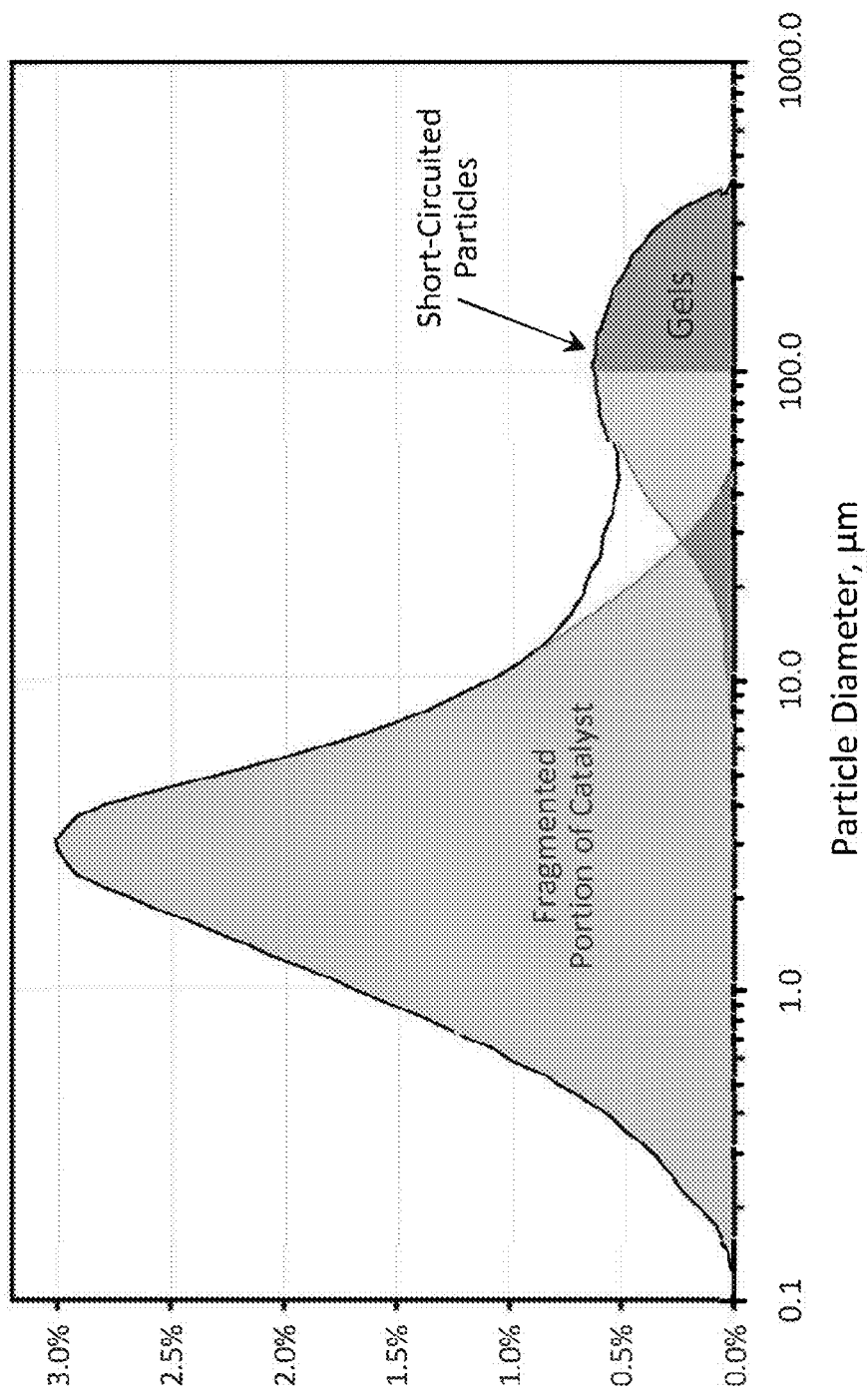
FIG. 17 presents a plot of the particle size distribution of ash from an ethylene polymer illustrating the number of catalyst particles with a diameter over 100 microns.

The ash from this experiment was then tested in a laser particle size analyzer (Microtrac S3500, as described above) to determine the particle size distribution of the recovered catalyst ash, which is illustrated in FIG. 17. As expected, most of the catalyst was completely broken up into ultra-fines (e.g., less than 5 µm) by the polymerization mechanism itself, as explained above. However, a small amount of the recovered ash shows up in the large-particle area of the distribution as a second population. This is the portion of catalyst that passed through the reactor (short-circuited) without significant breakage. And the largest of this small population, those particles of at least 100 µm, represents the source of catalyst gels measured by the laser gel counter on the film.

To actually count the number of gels over 100 µm in the ash, additional calculations are needed, which are summarized in Table 19. A square foot of 25 micron thick film occupies a volume of 2.32 mL. Based on a polymer density of 0.938, the weight is 2.18 g. The polymer contained 0.0373 wt. % catalyst ash, thus yielding the weight of catalyst in the square foot of film (and 25 microns thick) of 0.00081 g. The density of the catalyst is 0.317 g/mL, and therefore taking the inverse, each gram of catalyst takes up 3.15 mL of space, which is the sum of the pore volume and the skeletal volume. Therefore, the volume of the catalyst inside the square foot of film (and 25 microns thick) is 0.00256 mL. This number is then used later with the laser particle size distribution.

The particle size analyzer sorts particles by size into size-groups or size channels. An abbreviated table of size channels for larger size particles is shown in Table 20 for the ash sample of the current experiment. The first column in Table 20 lists the diameter of particles in each channel, and the second column provides the relative amount of catalyst ash that was found in each channel, in vol %. Plotting column 2 against column 1 provides the particle size distribution in FIG. 17. Column 3 is a calculation of the volume occupied by each particle size using its diameter in column 1 and the formula to calculate the volume of a sphere—$(4/3)\pi r^3$. In column 4, the catalyst volume inside the square foot of film (at 25 microns thick)—0.00256 mL from Table 19—is distributed between the different size channels simply by multiplying it by measured vol % shown in column 2. This produces column 4, which is just the amount of catalyst volume belonging to each size channel. The sum of this column yields 0.00256, the total catalyst volume shown in Table 19. Then, dividing column 4, the total amount of catalyst volume in each size channel, by column 3, the amount of catalyst volume occupied by a single particle, results in column 5, which is the total number of particles of each size that are contained in a square foot of film (and 25 microns thick). In this experiment, the sum of all the particles in column 5 that are larger than 100 µm (with interpolating between the last 2 channels in Table 20) is 127. Converting this to a weight basis, this equates to approximately 290 catalyst particles of greater than 100 µm per 5 grams of the ethylene polymer.

This measured gel count number of 127 catalyst particles that are larger than 100 µm per ft$^2$ (for 25 micron thick film) compares very favorably to the model and predictions disclosed hereinabove. Using the catalyst particle size of control catalyst CC-4, a low poison level, and a productivity of 2681, results in a predicted gel-count value of 119 catalyst gels of larger than 100 µm diameter, per square foot of 25 µm film. These values are within 7% of each other.

On a weight basis, this comparative experiment resulted in approximately 290 catalyst particles of greater than 100 µm per 5 grams of the ethylene polymer. The inventive examples have much less, and in some cases, no catalyst particles of greater than 100 µm per 5 grams of the ethylene polymer. An abbreviated table of size channels for larger size particles is shown in Table 21 for Inventive catalyst IC-1 (the particle size distribution of which is shown in FIG. 1). Note that this data in Table 21 is for the catalyst prior to polymerization, unlike Table 20, which is after polymerization. Nonetheless, Table 21 indicates that any polymer produced using IC-1 would have a gel count of zero catalyst particles of greater than 100 µm per 5 grams of the ethylene polymer. Likewise, any polymer produced using Inventive catalyst IC-2 also would have a gel count of zero catalyst particles of greater than 100 µm per 5 grams of the ethylene polymer.

TABLE 1

| Example | IC-1 | IC-2 | IC-3 | IC-4 | CC-1 | CC-2 | CC-3 | CC-4 | CC-5 | CC-6 | CC-7 |
|---|---|---|---|---|---|---|---|---|---|---|---|
| Mv, µm | 20.2 | 28.1 | 42.3 | 30.4 | 55.7 | 48.2 | 79.5 | 136.6 | 116.6 | 52.85 | 84.19 |
| Mn, µm | 5.63 | 18.2 | 5.35 | 6.29 | 14.10 | 4.61 | 13.08 | 5.80 | 12.94 | 6.69 | 7.99 |
| Mv/Mn | 3.59 | 1.5 | 7.8 | 4.8 | 4.0 | 10.44 | 6.1 | 23.6 | 9.0 | 7.9 | 10.5 |
| Mp, µm | 20.2 | 31.1 | 45.6 | 33.0 | 62.2 | 57.0 | 88.0 | 170.2 | 148.0 | 57.06 | 95.96 |
| Std Dev, µm | 5.97 | 9.61 | 17.3 | 14.4 | 22.62 | 27.25 | 30.76 | 70.44 | 40.25 | 21.61 | 50.14 |
| Mp − Mv Separation | 0.2% | 9.6% | 7.4% | 7.9% | 10.5% | 15.5% | 9.7% | 19.7% | 21.2% | 7.4% | 12.3% |
| Mv/Mp | 1.00 | 0.90 | 0.93 | 0.92 | 0.90 | 0.84 | 0.90 | 0.80 | 0.79 | 0.93 | 0.88 |
| Ma, µm | 16.4 | 24.4 | 26.7 | 21.8 | 40.6 | 26.0 | 54.3 | 71.5 | 40.08 | 33.40 | 43.4 |
| Mp/Ma | 1.23 | 1.27 | 1.71 | 1.51 | 1.53 | 2.19 | 1.62 | 2.38 | 3.69 | 1.71 | 2.21 |
| Mp − Ma, µm | 3.8 | 6.70 | 18.93 | 11.18 | 21.66 | 30.98 | 33.73 | 98.76 | 107.92 | 23.66 | 52.56 |
| Full Breadth, µm | 50.5 | 96.9 | 176.9 | 112.2 | 185.4 | 227.3 | 264.9 | 638.1 | 345.5 | 224.93 | 380.01 |
| ½ ht Breadth, µm | 12.76 | 23.00 | 31.06 | 39.14 | 45.83 | 75.90 | 78.64 | 270.47 | 96.30 | 39.3 | 113.42 |
| Weight Percentile, µm | | | | | | | | | | | |
| 10% | 12.74 | 16.37 | 15.66 | 11.76 | 22.94 | 14.12 | 38.69 | 40.40 | 61.73 | 19.57 | 21.48 |
| 20% | 15.06 | 19.00 | 27.25 | 15.76 | 36.42 | 23.12 | 54.02 | 69.18 | 87.11 | 34.06 | 37.80 |
| 30% | 16.59 | 22.00 | 32.70 | 19.66 | 43.80 | 30.60 | 62.33 | 91.20 | 101.21 | 40.87 | 51.76 |
| 40% | 17.95 | 23.98 | 36.78 | 23.92 | 49.56 | 37.48 | 69.43 | 112.00 | 110.08 | 45.98 | 64.76 |
| 50% | 19.31 | 26.19 | 40.50 | 28.23 | 54.85 | 44.25 | 76.51 | 133.60 | 118.17 | 50.63 | 77.22 |
| 60% | 20.79 | 28.50 | 44.42 | 32.44 | 60.20 | 51.30 | 84.14 | 158.48 | 127.32 | 55.53 | 89.97 |
| 70% | 22.55 | 31.10 | 48.96 | 36.65 | 66.10 | 59.17 | 93.19 | 190.01 | 144.23 | 61.20 | 104.4 |
| 80% | 24.94 | 36.80 | 55.12 | 41.92 | 73.64 | 69.13 | 104.9 | 239.10 | 154.12 | 68.90 | 122.5 |
| 90% | 29.15 | 42.00 | 66.26 | 49.20 | 85.74 | 85.20 | 124.0 | 284.40 | 169.77 | 82.82 | 152.1 |
| 95% | 33.77 | 50.00 | 79.68 | 55.47 | 97.81 | 101.8 | 142.4 | 335.02 | 192.52 | 99.60 | 182.5 |
| D90/D10 | 2.29 | 2.57 | 4.23 | 4.18 | 3.74 | 6.03 | 3.20 | 7.04 | 2.75 | 4.23 | 7.08 |

TABLE 1-continued

| Example | IC-1 | IC-2 | IC-3 | IC-4 | CC-1 | CC-2 | CC-3 | CC-4 | CC-5 | CC-6 | CC-7 |
|---|---|---|---|---|---|---|---|---|---|---|---|
| D90 − D10, μm | 16.4 | 25.6 | 50.6 | 37.4 | 37.4 | 71.1 | 85.3 | 244.0 | 108.0 | 63.3 | 130.6 |
| D80/D20 | 1.66 | 1.94 | 2.02 | 2.66 | 2.02 | 2.99 | 1.94 | 3.46 | 1.77 | 2.02 | 3.24 |
| D80 − D20, μm | 9.88 | 17.80 | 27.87 | 26.17 | 37.22 | 46.01 | 50.88 | 169.92 | 67.01 | 34.84 | 84.70 |
| D95 − D10, μm | 21.03 | 33.63 | 64.02 | 43.70 | 74.87 | 87.68 | 103.71 | 294.62 | 130.79 | 80.03 | 161.02 |
| D95 − D50, μm | 14.46 | 23.81 | 39.18 | 27.24 | 42.96 | 57.55 | 65.89 | 201.42 | 74.35 | 48.97 | 105.28 |
| D50 − D10, μm | 6.57 | 9.82 | 24.85 | 16.46 | 31.91 | 30.13 | 37.82 | 93.20 | 56.44 | 31.06 | 55.74 |
| Span, (D90 − D10)/D50 | 0.85 | 0.98 | 1.25 | 1.33 | 1.14 | 1.61 | 1.12 | 1.83 | 0.91 | 1.25 | 1.69 |
| Wt. % >150 μm | 0.00 | 0.00 | 0.43 | 0.00 | 0.35 | 0.98 | 5.81 | 48.14 | 15.32 | 1.58 | 10.96 |
| Wt. % >100 μm | 0 | 0 | 2.21 | 0.00 | 5.51 | 6.74 | 33.74 | 69.17 | 31.61 | 5.72 | 35.61 |
| Wt. % >75 μm | 0 | 0.44 | 5.72 | 0.20 | 19.59 | 17.26 | 60.36 | 79.33 | 85.42 | 21.07 | 52.6 |
| Wt. % >50 μm | 0.50 | 8.12 | 15.26 | 11.19 | 62.89 | 47.54 | 87.63 | 86.15 | 92.22 | 55.69 | 72.79 |
| Particles/g >150 μm | 0 | 0 | 8.46E+03 | 0 | 4.33E+03 | 7.16E+03 | 5.85E+04 | 3.62E+05 | 1.32E+05 | 1.36E+04 | 1.10E+05 |
| Particles/g >100 μm | 0 | 0 | 7.89E+04 | 0 | 2.02E+05 | 1.52E+05 | 1.03E+06 | 8.43E+05 | 1.27E+06 | 2.21E+05 | 8.91E+05 |
| Particles/g >75 μm | 0 | 4.7E+04 | 7.77E+05 | 1.49E+04 | 1.46E+06 | 7.93E+05 | 3.28E+06 | 2.36E+06 | 2.17E+06 | 1.28E+06 | 2.10E+06 |
| Particles/g >50 μm | 2.04E+05 | 3.2E+06 | 7.06E+06 | 2.33E+06 | 1.23E+07 | 6.20E+06 | 9.25E+06 | 5.20E+06 | 3.18E+06 | 1.11E+07 | 5.97E+06 |
| Wt. % <10 μm | 1.33 | 0.48 | 2.10 | 4.98 | 1.49 | 13.26 | 1.70 | 3.66 | 1.88 | 5.07 | 3.27 |
| Wt. % <15 μm | 12.55 | 3.52 | 5.35 | 19.48 | 5.24 | 18.89 | 4.26 | 5.39 | 3.57 | 8.14 | 6.33 |

TABLE 2

| | | | | | | | | |
|---|---|---|---|---|---|---|---|---|
| Ethylene, wt % | 3.82 | 3.52 | 3.11 | 2.75 | 2.48 | 3.11 | 3.11 | 3.11 |
| Temperature, °C. | 105 | 105 | 105 | 105 | 105 | 105 | 105 | 95 |
| Induction time, min | 3.6 | 5.5 | 8.5 | 11.5 | 14.0 | 8.5 | 8.5 | 12.0 |
| Residence time, min | 60 | 60 | 60 | 60 | 60 | 40 | 80 | 60 |
| Productivity, g/g | 4293 | 3929 | 3416 | 2970 | 2643 | 1833 | 5157 | 2901 |
| Film thickness, μm | 25 | 25 | 25 | 25 | 25 | 25 | 25 | 25 |
| Gels >200 μm/sqft (Catalyst particles >100 μm) in polymers made with the following catalysts: | | | | | | | | |
| Inventive catalyst 1 | 0 | 0 | 0 | 0 | 0 | 0 | 0 | 0 |
| Inventive catalyst 2 | 0 | 0 | 0 | 0 | 0 | 0 | 0 | 0 |
| Inventive catalyst 3 | 2 | 3 | 7 | 10 | 13 | 18 | 3 | 11 |
| Inventive catalyst 4 | 0 | 0 | 0 | 0 | 0 | 0 | 0 | 0 |
| Comparative catalyst 1 | 12 | 18 | 34 | 50 | 67 | 93 | 17 | 56 |
| Comparative catalyst 2 | 8 | 12 | 23 | 33 | 45 | 62 | 12 | 38 |
| Comparative catalyst 3 | 47 | 68 | 134 | 194 | 261 | 361 | 68 | 219 |
| Comparative catalyst 4 | 37 | 53 | 104 | 150 | 202 | 280 | 52 | 169 |
| Comparative catalyst 5 | 38 | 55 | 108 | 156 | 210 | 291 | 54 | 176 |
| Comparative catalyst 6 | 7 | 10 | 19 | 27 | 36 | 50 | 9 | 31 |
| Comparative catalyst 7 | 27 | 39 | 75 | 109 | 147 | 204 | 38 | 123 |
| Gels >150 μm/sqft (Catalyst particles >75 μm) in polymers made with the following catalysts: | | | | | | | | |
| Inventive catalyst 1 | 0 | 0 | 0 | 0 | 0 | 0 | 0 | 0 |
| Inventive catalyst 2 | 7 | 10 | 19 | 27 | 37 | 51 | 9 | 31 |
| Inventive catalyst 3 | 23 | 34 | 66 | 95 | 129 | 178 | 33 | 108 |
| Inventive catalyst 4 | 2 | 3 | 6 | 9 | 12 | 16 | 3 | 10 |
| Comparative catalyst 1 | 77 | 111 | 217 | 314 | 423 | 585 | 109 | 354 |
| Comparative catalyst 2 | 39 | 56 | 110 | 159 | 215 | 297 | 55 | 179 |
| Comparative catalyst 3 | 133 | 191 | 374 | 542 | 730 | 1010 | 189 | 611 |
| Comparative catalyst 4 | 71 | 102 | 200 | 290 | 391 | 541 | 101 | 327 |
| Comparative catalyst 5 | 65 | 94 | 183 | 266 | 358 | 495 | 93 | 300 |
| Comparative catalyst 6 | 38 | 55 | 108 | 257 | 212 | 293 | 55 | 177 |
| Comparative catalyst 7 | 63 | 91 | 178 | 258 | 348 | 481 | 90 | 291 |
| Gels >100 μm/sqft (Catalyst particles >50 μm) in polymers made with the following catalysts: | | | | | | | | |
| Inventive catalyst 1 | 12 | 17 | 34 | 49 | 66 | 91 | 17 | 55 |
| Inventive catalyst 2 | 95 | 137 | 268 | 389 | 524 | 725 | 136 | 438 |
| Inventive catalyst 3 | 212 | 306 | 597 | 866 | 1167 | 1614 | 302 | 976 |
| Inventive catalyst 4 | 126 | 182 | 356 | 517 | 696 | 962 | 180 | 582 |
| Comparative catalyst 1 | 474 | 683 | 1336 | 1937 | 2609 | 3609 | 675 | 2182 |
| Comparative catalyst 2 | 271 | 391 | 764 | 1109 | 1493 | 2066 | 386 | 1249 |
| Comparative catalyst 3 | 305 | 440 | 860 | 1247 | 1680 | 2323 | 435 | 1405 |
| Comparative catalyst 4 | 156 | 225 | 441 | 639 | 861 | 1190 | 223 | 720 |
| Comparative catalyst 5 | 96 | 138 | 269 | 391 | 526 | 728 | 136 | 440 |
| Comparative catalyst 6 | 334 | 482 | 942 | 1366 | 1840 | 2545 | 476 | 1539 |
| Comparative catalyst 7 | 179 | 259 | 506 | 733 | 988 | 1366 | 255 | 826 |

TABLE 3

| Ethylene, wt % | 3.80 | 3.80 | 3.80 | 3.80 | 3.80 | 3.80 | 4.40 |
|---|---|---|---|---|---|---|---|
| Temperature, ° C. | 105 | 105 | 105 | 105 | 105 | 105 | 105 |
| Poison level, DES/Cr | 0 | 0.10 | 0.20 | 0.30 | 0.40 | 0.40 | 0.40 |
| Induction time, min | 3.6 | 6.2 | 10.8 | 18.0 | 36.0 | 36.0 | 23.0 |
| Residence time, min | 65 | 65 | 65 | 65 | 65 | 95 | 65 |
| Productivity, g/g | 4941 | 4488 | 3784 | 2898 | 1488 | 2892 | 2408 |
| Film thickness, μm | 25 | 25 | 25 | 25 | 25 | 25 | 25 |
| Gels >200 μm/sqft (Catalyst particles >100 μm) in polymers made with the following catalysts: | | | | | | | |
| Inventive catalyst 1 | 0 | 0 | 0 | 0 | 0 | 0 | 0 |
| Inventive catalyst 2 | 0 | 0 | 0 | 0 | 0 | 0 | 0 |
| Inventive catalyst 3 | 2 | 3 | 7 | 15 | 49 | 19 | 21 |
| Inventive catalyst 4 | 0 | 0 | 0 | 0 | 0 | 0 | 0 |
| Comparative catalyst 1 | 10 | 18 | 36 | 75 | 250 | 95 | 110 |
| Comparative catalyst 2 | 7 | 12 | 24 | 50 | 167 | 64 | 74 |
| Comparative catalyst 3 | 38 | 69 | 141 | 292 | 975 | 371 | 430 |
| Comparative catalyst 4 | 30 | 53 | 110 | 226 | 755 | 287 | 333 |
| Comparative catalyst 5 | 31 | 55 | 114 | 235 | 784 | 298 | 346 |
| Comparative catalyst 6 | 5 | 10 | 20 | 41 | 136 | 52 | 60 |
| Comparative catalyst 7 | 22 | 39 | 80 | 165 | 550 | 209 | 242 |
| Gels >150 μm/sqft (Catalyst particles >75 μm) in polymers made with the following catalysts: | | | | | | | |
| Inventive catalyst 1 | 0 | 0 | 0 | 0 | 0 | 0 | 0 |
| Inventive catalyst 2 | 5 | 10 | 20 | 41 | 137 | 52 | 60 |
| Inventive catalyst 3 | 19 | 34 | 70 | 144 | 480 | 182 | 211 |
| Inventive catalyst 4 | 2 | 3 | 6 | 13 | 43 | 16 | 19 |
| Comparative catalyst 1 | 62 | 111 | 229 | 473 | 1578 | 600 | 696 |
| Comparative catalyst 2 | 31 | 56 | 116 | 240 | 800 | 305 | 353 |
| Comparative catalyst 3 | 107 | 192 | 395 | 816 | 2723 | 1036 | 1200 |
| Comparative catalyst 4 | 57 | 103 | 212 | 437 | 1458 | 555 | 643 |
| Comparative catalyst 5 | 52 | 94 | 194 | 400 | 1336 | 508 | 589 |
| Comparative catalyst 6 | 31 | 56 | 115 | 236 | 789 | 300 | 348 |
| Comparative catalyst 7 | 51 | 91 | 188 | 388 | 1297 | 493 | 572 |
| Gels >100 μm/sqft (Catalyst particles >50 μm) in polymers made with the following catalysts: | | | | | | | |
| Inventive catalyst 1 | 10 | 17 | 36 | 73 | 245 | 93 | 108 |
| Inventive catalyst 2 | 76 | 138 | 284 | 585 | 1955 | 744 | 862 |
| Inventive catalyst 3 | 170 | 307 | 632 | 1304 | 4353 | 1657 | 1919 |
| Inventive catalyst 4 | 102 | 183 | 377 | 777 | 2595 | 988 | 1144 |
| Comparative catalyst 1 | 381 | 686 | 1413 | 2915 | 9732 | 3703 | 4290 |
| Comparative catalyst 2 | 218 | 393 | 809 | 1668 | 5570 | 2120 | 2455 |
| Comparative catalyst 3 | 245 | 442 | 909 | 1876 | 6265 | 2384 | 2762 |
| Comparative catalyst 4 | 126 | 226 | 446 | 961 | 3210 | 1221 | 1415 |
| Comparative catalyst 5 | 77 | 138 | 285 | 588 | 1964 | 747 | 1059 |
| Comparative catalyst 6 | 268 | 484 | 996 | 2055 | 6862 | 2611 | 3025 |
| Comparative catalyst 7 | 144 | 260 | 535 | 1103 | 3683 | 1402 | 1624 |

TABLE 4

| | | | Polymer example | | | | | |
|---|---|---|---|---|---|---|---|---|
| | | | IP-1 | IP-2 | IP-3 | CP-1 | CP-2 | CP-3 |
| Catalyst example | | | IC-1 | IC-2 | IC-3 | CC-5 | CC-6 | CC-7 |
| D50 catalyst Diam, μm | | | 19 | 26 | 41 | 118 | 51 | 77 |
| Avg PE Diam, μm | | | 310 | 431 | 455 | 1039 | 628 | 1090 |
| Screen analysis of PE | min μm | avg μm | | | | | | |
| On 10 mesh, wt. % | >1851 | 2000 | 0 | 0 | 0 | 5.28 | 0.77 | 8.84 |
| On 20 mesh, wt. % | >841 | 1346 | 2.51 | 0.21 | 2.14 | 54.7 | 18.8 | 50.4 |
| On 35 mesh, wt. % | >420 | 631 | 27.9 | 29.3 | 32.8 | 28.2 | 40.6 | 29.0 |
| On 60 mesh, wt. % | >250 | 335 | 39.1 | 61.1 | 56.4 | 9.0 | 33.0 | 10.4 |
| On 100 mesh, wt. % | >149 | 200 | 24.3 | 8.1 | 7.16 | 0.72 | 3.9 | 0.82 |
| On 200 mesh, wt. % | >74 | 112 | 5.1 | 0.83 | 0.88 | 0.98 | 0.88 | 0.46 |
| Pan, thru 200 mesh, wt. % | <74 | 37 | 0.42 | 0.47 | 0.65 | 1.09 | 2.04 | 0.14 |
| Bulk Density, lb/ft$^3$ | | | 32.1 | 30.6 | 28.5 | 24.9 | 24.9 | 25.2 |
| Max Solids, wt. % | | | 51.3 | 50.7 | 49.5 | 46.2 | 45.8 | 48.3 |
| Bulk Density, g/L | | | 515 | 491 | 459 | — | — | — |

TABLE 5

| Polymer Example | Catalyst Example | Catalyst diam, μm | Actual Average PE diam, μm | Predicted PE from Cat, diam, μm |
|---|---|---|---|---|
| CP-1 | CC-5 | 118 | 1039 | 1088 |
| CP-2 | CC-6 | 51 | 616 | 599 |
| CP-3 | CC-7 | 77 | 1090 | 1272 |
| IP-2 | IC-2 | 26 | 431 | 384 |
| IP-3 | IC-3 | 41 | 454 | 479 |

TABLE 6

| Polymer Example | IP-4 | IP-5 | IP-6 | IP-7 | CP-4 | CP-5 | CP-6 | CP-7 | CP-8 | CP-9 | CP-10 |
|---|---|---|---|---|---|---|---|---|---|---|---|
| Catalyst Example | IC-1 | IC-2 | IC-3 | IC-4 | CC-1 | CC-2 | CC-3 | CC-4 | CC-5 | CC-6 | CC-7 |
| Mv, μm | 217.4 | 302.2 | 454.5 | 326.8 | 598.8 | 517.7 | 854.5 | 1468.6 | 1253.5 | 568.1 | 905.0 |
| Mn, μm | 60.5 | 195.7 | 57.5 | 67.6 | 151.6 | 49.6 | 140.6 | 62.4 | 139.1 | 71.9 | 85.9 |
| Mv/Mn | 3.6 | 1.5 | 7.8 | 7.8 | 4.0 | 10.4 | 6.1 | 23.6 | 9.0 | 7.9 | 10.5 |
| Mp, μm | 216.8 | 334.4 | 490.7 | 354.8 | 669.0 | 612.8 | 946.0 | 1830.0 | 1591.0 | 613.4 | 1031.6 |
| Std Dev, μm | 64.2 | 103.3 | 185.8 | 154.9 | 243.2 | 292.9 | 330.7 | 757.2 | 432.7 | 232.3 | 539.0 |
| Mp − Mv Separation | 0.2% | 9.6% | 7.4% | 7.9% | 10.5% | 15.5% | 9.7% | 19.7% | 21.2% | 7.4% | 12.3% |
| Mv/Mp | 1.00 | 0.90 | 0.93 | 0.92 | 0.90 | 0.84 | 0.90 | 0.80 | 0.79 | 0.93 | 0.88 |
| Ma, μm | 176.0 | 262.4 | 287.2 | 234.6 | 436.1 | 279.7 | 583.4 | 768.3 | 430.9 | 359.1 | 466.6 |
| Mp/Ma | 1.23 | 1.27 | 1.71 | 1.51 | 1.53 | 2.19 | 1.62 | 2.38 | 3.69 | 1.71 | 2.21 |
| Mp − Ma, μm | 41 | 72 | 203 | 120 | 233 | 333 | 363 | 1062 | 1160 | 254 | 565 |
| Full Breadth, μm | 543 | 1042 | 1901 | 1206 | 1993 | 2443 | 2847 | 6859 | 3714 | 2418 | 4085 |
| ½ ht Breadth, μm | 137 | 247 | 334 | 421 | 493 | 816 | 845 | 2908 | 1035 | 422 | 1219 |
| Weight Percentile, μm | | | | | | | | | | | |
| 10% | 137.0 | 176.0 | 168.3 | 126.5 | 246.6 | 151.8 | 415.9 | 434.3 | 663.6 | 210.4 | 230.9 |
| 20% | 161.9 | 204.3 | 292.9 | 169.4 | 391.5 | 248.5 | 580.7 | 743.7 | 936.4 | 366.1 | 406.4 |
| 30% | 178.3 | 236.5 | 351.5 | 211.4 | 470.9 | 329.0 | 670.0 | 980.4 | 1088.0 | 439.6 | 556.4 |
| 40% | 193.0 | 257.8 | 395.4 | 257.1 | 532.8 | 402.9 | 746.4 | 1204.0 | 1183.4 | 494.3 | 696.2 |
| 50% | 207.6 | 281.5 | 435.4 | 303.5 | 589.6 | 475.7 | 822.5 | 1436.2 | 1270.3 | 544.3 | 830.1 |
| 60% | 223.5 | 306.4 | 477.6 | 348.7 | 647.2 | 551.5 | 904.5 | 1703.7 | 1368.7 | 596.9 | 967.2 |
| 70% | 242.4 | 334.3 | 526.3 | 393.9 | 710.6 | 636.1 | 1001.8 | 2042.6 | 1550.5 | 657.9 | 1122.3 |
| 80% | 268.1 | 395.6 | 592.5 | 450.7 | 791.6 | 743.1 | 1127.7 | 2570.3 | 1656.8 | 740.7 | 1316.9 |
| 90% | 313.4 | 451.5 | 712.3 | 528.9 | 921.7 | 915.9 | 1333.0 | 3057.3 | 1825.0 | 890.3 | 1635.1 |
| 95% | 363.0 | 537.5 | 856.9 | 596.3 | 1051.5 | 1094.5 | 1530.8 | 3601.5 | 2069.6 | 1070.7 | 1961.9 |
| D90/D10 | 2.29 | 2.57 | 4.23 | 4.18 | 3.74 | 6.03 | 3.20 | 7.04 | 2.75 | 4.23 | 7.08 |
| D90 − D10, μm | 176.4 | 275.5 | 544.0 | 402.4 | 675.1 | 764.1 | 917.1 | 2623.0 | 1161.4 | 679.9 | 1404.2 |
| D80/D20 | 1.66 | 1.94 | 2.02 | 2.66 | 2.02 | 2.99 | 1.94 | 3.46 | 1.77 | 2.02 | 3.24 |
| D80 − D20, μm | 106.21 | 191.35 | 299.62 | 281.3 | 400.12 | 494.61 | 546.96 | 1826.61 | 720.36 | 374.53 | 910.53 |
| D95 − D10, μm | 226.07 | 361.52 | 688.26 | 469.8 | 804.85 | 942.56 | 1114.88 | 3167.17 | 1405.99 | 860.32 | 1730.97 |
| D95 − D50, μm | 155.45 | 255.96 | 421.14 | 292.8 | 461.82 | 618.66 | 708.32 | 2165.27 | 799.26 | 526.43 | 1131.76 |
| D50 − D10, μm | 70.63 | 105.57 | 267.12 | 177.0 | 343.03 | 323.90 | 406.57 | 1001.90 | 606.73 | 333.90 | 599.21 |
| Span, (D90 − D10)/D50 | 0.85 | 0.98 | 1.25 | 1.33 | 1.14 | 1.61 | 1.12 | 1.83 | 0.91 | 1.25 | 1.69 |
| Wt. % >1500 μm | 0.00 | 0.00 | 0.001 | 0.00 | 0.69 | 1.50 | 7.58 | 48.14 | 43.55 | 1.58 | 14.65 |
| Wt. % >1000 μm | 0.00 | 0.00 | 2.21 | 0.00 | 5.51 | 6.74 | 33.74 | 69.17 | 31.61 | 5.72 | 35.61 |
| Wt. % >800 μm | 0.00 | 0.44 | 5.72 | 0.20 | 19.59 | 17.26 | 60.36 | 79.33 | 85.42 | 21.07 | 52.60 |
| Wt. % >500 μm | 1.43 | 3.65 | 35.75 | 16.47 | 69.71 | 47.54 | 86.77 | 88.45 | 93.42 | 64.11 | 75.66 |
| Wt. % <75 μm | 0.23 | 0.00 | 0.34 | 1.19 | 0.00 | 8.89 | 0.74 | 1.82 | 0.00 | 2.41 | 1.43 |
| Wt. % <100 μm | 1.33 | 0.48 | 1.68 | 4.98 | 1.51 | 13.26 | 1.93 | 3.02 | 1.05 | 4.50 | 3.27 |
| Wt. % <150 μm | 7.55 | 3.52 | 5.21 | 13.06 | 4.39 | 18.89 | 4.80 | 4.86 | 2.77 | 6.87 | 5.68 |

TABLE 7

| Polymer Example | Catalyst Example | Wt % Solids | Isobutane lb/hr | 1-Hexene lb/hr | Ethylene lb/hr | TEA ppm | Hydrogen mol % | Residence Time, hr | Temp ° F. |
|---|---|---|---|---|---|---|---|---|---|
| CP-11 | CC-5 | 27.1 | 57.00 | 0.77 | 27.09 | 0 | 0.000 | 1.22 | 217.6 |
| CP-12 | CC-5 | 27.6 | 60.14 | 0.70 | 27.20 | 0 | 0.384 | 1.15 | 217.0 |
| CP-13 | CC-5 | 36.3 | 40.00 | 0.80 | 27.23 | 0 | 0.400 | 1.59 | 217.7 |
| CP-14 | CC-5 | 26.6 | 60.10 | 0.29 | 27.19 | 0 | 0.314 | 1.16 | 216.7 |
| CP-15 | CC-5 | 32.9 | 59.97 | 0.27 | 27.10 | 0.50 | 0.969 | 1.20 | 218.6 |
| CP-16 | CC-5 | 29.0 | 58.08 | 0.26 | 27.20 | 0 | 0.374 | 1.18 | 216.6 |
| CP-17 | CC-5 | 46.2 | 48.91 | 0.34 | 45.99 | 0 | 0.457 | 1.20 | 217.8 |
| CP-18 | CC-6 | 24.6 | 60.10 | 0.79 | 27.21 | 0 | 0.000 | 1.13 | 216.9 |
| CP-19 | CC-6 | 28.1 | 60.07 | 0.79 | 27.21 | 0 | 0.300 | 1.16 | 216.8 |
| CP-20 | CC-6 | 40.8 | 34.02 | 0.80 | 27.15 | 0 | 0.524 | 1.80 | 217.2 |
| CP-21 | CC-6 | 39.5 | 32.74 | 0.80 | 27.20 | 0 | 0.527 | 1.82 | 217.2 |

TABLE 7-continued

| Polymer Example | Catalyst Example | Wt % Solids | Isobutane lb/hr | 1-Hexene lb/hr | Ethylene lb/hr | TEA ppm | Hydrogen mol % | Residence Time, hr | Temp ° F. |
|---|---|---|---|---|---|---|---|---|---|
| CP-22 | CC-6 | 40.8 | 32.54 | 0.55 | 27.24 | 0 | 0.393 | 1.85 | 217.4 |
| CP-23 | CC-6 | 26.9 | 60.01 | 0.23 | 27.20 | 0 | 0.073 | 1.14 | 217.0 |
| CP-24 | CC-6 | 45.8 | 49.25 | 0.37 | 48.00 | 0 | 0.443 | 1.16 | 217.8 |
| CP-25 | CC-7 | 28.5 | 60.96 | 0.27 | 27.19 | 0 | 0.770 | 1.15 | 216.6 |
| CP-26 | CC-7 | 48.3 | 47.23 | 0.30 | 47.02 | 0 | 1.007 | 1.22 | 217.9 |
| CP-27 | CC-7 | 28.7 | 60.08 | 0.16 | 27.19 | 0.37 | 0.870 | 1.14 | 222.8 |
| CP-28 | CC-7 | 28.3 | 60.10 | 0.00 | 27.22 | 1.01 | 0.533 | 1.15 | 218.4 |
| CP-29 | CC-7 | 50.6 | 46.03 | 0.34 | 47.00 | 0.59 | 0.753 | 1.25 | 221.4 |
| IP-8 | IC-2 | 27.8 | 60.52 | 0.41 | 27.20 | 0 | 0.496 | 1.14 | 221.4 |
| IP-9 | IC-2 | 28.4 | 59.95 | 0.27 | 27.13 | 0 | 0.132 | 1.16 | 216.7 |
| IP-10 | IC-2 | 50.7 | 49.28 | 0.36 | 52.83 | 0 | 0.429 | 1.14 | 216.8 |
| IP-11 | IC-3 | 27.7 | 61.00 | 0.30 | 27.22 | 0 | 0.265 | 1.14 | 216.9 |
| IP-12 | IC-3 | 49.5 | 42.69 | 0.32 | 44.60 | 0 | 0.878 | 1.36 | 216.8 |

TABLE 8

| Polymer Example | Catalyst Example | Polymer Density g/mL | Powder MI g/10 min | Pellet MI g/10 min | Extrusion Drop-off MI % | Bulk Density lb/cuft | PE Yield gPE/gCat | CY $\eta_0$ Eta(0) Pa-s | CY Tau, sec | CY-a |
|---|---|---|---|---|---|---|---|---|---|---|
| CP-10 | CC-5 | 0.9463 | 1.51 | 0.97 | 36% | 24.9 | 4926 | 9.91E+04 | 0.13 | 0.1598 |
| CP-11 | CC-5 | 0.9474 | 0.96 | 0.69 | 28% | 24.9 | 3802 | 2.15E+05 | 0.35 | 0.1550 |
| CP-12 | CC-5 | 0.9445 | 1.66 | 1.29 | 22% | 24.9 | 3311 | 4.12E+05 | 0.08 | 0.1555 |
| CP-13 | CC-5 | 0.9536 | 0.65 | 0.43 | 34% | 27.0 | 3425 | 3.66E+05 | 1.04 | 0.1591 |
| CP-14 | CC-5 | 0.9545 | 0.62 | 0.42 | 32% | 25.2 | 4348 | 3.68E+05 | 1.15 | 0.1648 |
| CP-15 | CC-5 | 0.9552 | 0.55 | 0.40 | 27% | 23.8 | 2457 | 5.44E+05 | 1.25 | 0.1545 |
| CP-16 | CC-5 | 0.9543 | 0.54 | 0.34 | 37% | 24.5 | 4098 | 5.70E+05 | 1.52 | 0.1535 |
| CP-17 | CC-6 | 0.9470 | 0.80 | 0.65 | 19% | 24.9 | 2398 | 3.95E+05 | 0.50 | 0.1362 |
| CP-18 | CC-6 | 0.9464 | 1.23 | 0.91 | 26% | 25.2 | 2755 | 1.42E+05 | 0.18 | 0.1552 |
| CP-19 | CC-6 | 0.9446 | 0.52 | 0.34 | 34% | 27.0 | 9901 | 5.98E+05 | 1.79 | 0.1544 |
| CP-20 | CC-6 | 0.9447 | 0.52 | 0.35 | 33% | 27.0 | 3356 | 5.98E+05 | 1.79 | 0.1542 |
| CP-21 | CC-6 | 0.9469 | 0.29 | 0.18 | 39% | 26.6 | 3527 | 1.58E+06 | 8.39 | 0.1539 |
| CP-22 | CC-6 | 0.956 | 0.61 | 0.47 | 23% | 26.6 | 2045 | 4.07E+05 | 0.71 | 0.1479 |
| CP-23 | CC-6 | 0.9538 | 0.38 | 0.24 | 37% | 27.0 | 4566 | 9.34E+05 | 2.74 | 0.1541 |
| CP-24 | CC-7 | 0.9548 | 0.64 | 0.46 | 28% | 24.9 | 4098 | 3.47E+05 | 1.05 | 0.1642 |
| CP-25 | CC-7 | 0.9545 | 0.55 | 0.38 | 31% | 25.6 | 3300 | 4.82E+05 | 1.56 | 0.1609 |
| CP-26 | CC-7 | 0.9548 | 0.60 | 0.37 | 38% | 27.7 | 3185 | 4.71E+05 | 1.49 | 0.1545 |
| CP-27 | CC-7 | 0.9519 | 0.20 | 0.10 | 49% | 25.2 | 6061 | 2.95E+06 | 29.93 | 0.1535 |
| CP-28 | CC-7 | 0.9539 | 0.59 | 0.40 | 32% | 27.7 | 5435 | 4.84E+05 | 1.25 | 0.1545 |
| IP-8 | IC-2 | 0.9533 | 0.68 | 0.41 | 40% | 28.1 | 4219 | 3.82E+05 | 1.18 | 0.1546 |
| IP-9 | IC-2 | 0.9546 | 0.55 | 0.38 | 31% | 30.6 | 4405 | 8.45E+05 | 2.14 | 0.1453 |
| IP-10 | IC-2 | 0.9548 | 0.48 | 0.31 | 35% | 32.0 | 2874 | 9.90E+05 | 3.23 | 0.1477 |
| IP-11 | IC-3 | 0.9547 | 0.58 | 0.41 | 29% | 28.5 | 2933 | 4.43E+05 | 1.09 | 0.1565 |
| IP-12 | IC-3 | 0.9541 | 0.50 | 0.34 | 32% | 31.7 | 3226 | 5.35E+05 | 1.57 | 0.1617 |

TABLE 9

| Polymer Example | Catalyst Example | 10 mesh % on | 20 mesh % on | 35 mesh % on | 60 mesh % on | 100 mesh % on | 200 mesh % on | 200 mesh % thru | Avg Diam um |
|---|---|---|---|---|---|---|---|---|---|
| CP-10 | CC-5 | 6.93 | 48.40 | 30.64 | 11.60 | 0.91 | 0.70 | 0.82 | 1025 |
| CP-11 | CC-5 | 3.50 | 42.28 | 36.42 | 15.00 | 1.12 | 0.74 | 0.94 | 893 |
| CP-12 | CC-5 | 5.28 | 54.71 | 28.18 | 9.04 | 0.72 | 0.98 | 1.09 | 1039 |
| CP-13 | CC-5 | 0.00 | 20.02 | 46.27 | 30.66 | 2.23 | 0.29 | 0.53 | |
| CP-14 | CC-5 | 0.00 | 22.33 | 46.52 | 27.85 | 2.21 | 0.44 | 0.65 | |
| CP-15 | CC-5 | 0.00 | 12.91 | 42.49 | 39.27 | 4.11 | 0.48 | 0.74 | |
| CP-16 | CC-5 | 0.00 | 27.82 | 45.34 | 23.81 | 1.78 | 0.42 | 0.83 | |
| CP-17 | CC-6 | 0.72 | 17.66 | 40.18 | 34.44 | 4.23 | 0.81 | 1.96 | 616 |
| CP-18 | CC-6 | 0.77 | 18.83 | 40.59 | 33.01 | 3.88 | 0.88 | 2.04 | 628 |
| CP-19 | CC-6 | 2.66 | 39.27 | 35.84 | 18.06 | 2.11 | 1.08 | 0.98 | 847 |
| CP-20 | CC-6 | 8.57 | 43.46 | 31.35 | 13.56 | 1.33 | 0.82 | 0.91 | |
| CP-21 | CC-6 | 3.83 | 39.97 | 35.44 | 17.26 | 1.74 | 0.77 | 0.99 | 880 |
| CP-23 | CC-6 | 0.00 | 19.07 | 45.12 | 30.25 | 3.70 | 1.06 | 0.80 | 617 |
| CP-24 | CC-7 | 0.00 | 17.45 | 46.43 | 32.64 | 2.64 | 0.34 | 0.50 | |
| CP-25 | CC-7 | 0.00 | 28.62 | 43.08 | 24.49 | 2.40 | 0.58 | 0.83 | |
| CP-26 | CC-7 | 2.00 | 43.64 | 36.66 | 14.86 | 1.31 | 0.79 | 0.74 | 868 |

TABLE 9-continued

| Polymer Example | Catalyst Example | 10 mesh % on | 20 mesh % on | 35 mesh % on | 60 mesh % on | 100 mesh % on | 200 mesh % on | 200 mesh % thru | Avg Diam um |
|---|---|---|---|---|---|---|---|---|---|
| CP-27 | CC-7 | 8.84 | 50.39 | 28.96 | 10.39 | 0.82 | 0.46 | 0.14 | 1090 |
| CP-28 | CC-7 | 0.00 | 35.88 | 39.11 | 20.86 | 2.43 | 0.79 | 0.93 | |
| IP-8 | IC-2 | 0.24 | 5.23 | 39.24 | 46.39 | 5.39 | 0.87 | 2.64 | 496 |
| IP-9 | IC-2 | 0.00 | 0.21 | 29.27 | 61.14 | 8.08 | 0.83 | 0.47 | 431 |
| IP-10 | IC-2 | 0.00 | 5.70 | 28.57 | 40.77 | 13.94 | 7.92 | 3.10 | 427 |
| IP-11 | IC-3 | 0.00 | 2.14 | 32.80 | 56.37 | 7.16 | 0.88 | 0.65 | 455 |
| IP-12 | IC-3 | 0.73 | 2.98 | 35.75 | 43.98 | 8.40 | 5.14 | 3.02 | 539 |

TABLE 10

| Polymer Example | Catalyst Used | Catalyst Average Diam. μm | PE Yield gPE/gCat | Predicted PE Avg. Diam, μm | Actual PE Avg. Diam, μm | Actual/Predicted Ratio |
|---|---|---|---|---|---|---|
| CP-30 | CC-5 | 118 | 3345 | 1409 | 636 | 45.1% |
| CP-31 | CC-5 | 118 | 4288 | 1525 | 656 | 43.0% |
| CP-32 | CC-5 | 118 | 3656 | 1261 | 565 | 44.8% |
| CP-33 | CC-5 | 118 | 4188 | 1495 | 698 | 46.6% |
| CP-34 | CC-7 | 77 | 4203 | 1439 | 613 | 42.6% |
| CP-35 | CC-7 | 77 | 3267 | 1339 | 700 | 52.3% |
| CP-36 | CC-7 | 77 | 4888 | 1581 | 755 | 47.7% |
| IP-13 | IC-2 | 26 | 5688 | 412 | 456 | 110.7% |
| IP-14 | IC-2 | 26 | 5298 | 402 | 407 | 101.2% |
| IP-15 | IC-2 | 26 | 5396 | 405 | 418 | 103.3% |
| IP-16 | IC-3 | 41 | 3005 | 485 | 473 | 97.5% |
| IP-17 | IC-3 | 41 | 3456 | 512 | 528 | 103.1% |
| IP-18 | IC-3 | 41 | 4234 | 548 | 556 | 101.4% |

TABLE 11

| Catalyst Example | Particle Diam, μm | Polymer Example | Density g/mL | MI g/10 min | HLMI g/10 min | HLMI/MI |
|---|---|---|---|---|---|---|
| IC-5 | <45 | IP-19 | 0.9348 | 0.0320 | 3.99 | 125 |
| IC-6 | 75-150 | IP-20 | 0.9259 | 0.0634 | 5.16 | 81 |
| IC-7 | 180-250 | IP-21 | 0.9186 | 0.1560 | 11.79 | 76 |
| CC-4 | Parent | CP-37 | 0.9272 | 0.1000 | 8.12 | 81 |

TABLE 12

| Polymer Example | Fraction Diam, | Fraction Percent | Density g/mL | MI g/10 min | HLMI g/10 min | Mw kg/mol | Mn kg/mol | Mw/Mn | Cr ppm | Ti ppm | % Wax | Film Dart Drop | Total Eng Dart Drop |
|---|---|---|---|---|---|---|---|---|---|---|---|---|---|
| IP-22 | >841 | 33.6 | 0.9222 | 0.23 | 19.1 | 169 | 18.8 | 9.0 | 3 | 14 | 2.44 | 354 | 1.532 |
| IP-23 | 500-840 | 43.0 | 0.9234 | 0.21 | 19.2 | 189 | 11.5 | 16.4 | 3 | 18 | 2.83 | 214 | 1.276 |
| IP-24 | <500 | 23.4 | 0.9236 | 0.32 | 28.9 | 180 | 9.5 | 18.9 | 6 | 25 | 4.13 | 159 | 1.147 |

TABLE 13

| Polymer Fraction | Polymer Example | Mn kg/mol | Mw kg/mol | Mw/Mn | Polymer Example | Mn kg/mol | Mw kg/mol | Mw/Mn |
|---|---|---|---|---|---|---|---|---|
| Parent | CP-38 | 31.7 | 381 | 12.0 | CP-39 | 18.9 | 355 | 18.8 |
| >2000 μm | IP-25 | 36.5 | 379 | 10.4 | IP-32 | 21.7 | 364 | 16.8 |
| 841-2000 μm | IP-26 | 33.8 | 379 | 11.2 | IP-33 | 20.2 | 353 | 17.5 |
| 500-841 μm | IP-27 | 28.4 | 366 | 12.9 | IP-34 | 19.1 | 353 | 18.5 |
| 250-500 μm | IP-28 | 27.5 | 368 | 13.4 | IP-35 | 15.1 | 340 | 22.6 |
| 149-250 μm | IP-29 | 18.2 | 374 | 20.6 | IP-36 | 13.4 | 342 | 25.5 |
| 74-149 μm | IP-30 | 15.9 | 361 | 22.7 | IP-37 | 9.2 | 346 | 37.5 |
| <74 μm | IP-31 | 8.9 | 321 | 36.1 | IP-38 | 7.1 | 339 | 47.6 |
| Parent | CP-40 | 16.5 | 327 | 19.8 | CP-41 | 21.7 | 356 | 16.5 |
| >2000 μm | IP-39 | 23.7 | 330 | 13.9 | IP-46 | 26.5 | 362 | 13.7 |
| 841-2000 μm | IP-40 | 19.2 | 328 | 17.1 | IP-47 | 25.1 | 338 | 13.5 |
| 500-841 μm | IP-41 | 19.5 | 329 | 16.9 | IP-48 | 24.1 | 344 | 14.3 |
| 250-500 μm | IP-42 | 17.6 | 315 | 17.9 | IP-49 | 22.1 | 349 | 15.8 |
| 149-250 μm | IP-43 | 13.9 | 311 | 22.4 | IP-50 | 27.5 | 362 | 13.2 |
| 74-149 μm | IP-44 | 7.6 | 294 | 38.8 | IP-51 | 14.3 | 369 | 25.8 |
| <74 μm | IP-45 | 5.4 | 286 | 53.0 | IP-52 | 11.2 | 326 | 29.1 |

TABLE 14

| | Polymer | | | | | | | | | |
|---|---|---|---|---|---|---|---|---|---|---|
| | CP-42 | | CP-43 | | CP-44 | | CP-45 | | CP-46 | |
| Polymer Fraction | Branches/ 1000C | Mn kg/mol | Branches/ 1000C | Mn kg/mol | Branches/ 1000C | Mn kg/mol | Branches/ 1000C | Mn kg/mol | Branches/ 1000C | Mn kg/mol |
| Parent | 1.44 | 18.7 | 1.61 | 23.1 | 6.43 | 17.2 | 4.78 | 15.3 | 5.43 | 15.3 |
| >841 μm | 1.99 | 16.9 | 1.77 | 22.5 | 7.54 | 18.0 | 6.41 | 15.6 | 6.46 | 16.8 |
| 400-841 μm | 1.29 | 18.3 | 1.59 | 23.6 | 6.07 | 17.8 | 5.40 | 15.8 | 5.50 | 15.5 |
| 250-400 μm | 1.24 | 19.8 | 1.35 | 25.3 | 5.64 | 16.7 | 4.45 | 16.0 | 5.06 | 14.2 |
| 177-250 μm | 1.19 | 18.4 | 1.24 | 23.4 | 5.51 | 15.9 | 4.35 | 14.8 | 5.05 | 13.4 |
| 149-177 μm | 1.11 | 19.3 | 1.08 | 26.8 | 4.83 | 11.7 | 4.03 | 14.4 | 4.30 | 13.3 |
| 74-149 μm | 1.12 | 16.3 | 1.09 | 34.1 | 4.56 | 11.9 | 4.15 | 13.0 | 3.99 | 11.9 |
| <74 | 1.22 | 10.3 | 1.08 | 27.5 | 4.43 | 10.8 | 4.34 | 12.9 | 3.89 | 11.3 |

TABLE 15

| Catalyst Example | IC-1 | IC-2 | IC-3 | IC-4 | CC-1 | CC-2 |
|---|---|---|---|---|---|---|
| Productivity | | | | | | |
| Mean, lb/lb | 2450 | 2363 | 2266 | 2424 | 2180 | 2133 |
| Standard Dev. | 189 | 249 | 379 | 243 | 444 | 550 |
| Std. Dev./Mean | 7.7% | 10.6% | 16.7% | 10.0% | 20% | 26% |
| Range | 626 | 777 | 1273 | 819 | 1479 | 1721 |
| Range/Mean | 0.26 | 0.33 | 0.56 | 0.34 | 0.68 | 0.81 |
| Solid oxide content | | | | | | |
| Mean, ppm | 411 | 428 | 456 | 417 | 483 | 510 |
| Standard Dev. | 34 | 49 | 92 | 46 | 125 | 170 |
| Std. Dev./Mean | 8% | 11% | 20% | 11% | 26% | 33% |
| Range | 115 | 157 | 339 | 163 | 469 | 625 |
| Range/Mean | 0.28 | 0.37 | 0.74 | 0.39 | 0.97 | 1.22 |
| Melt Index, g/10 min | | | | | | |
| Mean | 0.0317 | 0.0347 | 0.04 | 0.0329 | 0.0459 | 0.0520 |
| Standard Dev. | 0.0054 | 0.0085 | 0.0176 | 0.0077 | 0.0251 | 0.0347 |
| Std. Dev./Mean | 17.1% | 24.4% | 43.6% | 23.5% | 55% | 67% |
| Range | 0.0188 | 0.0275 | 0.0665 | 0.0281 | 0.0956 | 0.1291 |
| Range/Mean | 0.59 | 0.79 | 1.64 | 0.85 | 2.08 | 2.48 |
| HLMI, g/10 min | | | | | | |
| Mean | 3.98 | 4.13 | 4.51 | 4.06 | 4.88 | 5.35 |
| Standard Dev. | 0.24 | 0.43 | 1.08 | 0.38 | 1.65 | 2.38 |
| Std. Dev./Mean | 6.1% | 10.5% | 23.9% | 9.4% | 34% | 44% |
| Range | 0.86 | 1.42 | 4.19 | 1.43 | 6.47 | 9.11 |
| Range/Mean | 0.22 | 0.34 | 0.93 | 0.35 | 1.33 | 1.70 |
| Density, g/mL | | | | | | |
| Mean | 0.9346 | 0.9339 | 0.9331 | 0.9344 | 0.9323 | 0.9317 |
| Standard Dev. | 0.0013 | 0.0018 | 0.0031 | 0.0018 | 0.0038 | 0.0049 |
| Std. Dev./Mean | 0.14% | 0.20% | 0.33% | 0.19% | 0.41% | 0.53% |
| Range | 0.0045 | 0.0058 | 0.0108 | 0.0061 | 0.0135 | 0.0166 |
| Range/Mean | 0.0048 | 0.0062 | 0.0115 | 0.0065 | 0.0145 | 0.0178 |

| Catalyst Example | CC-3 | CC-4 | CC-5 | CC-6 | CC-7 |
|---|---|---|---|---|---|
| Productivity | | | | | |
| Mean, lb/lb | 2003 | 1907 | 1980 | 2218 | 2026 |
| Standard Dev. | 614 | 823 | 634 | 502 | 675 |
| Std. Dev./Mean | 31% | 43% | 32% | 23% | 33% |
| Range | 1997 | 2515 | 1989 | 1700 | 2192 |
| Range/Mean | 1.00 | 1.32 | 1.00 | 0.77 | 1.08 |
| Solid oxide content | | | | | |
| Mean, ppm | 577 | 858 | 591 | 484 | 602 |
| Standard Dev. | 276 | 989 | 299 | 154 | 363 |
| Std. Dev./Mean | 48% | 115% | 51% | 32% | 60% |
| Range | 1127 | 4705 | 1126 | 622 | 1595 |
| Range/Mean | 1.95 | 5.48 | 1.91 | 1.29 | 2.65 |
| Melt Index, g/10 min | | | | | |
| Mean | 0.0658 | 0.1130 | 0.0686 | 0.0467 | 0.0710 |
| Standard Dev. | 0.0579 | 0.1648 | 0.0627 | 0.0314 | 0.0745 |
| Std. Dev./Mean | 88% | 146% | 91.3% | 67.3% | 105% |

TABLE 15-continued

|  | | | | | |
|---|---|---|---|---|---|
| Range | 0.2329 | 0.7132 | 0.2328 | 0.1287 | 0.3173 |
| Range/Mean | 3.5412 | 6.3098 | 3.3918 | 2.7558 | 4.4706 |
| HLMI, g/10 min | | | | | |
| Mean | 6.40 | 10.53 | 6.62 | 5.00 | 6.89 |
| Standard Dev. | 4.37 | 13.94 | 4.77 | 2.15 | 5.80 |
| Std. Dev./Mean | 68% | 132% | 72% | 43.0% | 84% |
| Range | 18.00 | 61.33 | 18.00 | 9.11 | 25.37 |
| Range/Mean | 2.81 | 5.82 | 2.72 | 1.82 | 3.68 |
| Density, g/mL | | | | | |
| Mean | 0.9303 | 0.9277 | 0.9300 | 0.9325 | 0.9301 |
| Standard Dev. | 0.0064 | 0.0116 | 0.0067 | 0.0045 | 0.0074 |
| Std. Dev./Mean | 0.69% | 1.25% | 0.72% | 0.48% | 0.80% |
| Range | 0.0231 | 0.0437 | 0.0231 | 0.0165 | 0.0278 |
| Range/Mean | 0.0248 | 0.0471 | 0.0248 | 0.0177 | 0.0299 |

TABLE 16

| Example | IC-1 | IC-2 | IC-3 | IC-4 | CC-1 | CC-2 | CC-3 | CC-4 | CC-5 | CC-6 | CC-7 |
|---|---|---|---|---|---|---|---|---|---|---|---|
| Branches/1000C on Polymer (0.3 to 0.5 MI, 0.952 to 0.955 density) | | | | | | | | | | | |
| Mean | 1.17 | 1.21 | 1.29 | 1.18 | 1.38 | 1.48 | 1.72 | 2.61 | 1.76 | 1.40 | 1.82 |
| Standard Dev. | 0.06 | 0.11 | 0.26 | 0.10 | 0.38 | 0.55 | 0.98 | 3.02 | 1.06 | 0.49 | 1.28 |
| Std. Dev./Mean | 0.05 | 0.09 | 0.20 | 0.08 | 0.28 | 0.37 | 0.57 | 1.16 | 0.60 | 0.35 | 0.71 |
| Range | 0.23 | 0.36 | 0.98 | 0.36 | 1.49 | 2.07 | 4.00 | 13.25 | 3.99 | 2.07 | 5.58 |
| Range/Mean | 0.19 | 0.30 | 0.76 | 0.30 | 1.08 | 1.40 | 2.33 | 5.09 | 2.26 | 1.48 | 3.07 |
| Branches/1000C on Polymer (10 to 16 HLMI, 0.946 to 0.950 density) | | | | | | | | | | | |
| Mean | 1.25 | 1.32 | 1.36 | 1.27 | 1.42 | 1.44 | 1.54 | 1.66 | 1.56 | 1.39 | 1.53 |
| Standard Dev. | 0.15 | 0.19 | 0.24 | 0.19 | 0.27 | 0.35 | 0.40 | 0.70 | 0.42 | 0.32 | 0.47 |
| Std. Dev./Mean | 0.12 | 0.14 | 0.17 | 0.15 | 0.19 | 0.24 | 0.26 | 0.42 | 0.27 | 0.23 | 0.31 |
| Range | 0.49 | 0.56 | 0.69 | 0.60 | 0.93 | 1.14 | 1.47 | 2.66 | 1.47 | 1.12 | 1.76 |
| Range/Mean | 0.39 | 0.43 | 0.51 | 0.47 | 0.66 | 0.80 | 0.96 | 1.60 | 0.94 | 0.81 | 1.15 |
| Branches/1000C on Polymer (25 HLMI, 0.936 density) | | | | | | | | | | | |
| Mean | 5.21 | 5.42 | 5.64 | 5.27 | 5.85 | 5.96 | 6.33 | 6.88 | 6.40 | 5.76 | 6.32 |
| Standard Dev. | 0.46 | 0.61 | 0.88 | 0.59 | 1.04 | 1.32 | 1.59 | 2.78 | 1.67 | 1.21 | 1.85 |
| Std. Dev./Mean | 0.09 | 0.11 | 0.16 | 0.11 | 0.18 | 0.22 | 0.25 | 0.40 | 0.26 | 0.21 | 0.29 |
| Range | 1.54 | 1.88 | 2.87 | 1.99 | 3.57 | 4.34 | 5.74 | 10.45 | 5.72 | 4.29 | 6.85 |
| Range/Mean | 0.29 | 0.35 | 0.51 | 0.38 | 0.61 | 0.73 | 0.91 | 1.52 | 0.89 | 0.74 | 1.08 |
| Branches/1000C on Polymer (20 HLMI, 0.938 density) | | | | | | | | | | | |
| Mean | 4.46 | 4.60 | 4.80 | 4.51 | 4.98 | 5.13 | 5.48 | 6.22 | 5.55 | 4.95 | 5.53 |
| Standard Dev. | 0.29 | 0.40 | 0.69 | 0.38 | 0.88 | 1.13 | 1.54 | 3.08 | 1.63 | 1.03 | 1.82 |
| Std. Dev./Mean | 0.06 | 0.09 | 0.14 | 0.08 | 0.18 | 0.22 | 0.28 | 0.50 | 0.29 | 0.21 | 0.33 |
| Range | 0.97 | 1.28 | 2.45 | 1.33 | 3.13 | 3.90 | 5.70 | 12.14 | 5.69 | 3.87 | 7.05 |
| Span | 0.22 | 0.28 | 0.51 | 0.29 | 0.63 | 0.76 | 1.04 | 1.95 | 1.03 | 0.78 | 1.27 |
| Branches/1000C on Polymer (10-15 HLMI, 0.934 density) | | | | | | | | | | | |
| Mean | 4.65 | 4.83 | 5.00 | 4.70 | 5.15 | 5.22 | 5.49 | 5.84 | 5.54 | 5.06 | 5.46 |
| Standard Dev. | 0.41 | 0.53 | 0.74 | 0.52 | 0.82 | 1.03 | 1.17 | 1.96 | 1.22 | 0.94 | 1.34 |
| Std. Dev./Mean | 0.09 | 0.11 | 0.15 | 0.11 | 0.16 | 0.20 | 0.21 | 0.34 | 0.22 | 0.19 | 0.25 |
| Range | 1.35 | 1.62 | 2.31 | 1.72 | 2.68 | 3.24 | 4.14 | 7.35 | 4.13 | 3.19 | 4.91 |
| Range/Mean | 0.29 | 0.34 | 0.46 | 0.37 | 0.52 | 0.62 | 0.75 | 1.26 | 0.74 | 0.63 | 0.90 |

TABLE 17

| Grade | HLMI g/10 min | Density g/cm$^3$ | Ash ppm | Mw kg/mol | Mw/Mn | CY-a | Tau sec |
|---|---|---|---|---|---|---|---|
| Type A-1 | 30-35 | 0.952-0.956 | 350-450 | 120-210 | 4.5-10.5 | 0.11-0.15 | 1-6 |
| Type A-2 | 24-30 | 0.948-0.952 | 350-450 | 115-175 | 5-9 | 0.13-0.16 | 1-4 |
| Type D-1 | 20-25 | 0.935-0.940 | 250-350 | 100-200 | 2.2-18 | 0.16-0.20 | 0.8-1.5 |
| Type B-1 | 12-16 | 0.944-0.948 | 250-350 | 180-250 | 10-25 | 0.16-0.20 | 1-2 |
| Type C | 9-13 | 0.936-0.940 | 250-350 | 180-250 | 10-20 | 0.13-0.18 | 6-26 |
| Type D-2 | 19-24 | 0.935-0.940 | 250-350 | 130-230 | 3-22 | 0.15-0.20 | 0.8-3 |
| Type E | 8-12 | 0.935-0.940 | 350-450 | 125-275 | 2-30 | 0.12-0.18 | 8-30 |
| Type B-2 | 8-12 | 0.946-0.950 | 450-550 | 160-230 | 6-25 | 0.12-0.16 | 20-50 |

TABLE 18

| Catalyst Type | Ash Content wt. % | Ash Content ppm | Measured Total 200+ μm Gels gels/sqft | Catalyst Gels per 10 sampled | Total Catalyst gels/sqft | Predicted Catalyst gels/sqft | Gels from Equation in FIG. 14 | Gels from Equation in FIG. 16 |
|---|---|---|---|---|---|---|---|---|
| CC-3 | 0.032 | 320 | 46 | 9 | 41 | 30 | 13 | 27 |
| CC-3 | 0.029 | 290 | 46 | 8 | 37 | 20 | 11 | 18 |
| CC-3 | 0.026 | 260 | 51 | 9 | 46 | 55 | 9 | 12 |
| CC-3 | 0.028 | 280 | 58 | 10 | 58 | 50 | 11 | 16 |
| CC-3 | 0.029 | 290 | 67 | 9 | 60 | 71 | 11 | 18 |
| CC-3 | 0.031 | 310 | 100 | 10 | 100 | 140 | 13 | 24 |
| CC-3 | 0.031 | 310 | 84 | 10 | 84 | 95 | 13 | 24 |
| CC-3 | 0.030 | 300 | 76 | 10 | 76 | 70 | 12 | 21 |
| CC-3 | 0.031 | 310 | 78 | 10 | 78 | 85 | 13 | 24 |
| CC-3 | 0.031 | 310 | 78 | 10 | 78 | 79 | 13 | 24 |
| CC-3 | 0.032 | 320 | 85 | 10 | 85 | 90 | 13 | 27 |
| CC-3 | 0.034 | 340 | 90 | 10 | 90 | 81 | 15 | 35 |
| CC-3 | 0.033 | 330 | 113 | 10 | 113 | 125 | 14 | 31 |
| CC-3 | 0.030 | 300 | 83 | 9 | 75 | 80 | 12 | 21 |
| CC-3 | 0.032 | 320 | 90 | 10 | 90 | 85 | 13 | 27 |
| CC-3 | 0.039 | 390 | 172 | 9 | 155 | 155 | 18 | 57 |
| CC-3 | 0.038 | 380 | 241 | 9 | 217 | 240 | 17 | 52 |
| CC-3 | 0.040 | 400 | 276 | 9 | 248 | 230 | 19 | 63 |
| CC-3/4 | 0.040 | 400 | 192 | 10 | 192 | 240 | 19 | 63 |
| CC-4 | 0.040 | 400 | 231 | 10 | 231 | 245 | 19 | 63 |
| CC-3 | 0.037 | 370 | 112 | 10 | 112 | 80 | 17 | 48 |
| CC-3 | 0.040 | 400 | 94 | 9 | 85 | 78 | 19 | 63 |
| CC-3 | 0.040 | 400 | 155 | 10 | 155 | 190 | 19 | 63 |
| CC-3 | 0.039 | 390 | 126 | 10 | 126 | 136 | 18 | 57 |
| CC-3 | 0.039 | 390 | 143 | 9 | 129 | 136 | 18 | 57 |
| CC-3/4 | 0.032 | 320 | 74 | 10 | 74 | 81 | 13 | 27 |
| CC-4 | 0.032 | 320 | 218 | 3 | 65 | 76 | 13 | 27 |
| CC-3/4 | 0.025 | 250 | 82 | 10 | 82 | 95 | 9 | 11 |
| CC-3 | 0.028 | 280 | 98 | 10 | 98 | 150 | 11 | 16 |
| CC-3 | 0.028 | 280 | 128 | 10 | 128 | 122 | 11 | 16 |
| CC-3 | 0.028 | 280 | 134 | 9 | 121 | 114 | 11 | 16 |
| CC-3 | 0.028 | 280 | 137 | 9 | 123 | 126 | 11 | 16 |
| CC-3 | 0.032 | 320 | 196 | 6 | 118 | 126 | 13 | 27 |
| CC-3 | 0.030 | 300 | 199 | 6 | 119 | 126 | 12 | 21 |
| CC-3 | 0.029 | 290 | 204 | 4 | 82 | 93 | 11 | 18 |
| CC-3 | 0.028 | 280 | 140 | 6 | 84 | 79 | 11 | 16 |
| CC-3 | 0.026 | 260 | 152 | 4 | 61 | 70 | 9 | 12 |
| CC-3 | 0.027 | 270 | 152 | 4 | 61 | 98 | 10 | 14 |
| CC-3 | 0.026 | 260 | 137 | 5 | 69 | 80 | 9 | 12 |
| CC-3 | 0.027 | 270 | 129 | 5 | 65 | 65 | 10 | 14 |
| CC-3 | 0.027 | 270 | 127 | 5 | 64 | 74 | 10 | 14 |
| CC-3 | 0.026 | 260 | 118 | 6 | 71 | 60 | 9 | 12 |
| CC-3 | 0.026 | 260 | 135 | 5 | 68 | 80 | 9 | 12 |
| CC-3 | 0.027 | 270 | 130 | 5 | 65 | 50 | 10 | 14 |
| CC-3 | 0.025 | 250 | 117 | 5 | 59 | 43 | 9 | 11 |
| CC-3 | 0.026 | 260 | 120 | 5 | 60 | 77 | 9 | 12 |
| CC-3 | 0.024 | 240 | 58 | 9 | 52 | 40 | 8 | 9 |
| CC-3 | 0.027 | 270 | 116 | 6 | 70 | 40 | 10 | 14 |
| CC-3 | 0.027 | 270 | 124 | 5 | 62 | 75 | 10 | 14 |
| CC-3 | 0.026 | 260 | 126 | 5 | 63 | 65 | 9 | 12 |
| CC-3 | 0.026 | 260 | 127 | 5 | 64 | 55 | 9 | 12 |
| CC-3 | 0.026 | 260 | 138 | 5 | 69 | 65 | 9 | 12 |
| CC-3 | 0.025 | 250 | 118 | 5 | 59 | 70 | 9 | 11 |
| CC-3 | 0.026 | 260 | 124 | 5 | 62 | 65 | 9 | 12 |
| CC-3 | 0.027 | 270 | 144 | 5 | 72 | 60 | 10 | 14 |
| CC-3/4 | 0.026 | 260 | 127 | 5 | 64 | 65 | 9 | 12 |
| CC-4 | 0.027 | 270 | 116 | 6 | 70 | 65 | 10 | 14 |
| CC-4 | 0.024 | 240 | 87 | 6 | 52 | 63 | 8 | 9 |
| CC-4 | 0.022 | 217 | 97 | 25%* | 24 | 20 | 7 | 8 |
| CC-4 | 0.020 | 199 | 87 | 22%* | 19 | 20 | 6 | 9 |
| CC-4 | 0.023 | 232 | 106 | 23%* | 24 | 26 | 8 | 9 |
| IC-3 | 0.038 | 381 | 45 | 4 | 18 | 25 | 17 | 53 |
| IC-3 | 0.043 | 434 | 33 | 5 | 17 | 12 | 22 | 81 |
| IC-3 | 0.049 | 494 | 38 | 6 | 23 | 16 | 27 | 118 |

TABLE 19

| 1 sqft of 25 um film= | 2.32 | mL volume |
|---|---|---|
| density of polymer= | 0.938 | g/mL |
| change to wt= | 2.18 | g PE/sqft film |
| catalyst content= | 0.0373% | % ash in PE |
| g catalyst= | 0.00081 | g Cat/sqft film |
| catalyst density= | 0.317 | g Cat per mL Cat |
| total cat vol/sqft= | 2.563E−03 | mL Cat/sqft |

TABLE 20

| X diameter μm | Y % ash/ channel | Particle Volume mL per particle | Cat Vol Partition mL cat/ sqft/ channel | Particle Count # particles/ sqft film/ channel |
|---|---|---|---|---|
| 704.00 | 0.000% | 1.83E−04 | 0.00E+00 | 0 |
| 645.60 | 0.000% | 1.41E−04 | 0.00E+00 | 0 |
| 592.00 | 0.000% | 1.09E−04 | 0.00E+00 | 0 |
| 542.90 | 0.000% | 8.37E−05 | 0.00E+00 | 0 |
| 497.80 | 0.000% | 6.46E−05 | 0.00E+00 | 0 |
| 456.50 | 0.000% | 4.98E−05 | 0.00E+00 | 0 |
| 418.60 | 0.000% | 3.84E−05 | 0.00E+00 | 0 |
| 383.90 | 0.035% | 2.96E−05 | 8.96E−07 | 0 |
| 352.00 | 0.140% | 2.28E−05 | 3.58E−06 | 0.2 |
| 322.80 | 0.250% | 1.76E−05 | 6.40E−06 | 0.4 |
| 296.00 | 0.320% | 1.36E−05 | 8.19E−06 | 0.6 |
| 271.40 | 0.380% | 1.05E−05 | 9.73E−06 | 0.9 |
| 248.90 | 0.419% | 8.07E−06 | 1.08E−05 | 1.3 |
| 228.20 | 0.469% | 6.22E−06 | 1.20E−05 | 1.9 |
| 209.30 | 0.489% | 4.80E−06 | 1.25E−05 | 2.6 |
| 191.90 | 0.519% | 3.70E−06 | 1.33E−05 | 3.6 |
| 176.00 | 0.549% | 2.85E−06 | 1.41E−05 | 4.9 |
| 161.40 | 0.569% | 2.20E−06 | 1.46E−05 | 6.6 |
| 148.00 | 0.589% | 1.31E−06 | 1.51E−05 | 11.6 |
| 135.70 | 0.599% | 1.01E−06 | 1.54E−05 | 15.2 |
| 124.50 | 0.619% | 7.77E−07 | 1.59E−05 | 20.4 |
| 114.10 | 0.619% | 6.01E−07 | 1.59E−05 | 26.4 |
| 104.70 | 0.629% | 6.01E−07 | 1.61E−05 | 26.9 |
| 95.96 | 0.619% | 4.62E−07 | 1.59E−05 | 34.3 |

TABLE 21

| X diameter μm | Particle Count # particles Sqft film//channel |
|---|---|
| 114.10 | 0 |
| 104.70 | 0 |
| 95.96 | 0 |
| 88.00 | 0 |
| 80.70 | 0 |
| 74.00 | 0 |
| 67.86 | 0 |
| 62.23 | 0 |
| 57.06 | 20 |
| 52.33 | 43 |
| 47.98 | 70 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A supported chromium catalyst comprising a solid oxide and from 0.1 to 15 wt. % chromium, wherein the solid oxide (or the supported chromium catalyst) has (or is characterized by) an amount of the solid oxide (or the supported chromium catalyst) with a particle size greater than 100 μm of less than or equal to 3 wt. %, and a particle size span ((d90−d10)/d50) in a range from 0.5 to 1.4.

Aspect 2. A supported chromium catalyst comprising a solid oxide and from 0.1 to 15 wt. % chromium, wherein the solid oxide (or the supported chromium catalyst) has (or is characterized by) an amount of the solid oxide (or the supported chromium catalyst) with a particle size greater than 100 μm of less than or equal to 0.5 wt. %, and an amount of the solid oxide (or the supported chromium catalyst) with a particle size less than 10 μm of less than or equal to 10 wt. %.

Aspect 3. The catalyst defined in aspect 1 or 2, wherein the amount of the solid oxide (or the supported chromium catalyst) with a particle size greater than 100 μm is in any range disclosed herein, e.g., less than or equal to 2 wt. %, less than or equal to 1 wt. %, less than or equal to 0.5 wt. %, less than or equal to 0.35 wt. %, less than or equal to 0.2 wt. %, or less than or equal to 0.1 wt. %.

Aspect 4. The catalyst defined in any one of the preceding aspects, wherein the solid oxide (or the supported chromium catalyst) has a particle size span ((d90−d10)/d50) in any range disclosed herein, e.g., from 0.5 to 1.4, from 0.6 to 1.4, from 0.7 to 1.4, from 0.6 to 1.35, from 0.7 to 1.35, from 0.8 to 1.35, from 0.7 to 1.1, or from 0.8 to 1.1.

Aspect 5. The catalyst defined in any one of the preceding aspects, wherein the amount of the solid oxide (or the supported chromium catalyst) with a particle size less than 10 μm is in any range disclosed herein, e.g., less than or equal to 10 wt. %, less than or equal to 7 wt. %, less than or equal to 5 wt. %, less than or equal to 3 wt. %, or less than or equal to 2 wt. %.

Aspect 6. The catalyst defined in any one of the preceding aspects, wherein the solid oxide (or the supported chromium catalyst) has a d50 average particle size in any range disclosed herein, e.g., from 15 to 60 μm, from 15 to 50 μm, from 15 to 40 μm, from 17 to 45 μm, or from 17 to 32 μm.

Aspect 7. The catalyst defined in any one of the preceding aspects, wherein the solid oxide (or the supported chromium catalyst) has a ratio of d80/d20 in any range disclosed herein, e.g., from 1.3 to 2.8, from 1.3 to 2.2, from 1.4 to 2.8, from 1.4 to 2.2, from 1.5 to 2.7, or from 1.5 to 2.1.

Aspect 8. The catalyst defined in any one of the preceding aspects, wherein the solid oxide (or the supported chromium catalyst) has a d10 particle size in any range disclosed herein, e.g., greater than or equal to 10 μm, greater than or equal to 11 μm, in a range from 10 to 25 μm, or in a range from 10 to 20 μm.

Aspect 9. The catalyst defined in any one of the preceding aspects, wherein the solid oxide (or the supported chromium catalyst) has a d95 particle size in any range disclosed herein, e.g., from 25 to 88 μm, from 28 to 85 μm, from 30 to 82 μm, from 25 to 65 μm, or from 30 to 55 μm.

Aspect 10. The catalyst defined in any one of the preceding aspects, wherein the amount of the solid oxide (or the supported chromium catalyst) with a particle size greater than 75 μm is in any range disclosed herein, e.g., less than or equal to 10 wt. %, less than or equal to 6.5 wt. %, less than or equal to 4 wt. %, less than or equal to 2.5 wt. %, less than or equal to 1.5 wt. %, or less than or equal to 1 wt. %.

Aspect 11. The catalyst defined in any one of the preceding aspects, wherein the amount of the solid oxide (or the supported chromium catalyst) with a particle size less than 15 μm is in any range disclosed herein, e.g., less than or equal to 20 wt. %, less than or equal to 18 wt. %, less than or equal to 15 wt. %, less than or equal to 13 wt. %, or less than or equal to 8 wt. %.

Aspect 12. The catalyst defined in any one of the preceding aspects, wherein the number of the solid oxide (or the supported chromium catalyst) particles with a particle size greater than 150 μm is in any range disclosed herein, e.g., less than or equal to 10,000, less than or equal to 1000, less than or equal to 100, or less than or equal to 50, per gram of the solid oxide (or the supported chromium catalyst).

Aspect 13. The catalyst defined in any one of the preceding aspects, wherein the number of the solid oxide (or the supported chromium catalyst) particles with a particle size greater than 100 μm is in any range disclosed herein, e.g., less than or equal to 100,000, less than or equal to 10,000, less than or equal to 1000, less than or equal to 100, or less than or equal to 50, per gram of the solid oxide (or the supported chromium catalyst).

Aspect 14. The catalyst defined in any one of the preceding aspects, wherein the number of the solid oxide (or the supported chromium catalyst) particles with a particle size greater than 75 µm is in any range disclosed herein, e.g., less than or equal to 100,000, less than or equal to 50,000, less than or equal to 10,000, less than or equal to 1000, or less than or equal to 100, per gram of the solid oxide (or the supported chromium catalyst).

Aspect 15. The catalyst defined in any one of the preceding aspects, wherein the solid oxide is silica, silica-alumina, silica-coated alumina, silica-titania, silica-titania-magnesia, silica-zirconia, silica-magnesia, silica-boria, aluminophosphate-silica, or any combination thereof; alternatively, silica; or alternatively, silica-titania.

Aspect 16. The catalyst defined in any one of the preceding aspects, wherein the amount of chromium is in any range disclosed herein, e.g., from 0.1 to 10 wt. %, from 0.5 to 10 wt. %, from 0.5 to 2 wt. %, from 0.75 to 7.5 wt. %, from 0.75 to 2.5 wt. %, or from 0.75 to 1.25 wt. % chromium, based on the total weight of the catalyst.

Aspect 17. The catalyst defined in any one of the preceding aspects, wherein the catalyst has a pore volume (total) in any suitable range, or any range disclosed herein, e.g., from 0.5 to 5 mL/g, from 1 to 5 mL/g, from 1 to 3 mL/g, from 1.2 to 2.5 mL/g, or from 1.3 to 1.8 mL/g.

Aspect 18. The catalyst defined in any one of the preceding aspects, wherein the catalyst has a BET surface area in any suitable range, or any range disclosed herein, e.g., from 200 to 700 m$^2$/g, from 250 to 550 m$^2$/g, from 250 to 400 m$^2$/g, from 275 to 525 m$^2$/g, or from 400 to 600 m$^2$/g.

Aspect 19. The catalyst defined in any one of the preceding aspects, wherein the catalyst contains less than or equal to 3 wt. % carbon, less than or equal to 2 wt. % carbon, less than or equal to 1 wt. % carbon, or less than or equal to 0.5 wt. % carbon.

Aspect 20. The catalyst defined in any one of aspects 1-19, wherein at least 80 wt. %, at least 90 wt. %, or at least 95 wt. %, of the chromium is present in an oxidation state of three or less.

Aspect 21. The catalyst defined in any one of aspects 1-19, wherein at least 40 wt. %, at least 60 wt. %, at least 75 wt. %, or at least 90 wt. %, of the chromium is present in an oxidation state of six (Cr+6).

Aspect 22. A (slurry) polymerization process comprising contacting the supported chromium catalyst defined in any one of aspects 1-21 (e.g., an activated catalyst) and an optional co-catalyst with an olefin monomer and an optional olefin comonomer in a polymerization reactor system comprising a loop slurry reactor under polymerization conditions to produce an olefin polymer.

Aspect 23. The process defined in aspect 22, wherein a co-catalyst is used, and the co-catalyst comprises any co-catalyst disclosed herein, e.g., an aluminoxane co-catalyst, an organoaluminum co-catalyst, or an organoboron co-catalyst, or any combination thereof.

Aspect 24. The process defined in aspect 22 or 23, wherein the olefin monomer comprises any olefin monomer disclosed herein, e.g., any $C_2$-$C_{20}$ olefin.

Aspect 25. The process defined in any one of aspects 22-24, wherein the olefin monomer and the optional olefin comonomer independently comprise a $C_2$-$C_{20}$ alpha-olefin.

Aspect 26. The process defined in any one of aspects 22-25, wherein the olefin monomer comprises ethylene.

Aspect 27. The process defined in any one of aspects 22-26, wherein the supported chromium catalyst is contacted with ethylene and an olefin comonomer comprising a $C_3$-$C_{10}$ alpha-olefin.

Aspect 28. The process defined in any one of aspects 22-27, wherein the supported chromium catalyst is contacted with ethylene and an olefin comonomer comprising 1-butene, 1-hexene, 1-octene, or a mixture thereof.

Aspect 29. The process defined in any one of aspects 22-28, wherein the polymerization reactor system comprises only one loop slurry reactor.

Aspect 30. The process defined in any one of aspects 22-28, wherein the polymerization reactor system comprises two or more reactors, at least one of which is the loop slurry reactor.

Aspect 31. The process defined in any one of aspects 22-30, wherein the olefin polymer comprises any olefin polymer disclosed herein.

Aspect 32. The process defined in any one of aspects 22-31, wherein the olefin polymer comprises an ethylene homopolymer, an ethylene/1-butene copolymer, an ethylene/1-hexene copolymer, and/or an ethylene/1-octene copolymer.

Aspect 33. The process defined in any one of aspects 22-32, wherein the olefin polymer comprises an ethylene/1-hexene copolymer.

Aspect 34. The process defined in any one of aspects 22-33, wherein the polymerization conditions comprise a polymerization reaction temperature in a range from 60° C. to 120° C. and a reaction pressure in a range from 200 to 1000 psig (1.4 to 6.9 MPa).

Aspect 35. The process defined in any one of aspects 22-34, wherein the polymerization conditions are substantially constant, e.g., for a particular polymer grade.

Aspect 36. The process defined in any one of aspects 22-35, wherein no hydrogen is added to the polymerization reactor system.

Aspect 37. The process defined in any one of aspects 22-35, wherein hydrogen is added to the polymerization reactor system.

Aspect 38. The process defined in any one of aspects 22-37, wherein the olefin polymer contains, independently, less than 0.1 ppm (by weight), less than 0.08 ppm, less than 0.05 ppm, or less than 0.03 ppm, of Mg, V, Ti, Zr, or Hf.

Aspect 39. The process defined in any one of aspects 22-38, wherein the olefin polymer is characterized by a film gel count in any range disclosed herein, e.g., less than or equal to 15, less than or equal to 12, less than or equal to 10, less than or equal 8, less than or equal to 5, or less than or equal to 2 gels per ft$^2$ of 25 micron thick film (film gels encompass a size greater than 200 µm caused by catalyst particle defects).

Aspect 40. An olefin polymer produced by the process defined in any one of aspects 22-39.

Aspect 41. An ethylene polymer (e.g., in the form of pellets) having (or characterized by) a high load melt index (HLMI) in a range from 4 to 70 g/10 min, a density in a range from 0.93 to 0.96 g/cm$^3$, and a film gel count of less than or equal to 15 catalyst particle gels per ft$^2$ of 25 micron thick film (or less than or equal to 12, or less than or equal to 10, or less than or equal to 8, or less than or equal to 5, or less than or equal to 2, gels per ft$^2$ of 25 micron thick film), wherein film gels encompass a size greater than 200 µm caused by catalyst particles, and wherein the ethylene polymer contains from 150 to 680 ppm solid oxide (e.g., silica) and from 1.5 to 6.8 ppm chromium.

Aspect 42. An ethylene polymer (e.g., pellets) having (or characterized by) a high load melt index (HLMI) in a range from 4 to 70 g/10 min, a density in a range from 0.93 to 0.96 g/cm$^3$, and a gel count of less than or equal to 50 catalyst particles of greater than 100 μm per 5 grams of the ethylene polymer (or less than or equal to 40, or less than or equal to 30, or less than or equal to 20, or less than or equal to 10, or less than or equal to 5, or less than or equal to 2, or less than or equal to 1, catalyst particle(s) per 5 grams of the ethylene polymer), wherein the ethylene polymer contains from 150 to 680 ppm solid oxide (e.g., silica) and from 1.5 to 6.8 ppm chromium.

Aspect 43. An ethylene polymer (e.g., pellets) having (or characterized by) a high load melt index (HLMI) in a range from 4 to 70 g/10 min, and a density in a range from 0.93 to 0.96 g/cm$^3$; wherein the ethylene polymer contains from 150 to 680 ppm of solid oxide (or from 150 to 600 ppm, or from 150 to 500 ppm, or from 180 to 550 ppm, or from 200 to 600 ppm, or from 200 to 500 ppm) and from 1.5 to 6.8 ppm of chromium (or from 1.5 to 6 ppm, or from 1.5 to 5 ppm, or from 1.8 to 5.5 ppm, or from 2 to 6 ppm, or from 2 to 5 ppm) wherein the ethylene polymer has (A) a film gel count of less than Y1 catalyst particle gels per ft$^2$ of 25 micron thick film, wherein film gels are of a size greater than 200 μm caused by catalyst particles, wherein Y1=1.20*(5,580,000x$^{1.61}$), and x is the weight fraction of ash (encompassing solid oxide and chromium) in the ethylene polymer, and in further aspects, the film gel count is than Y1 catalyst particle gels, wherein Y1=5,580,000x$^{1.61}$; alternatively, Y1=0.80*(5,580,000x$^{1.61}$); alternatively, Y1=0.50*(5,580,000x$^{1.61}$); or alternatively, Y1=0.25*(5,580,000x$^{1.61}$); and/or (B) a film gel count of less than Y catalyst particle gels per ft$^2$ of 25 micron thick film, wherein film gels are of a size greater than 200 μm caused by catalyst particles, wherein Y=−1,950,000x$^3$+324,000x$^2$−11,300x+121, wherein x is the weight percentage of ash (encompassing solid oxide and chromium) in the ethylene polymer, and in further aspects, the film gel count is less than Y catalyst particle gels, wherein Y=0.80*(−1,950,000x$^3$+324,000x$^2$−11,300x+121); alternatively, Y=0.50*(−1,950,000x$^3$+324,000x$^2$−11,300x+121); or alternatively, Y=0.25*(−1,950,000x$^3$+324,000x$^2$−11,300x+121).

Aspect 44. The polymer defined in any one of aspects 41-43, wherein the ethylene polymer has a HLMI in any range disclosed herein, e.g., from 4 to 50, from 6 to 36, from 6 to 15, from 20 to 40, or from 25 to 36 g/10 min.

Aspect 45. The polymer defined in any one of aspects 41-44, wherein the ethylene polymer has a density in any range disclosed herein, e.g., from 0.93 to 0.956, from 0.934 to 0.96, from 0.934 to 0.956, from 0.934 to 0.95, or from 0.945 to 0.958 g/cm$^3$.

Aspect 46. The polymer defined in any one of aspects 41-45, wherein the ethylene polymer contains, independently, less than 0.1 ppm (by weight), less than 0.08 ppm, less than 0.05 ppm, or less than 0.03 ppm, of Mg, V, Ti, Zr, or Hf.

Aspect 47. The polymer defined in any one of aspects 41-46, wherein the ethylene polymer contains from 1.8 to 6 ppm, from 2 to 6.8 ppm, from 2 to 6 ppm, from 2 to 5 ppm, from 1.5 to 6 ppm, from 1.5 to 5.5 ppm, from 1.5 to 5 ppm, or from 3 to 6 ppm of chromium.

Aspect 48. The polymer defined in any one of aspects 41-47, wherein the ethylene polymer contains from 180 to 600 ppm, from 200 to 680 ppm, from 200 to 600 ppm, from 200 to 500 ppm, from 150 to 600 ppm, from 150 to 550 ppm, or from 150 to 500 ppm of solid oxide.

Aspect 49. The polymer defined in any one of aspects 41-48, wherein the ethylene polymer has a Mw in any range disclosed herein, e.g., from 100,000 to 275,000, from 120,000 to 240,000, or from 130,000 to 220,000 g/mol.

Aspect 50. The polymer defined in any one of aspects 41-49, wherein the ethylene polymer has a ratio of Mw/Mn in any range disclosed herein, e.g., from 3 to 25, from 4 to 20, or from 5 to 18.

Aspect 51. The polymer defined in any one of aspects 41-50, wherein the ethylene polymer has a CY-a parameter in any range disclosed herein, e.g., from 0.10 to 0.23, from 0.11 to 0.20, from 0.11 to 0.16, from 0.12 to 0.18, from 0.13 to 0.20, from 0.13 to 0.16, from 0.14 to 0.18, or from 0.18 to 0.22.

Aspect 52. The polymer defined in any one of aspects 41-51, wherein the ethylene polymer has a relaxation time in any range disclosed herein, e.g., from 0.5 to 50, from 0.8 to 10, from 0.8 to 5, from 0.8 to 3, from 4 to 40, or from 5 to 30 sec.

Aspect 53. The polymer defined in any one of aspects 41-52, wherein the ethylene polymer comprises an ethylene homopolymer and/or an ethylene/α-olefin copolymer.

Aspect 54. The polymer defined in any one of aspects 41-53, wherein the ethylene polymer comprises an ethylene homopolymer, an ethylene/1-butene copolymer, an ethylene/1-hexene copolymer, and/or an ethylene/1-octene copolymer.

Aspect 55. The polymer defined in any one of aspects 41-54, wherein the ethylene polymer comprises an ethylene/1-hexene copolymer.

Aspect 56. The polymer defined in any one of aspects 41-55 produced by the process defined in any one of aspects 22-39.

Aspect 57. An article comprising the ethylene polymer defined in any one of aspects 41-56.

Aspect 58. An article comprising the ethylene polymer defined in any one of aspects 41-56, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 59. A film, pipe, or blow molded product comprising (or produced from) the polymer defined in any one of aspects 41-56.

Aspect 60. The article defined in any one of aspects 57-59, wherein the article has a gel count of less than or equal to 50 catalyst particles of greater than 100 μm per 5 grams of the article (or less than or equal to 40, or less than or equal to 30, or less than or equal to 20, or less than or equal to 10, or less than or equal to 5, or less than or equal to 2, or less than or equal to 1, catalyst particle(s) per 5 grams of the article).

Aspect 61. An ethylene polymer (fluff or powder) composition having (or characterized by) less than or equal to 1 wt. % of the composition on a 10 mesh sieve, less than or equal to 6 wt. % of the composition on a 20 mesh sieve, and less than or equal to 4 wt. % of the composition thru a 200 mesh sieve.

Aspect 62. An ethylene polymer (fluff or powder) composition having (or characterized by) less than or equal to 5 wt. % of the composition with a particle size of less than 100 μm, less than or equal to 5 wt. % of the composition with a particle size of greater than 1000 μm, and a particle size span ((d90−d10)/d50) from 0.6 to 1.5.

Aspect 63. The composition defined in aspect 61 or 62, wherein the amount of the composition on the 10 mesh sieve is in any range disclosed herein, e.g., less than or equal to 0.5 wt. %, less than or equal to 0.3 wt. %, or less than or equal to 0.1 wt. %.

Aspect 64. The composition defined in any one of aspects 61-63, wherein the amount of the composition on the 20 mesh sieve is in any range disclosed herein, e.g., less than or equal to 4 wt. %, less than or equal to 3 wt. %, or less than or equal to 2.5 wt. %.

Aspect 65. The composition defined in any one of aspects 61-64, wherein the amount of the composition passing thru the 200 mesh sieve is in any range disclosed herein, e.g., less than or equal to 3 wt. %, less than or equal to 2 wt. %, or less than or equal to 1 wt. %.

Aspect 66. The composition defined in any one of aspects 61-65, wherein the amount of the composition with a particle size of less than 100 μm is in any range disclosed herein, e.g., less than or equal to 4 wt. %, less than or equal to 3 wt. %, or less than or equal to 2 wt. %.

Aspect 67. The composition defined in any one of aspects 61-66, wherein the amount of the composition with a particle size of greater than 1000 μm is in any range disclosed herein, e.g., less than or equal to 4 wt. %, less than or equal to 3 wt. %, or less than or equal to 2 wt. %.

Aspect 68. The composition defined in any one of aspects 61-67, wherein the d50 average particle size is in any range disclosed herein, e.g., from 150 to 550 μm, from 200 to 600 μm, from 200 to 450 μm, from 250 to 550 μm, or from 250 to 500 μm.

Aspect 69. The composition defined in any one of aspects 61-68, wherein the particle size span ((d90−d10)/d50) is in any range disclosed herein, e.g., from 0.6 to 1.5, from 0.6 to 1.4, from 0.7 to 1.5, or from 0.7 to 1.4.

Aspect 70. The composition defined in any one of aspects 61-69, wherein the range of density across the composition is in any range disclosed herein, e.g., less than 0.025, less than 0.02, less than 0.015, or less than 0.01 g/cm$^3$.

Aspect 71. The composition defined in any one of aspects 61-70, wherein the range of HLMI across the composition is in any range disclosed herein, e.g., less than 5, less than 4, less than 3, or less than 2 g/10 min.

Aspect 72. The composition defined in any one of aspects 61-71, wherein the range of number of short chain branches per 1000 carbon atoms across the composition divided by the mean of the composition is in any range disclosed herein, e.g., less than 1, less than 0.8, less than 0.6, or less than 0.5.

Aspect 73. The composition defined in any one of aspects 61-72, wherein the range of solid oxide content in ppm across the composition divided by the mean of the composition is in any range disclosed herein, e.g., less than 1, less than 0.8, less than 0.6, or less than 0.5.

Aspect 74. The composition defined in any one of aspects 61-73, wherein the composition is further characterized by the ethylene polymer properties defined in any one of aspects 41-56.

We claim:

1. A supported chromium catalyst comprising a solid oxide and from 0.1 to 15 wt. % chromium, wherein the supported chromium catalyst is characterized by:
    (A1) an amount of the supported chromium catalyst with a particle size greater than 100 μm of less than or equal to 3 wt. %;
    (A2) a particle size span ((d90−d10)/d50) in a range from 0.5 to 1.4; and
    (A3) a d10 particle size in a range from 11 to 22 μm.

2. The catalyst of claim 1, wherein the solid oxide is silica, silica-alumina, silica-coated alumina, silica-titania, silica-titania-magnesia, silica-zirconia, silica-magnesia, silica-boria, aluminophosphate-silica, or any combination thereof.

3. The catalyst of claim 2, wherein the catalyst comprises from 0.5 to 2 wt. % chromium.

4. The catalyst of claim 3, wherein the solid oxide is silica and/or silica-titania.

5. The catalyst of claim 1, wherein the particle size span is from 0.6 to 1.35.

6. The catalyst of claim 1, wherein the particle size span is from 0.7 to 1.1.

7. The catalyst of claim 1, wherein the catalyst contains less than or equal to 3 wt. % carbon.

8. The catalyst of claim 1, wherein at least 80 wt. % of the chromium is present in an oxidation state of three or less.

9. The catalyst of claim 1, wherein at least 60 wt. % of the chromium is present in an oxidation state of six (Cr+6).

10. The catalyst of claim 1, wherein the catalyst is further characterized by:
    a d50 average particle size from 15 to 60 μm; and
    a ratio of d80/d20 from 1.3 to 2.8.

11. The catalyst of claim 1, wherein the catalyst is further characterized by:
    a d50 average particle size from 17 to 32 μm; and
    a d95 particle size from 30 to 55 μm.

12. The catalyst of claim 1, wherein less than or equal to 1 wt. % of the supported chromium catalyst has a particle size greater than 100 μm.

13. The catalyst of claim 1, wherein:
    the solid oxide is silica, silica-alumina, silica-coated alumina, silica-titania, silica-titania-magnesia, silica-zirconia, silica-magnesia, silica-boria, aluminophosphate-silica, or any combination thereof; and
    at least 80 wt. % of the chromium is present in an oxidation state of three or less.

14. The catalyst of claim 13, wherein the catalyst is further characterized by:
    a d50 average particle size from 15 to 60 μm; and
    a ratio of d80/d20 from 1.3 to 2.8.

15. The catalyst of claim 13, wherein the particle size span is from 0.6 to 1.35.

16. The catalyst of claim 13, wherein:
    the catalyst comprises from 0.5 to 2 wt. % chromium; and
    the solid oxide is silica, silica-coated alumina, or silica-titania.

17. The catalyst of claim 16, wherein:
    less than or equal to 1 wt. % of the supported chromium catalyst has a particle size greater than 100 μm; and
    less than or equal to 3 wt. % of the supported chromium catalyst has a particle size less than 10 μm.

18. The catalyst of claim 16, wherein the particle size span is from 0.7 to 1.1.

19. The catalyst of claim 16, wherein the catalyst is further characterized by:
    a d50 average particle size from 17 to 32 μm; and
    a d95 particle size from 30 to 55 μm.

20. The catalyst of claim 16, wherein the catalyst contains, independently, less than 0.1 ppm of Mg, V, Ti, Zr, or Hf.

21. The catalyst of claim 1, wherein:
    the solid oxide is silica, silica-alumina, silica-coated alumina, silica-titania, silica-titania-magnesia, silica-zirconia, silica-magnesia, silica-boria, aluminophosphate-silica, or any combination thereof; and
    at least 60 wt. % of the chromium is present in an oxidation state of six (Cr+6).

22. The catalyst of claim 21, wherein the catalyst is further characterized by:
a d50 average particle size from 15 to 60 μm; and
a ratio of d80/d20 from 1.3 to 2.8.

23. The catalyst of claim 21, wherein the particle size span is from 0.6 to 1.35.

24. The catalyst of claim 21, wherein:
the catalyst comprises from 0.5 to 2 wt. % chromium; and
the solid oxide is silica, silica-coated alumina, or silica-titania.

25. The catalyst of claim 24, wherein:
less than or equal to 1 wt. % of the supported chromium catalyst has a particle size greater than 100 μm; and
less than or equal to 3 wt. % of the supported chromium catalyst has a particle size less than 10 μm.

26. The catalyst of claim 24, wherein the particle size span is from 0.7 to 1.1.

27. The catalyst of claim 24, wherein the catalyst is further characterized by:
a d50 average particle size from 17 to 32 μm; and
a d95 particle size from 30 to 55 μm.

28. The catalyst of claim 24, wherein the catalyst contains, independently, less than 0.1 ppm of Mg, V, Ti, Zr, or Hf.

* * * * *